(12) United States Patent
Egger et al.

(10) Patent No.: US 6,233,571 B1
(45) Date of Patent: May 15, 2001

(54) METHOD AND APPARATUS FOR INDEXING, SEARCHING AND DISPLAYING DATA

(75) Inventors: Daniel Egger, 2027 W. Club Blvd., Durham, NC (US) 27705; Shawn Cannon, Hillsborough; Ronald D. Sauers, Mebane, both of NC (US)

(73) Assignee: Daniel Egger, Peachtree City, GA (US)

( * ) Notice: Subject to any disclaimer, the term of this patent is extended or adjusted under 35 U.S.C. 154(b) by 0 days.

(21) Appl. No.: 09/071,120

(22) Filed: May 4, 1998

Related U.S. Application Data

(60) Division of application No. 08/649,304, filed on May 17, 1996, now Pat. No. 5,832,494, which is a continuation-in-part of application No. 08/076,658, filed on Jun. 14, 1993, now Pat. No. 5,544,352.

(51) Int. Cl.[7] .................................................. G06F 7/00
(52) U.S. Cl. ........................ 707/2; 707/3; 707/4; 707/5; 707/530
(58) Field of Search ..................................... 707/2–5, 530

(56) References Cited

U.S. PATENT DOCUMENTS

| | | | |
|---|---|---|---|
| 5,265,065 | | 11/1993 | Turtle . |
| 5,341,293 | * | 8/1994 | Vertelney et al. .................... 709/205 |
| 5,446,842 | * | 8/1995 | Schaeffer et al. .................... 709/205 |
| 5,530,852 | * | 6/1996 | Meske, Jr. et al. .................. 707/102 |
| 5,542,024 | * | 7/1996 | Balint et al. ......................... 345/356 |

(List continued on next page.)

OTHER PUBLICATIONS a) Agosti, et al., "A Two–Level Hypertext Retrieval Model for Legal Data," SIGIR '91 (1991).
b) Fowler, et al., "Integrating Query, Thesaurus and Documents Through a Common Visual Representation," SIGIR '91 (1991).
c) Rose & Belew, "Legal Information Retrieval: A Hybrid Approach," ICAIL '89 (1989).
d) Belew, Richard, "A Connectionist Approach to Conceptual Information Retrieval," ICAIL '87 (1987).

(List continued on next page.)

*Primary Examiner*—Wayne Amsbury
(74) *Attorney, Agent, or Firm*—Dorsey & Whitney LLP

(57) ABSTRACT

A computer research tool for indexing, searching and displaying data is disclosed. Specifically, a computer research tool for performing computerized research of data including textual objects in a database or a network and for providing a user interface that significantly enhances data presentation is described. Textual objects and other data in a database or network is indexed by creating a numerical representation of the data. The indexing technique called proximity indexing generates a quick-reference of the relations, patterns and similarity found among the data in the database. Proximity indexing indexes the data by using statistical techniques and empirically developed algorithms. Using this proximity index, an efficient search for pools of data having a particular relation, pattern or characteristic can be effectuated. The Computer Search program, called the Computer Search Program for Data represented in Matrices (CSPDM), provides efficient computer search methods. The CSPDM rank orders data in accordance with the data's relationship to time, a paradigm datum, or any similar reference. An alternative embodiment of the invention employs a cluster link generation algorithm which uses links and nodes to index and search a database or network. The algorithm searches for direct and indirect links to a search node and retrieves the nodes which are most closely related to the search node. The user interface program, called the Graphical User Interface (GUI), provides a user friendly method of interacting with the CSPDM program and prepares and presents a visual graphical display. The graphical display provides the user with a two or three dimensional spatial orientation of the data.

22 Claims, 56 Drawing Sheets

U.S. PATENT DOCUMENTS

| | | | | |
|---|---|---|---|---|
| 5,544,352 | * | 8/1996 | Egger | 707/2 |
| 5,617,565 | * | 4/1997 | Augenbaum et al. | 707/102 |
| 5,649,186 | * | 7/1997 | Ferguson | 707/102 |
| 5,749,785 | * | 5/1998 | Rossides | 463/25 |
| 5,794,001 | * | 8/1998 | Makone et al. | 345/342 |
| 5,832,494 | * | 11/1998 | Egger et al. | 707/102 |
| 5,898,434 | * | 4/1999 | Small et al. | 345/348 |
| 6,098,081 | * | 8/2000 | Heidorn et al. | 707/501 |

OTHER PUBLICATIONS e) Gelbart & Smith, "Beyond Boolean Search: FLEXICON, A Legal Text–Based Intelligent System," ICAIL '91 (1991).

f) Lin, "A Self–Organizing Semantic Map for Information Retrieval," SIGIR '91 (1991).

g) Turtle & Croft, "Inference Networks for Document Retrieval," SIGR '90 (1990).

* cited by examiner

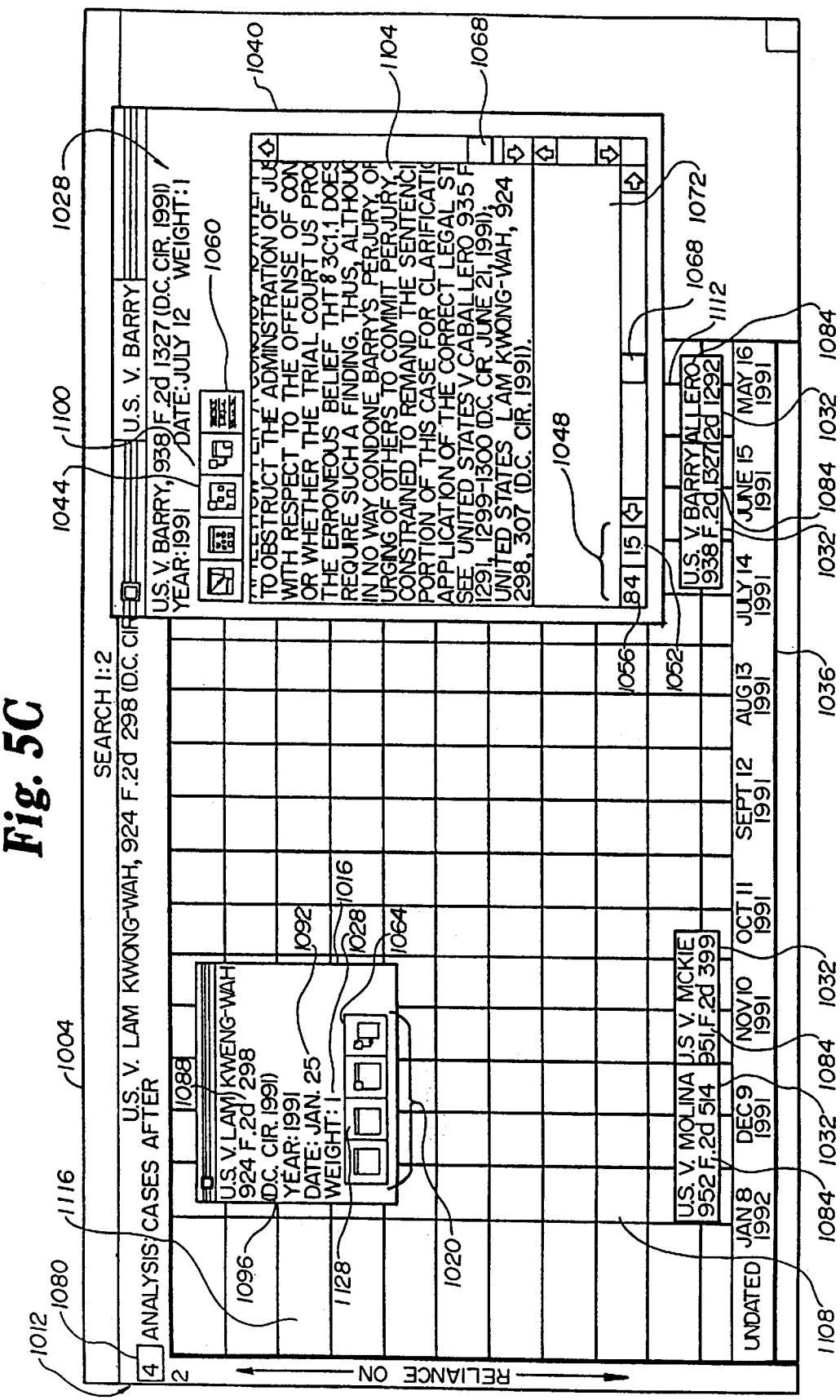

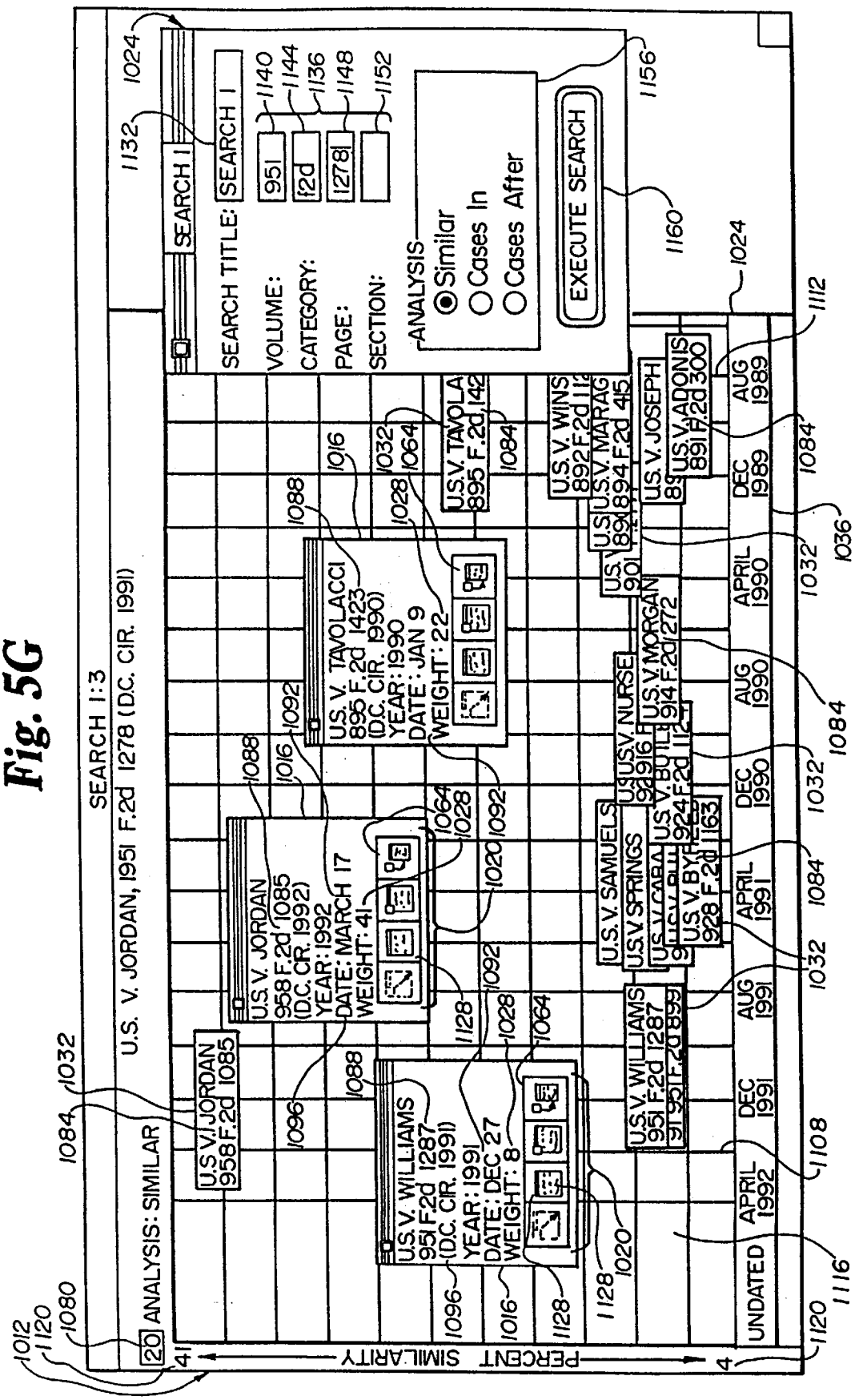

SCHEMATIC REPRESENTATIONS OF THE EIGHTEEN PRIMARY PATTERNS

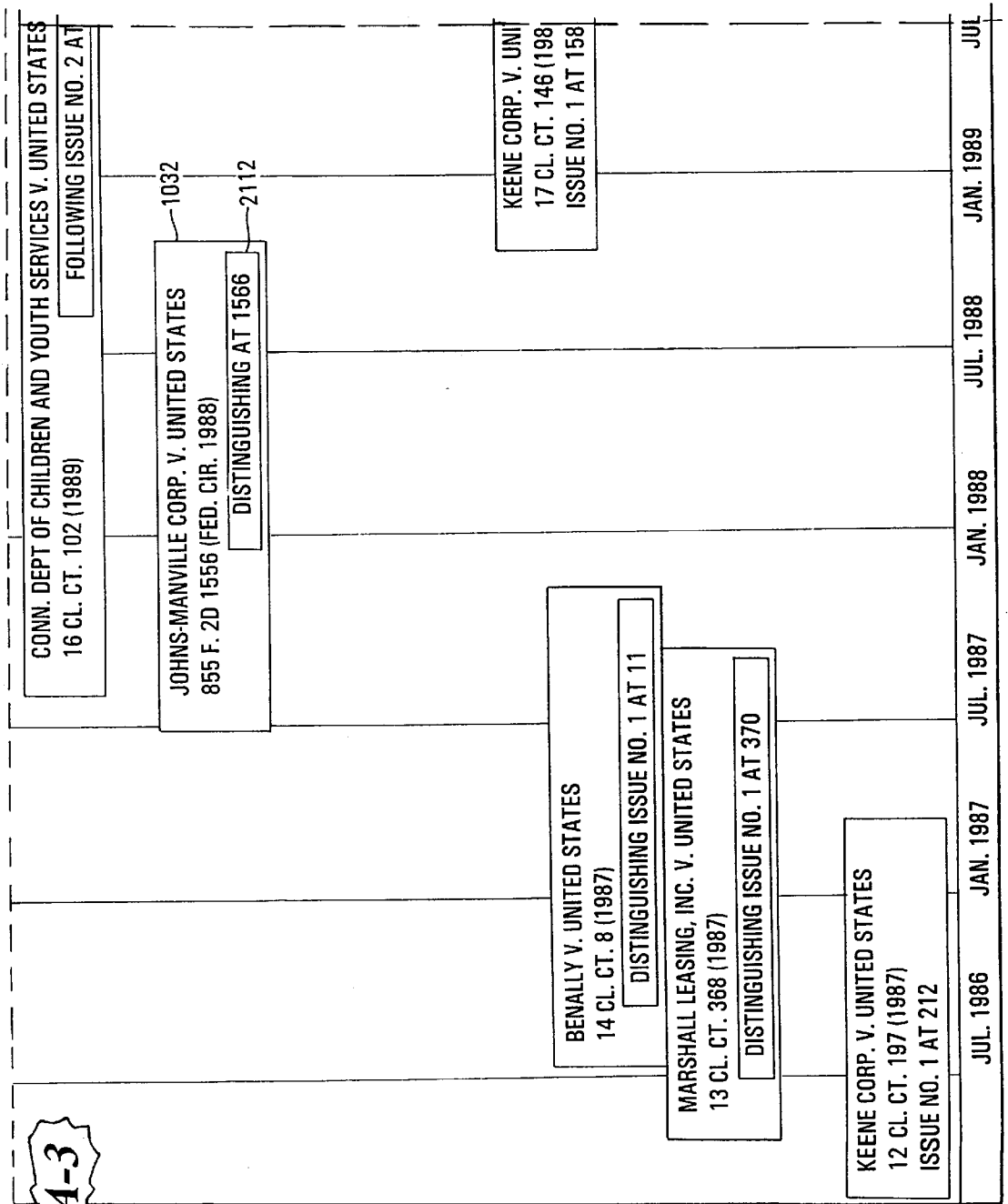

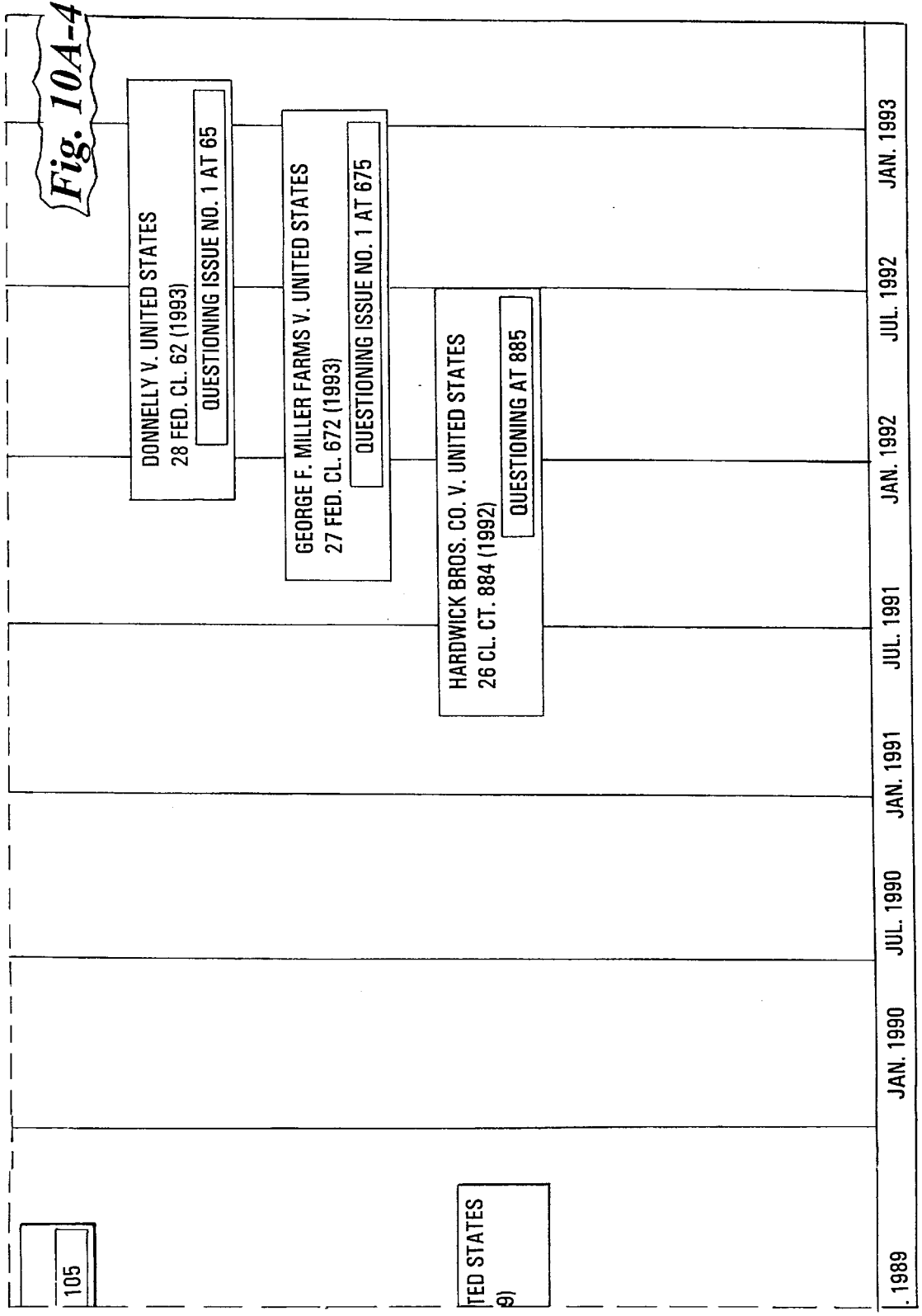

BECH V. OHIO
379 U.S. 89 (1964)

KATZ V. UNITED STATES
389 U.S. 347, 351 (1967)
(HARLAN, J., CONCURRING)

L. TIFFANY ET. AL.,
DETECTION OF CRIME (1967)

PRESTON V. UNITED STATES
376 U.S. 364 (1964)

PEOPLE V. RIVERA
14 N.Y. 2D 441 (1964)

CERT. DENIED 379 U.S. 978

CAMARA V. MUN. CT.
387 U.S. 523 (1967)

WARDEN V. HAYDEN
387 U.S. 294, 310 (1967)
(FORTAS, J., CONCURRING)

MAPP V. OHIO
367 U.S. 643 (1961)

ELHINS V. UNITED STATES
364 U.S. 206 (1960)

BRINEGAR V. UNITED STATES
338 U.S. 160 (1949)

UNITED STATES V. DI RE
332 U.S. 581 (1948)

JOHNSON V. UNITED STATES
333 U.S. 10 (1948)

CARROL V. UNITED STATES
267 U.S. 132 (1925)

ELLIS V. UNITED STATES
264 F. 2D 372 (1959)

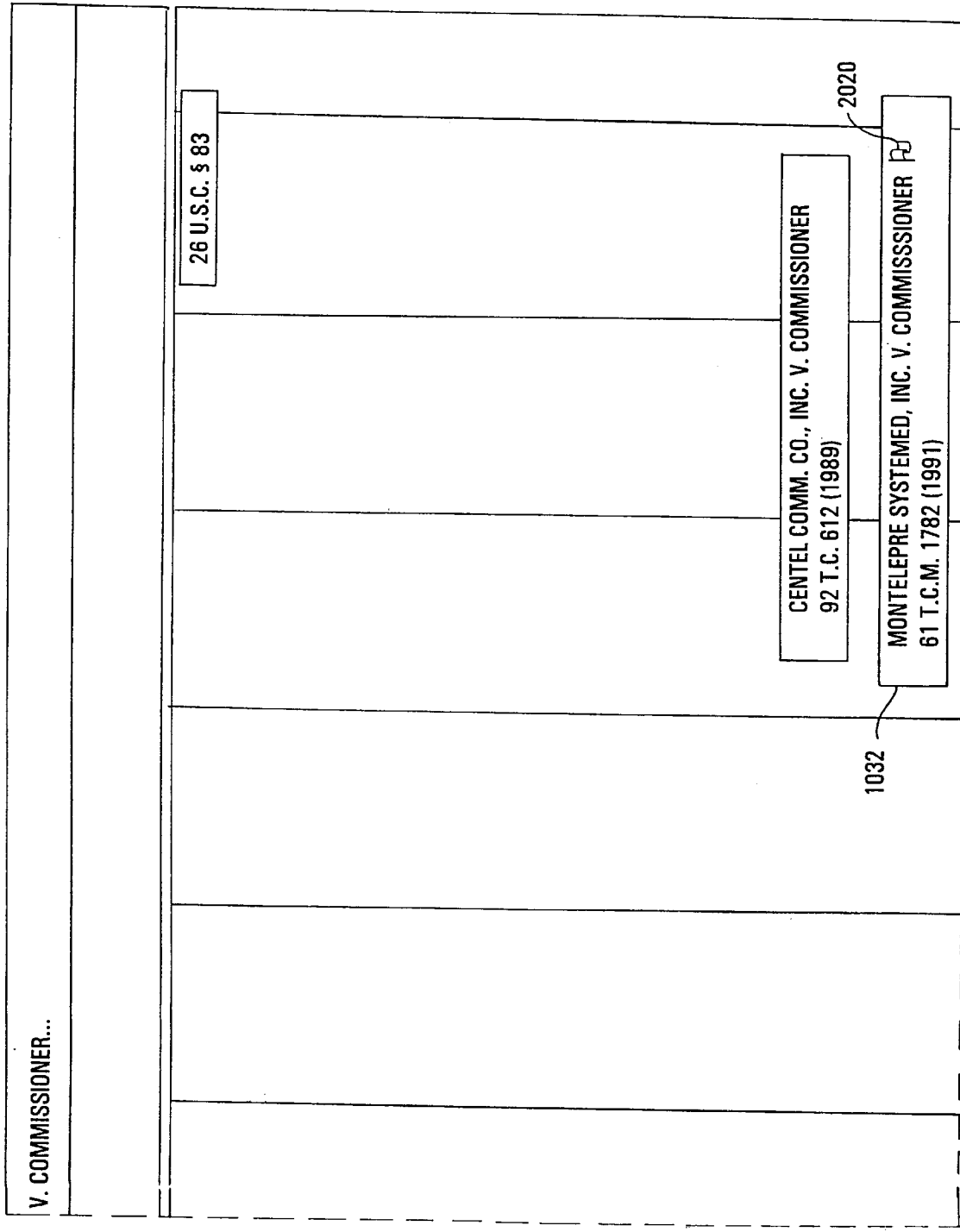

Fig. 10C-3

JAN. 1924 | JAN. 1930 | JAN. 1936 | JAN. 1942 | JAN. 1948 | JAN. 1954

THE SECURITIES EXCHANGE ACT OF 1934
15 U.S.C. § 78P (B) 1934

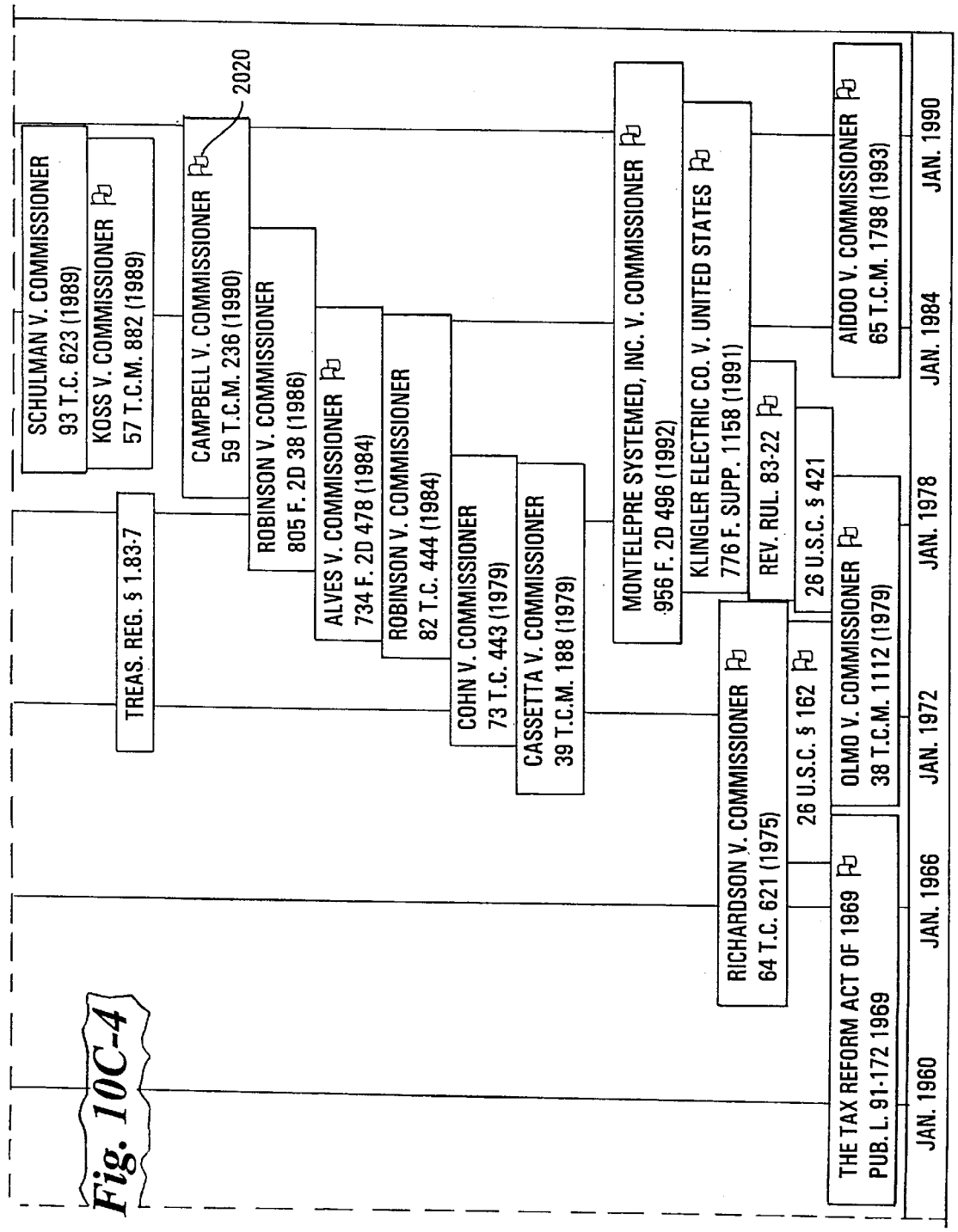

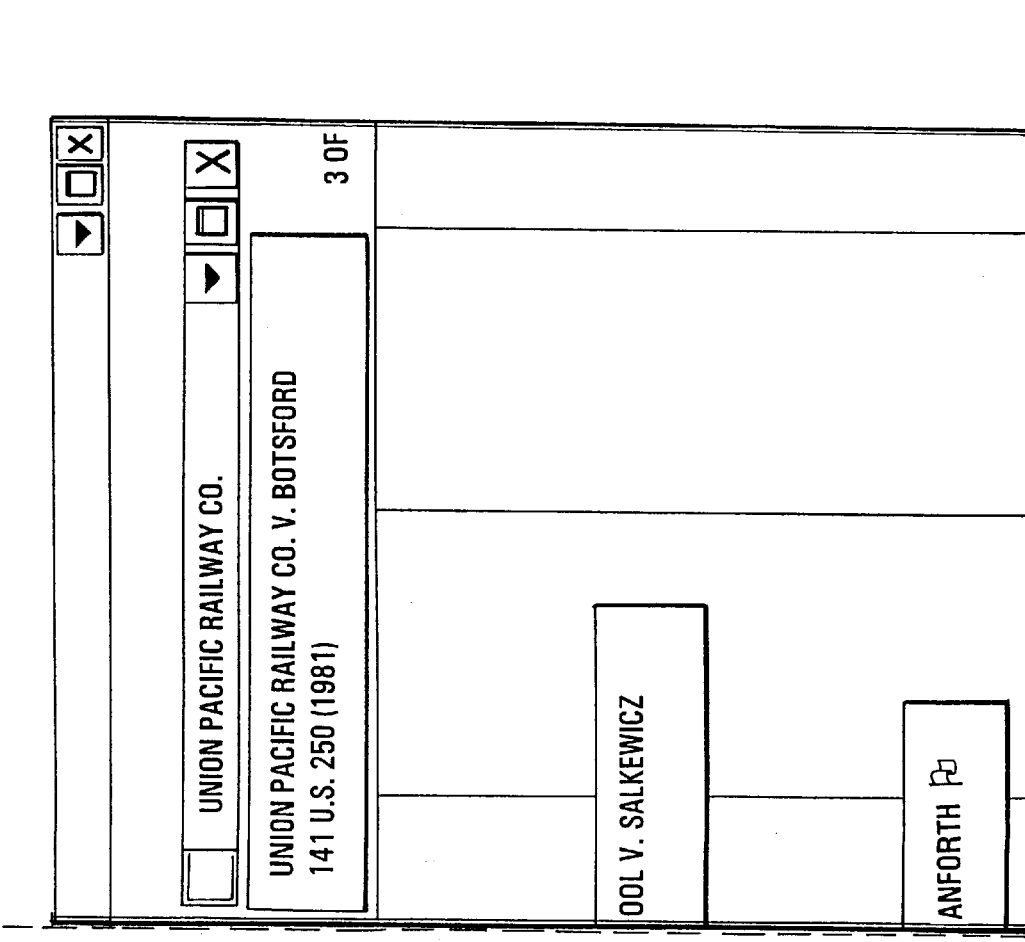

METHOD AND APPARATUS FOR INDEXING, SEARCHING AND DISPLAYING DATA

RELATED APPLICATIONS

This application is a divisional of U.S. patent application Ser. No. 08/649,304, filed May 17, 1996 entitled METHOD APPARATUS FOR INDEXING, SEARCHING AND DISPLAYING DATA, now U.S. Pat. No. 5,832,494, (which is hereby incorporated by reference) which is a continuation-in-part of U.S. application Ser. No. 08/076,658, filed Jun. 14, 1993 with the same title now U.S. Pat. No. 5,544,352.

TECHNICAL FIELD

This invention pertains to computerized research tools. More particularly, it relates to computerized research on databases. Specifically, the invention indexes data, searches data, and graphically displays search results with a user interface.

BACKGROUND

Two manuals containing background materials are hereby incorporated by reference "V-Search Integration Tool Kit For Folio VIEWS", containing thirty-six (36) pages, "V-Search Publisher's Tool Kit User's Manual", containing one hundred sixty (160) pages.

Our society is in the information age. Computers maintaining databases of information have become an everyday part of our lives. The ability to efficiently perform computer research has become increasingly more important. Recent efforts in the art of computer research have been aimed at reducing the time required to accomplish research. Computer research on non-textual objects is very limited. Current computer search programs use a text-by-text analysis procedure (Boolean Search) to scan a database and retrieve items from a database. The user must input a string of text, and the computer evaluates this string of text. Then the computer retrieves items from the database that match the string of text. The two popular systems for computerized searching of data used in the legal profession are Westlaw™, a service sold by West Publishing Company, 50 W. Kellogg Blvd., P.O. Box 64526, St. Paul, Minn. 55164-0526, and Lexis™, a service sold by Mead Data Central, P.O. Box 933, Dayton, Ohio 45401.

However, Boolean searches of textual material are not very efficient. Boolean searches only retrieve exactly what the computer interprets the attorney to have requested. If the attorney does not phrase his or her request in the exact manner in which the database represents the textual object, the Boolean search will not retrieve the desired textual object. Therefore, the researcher may effectively by denied access to significant textual objects that may be crucial to the project on which the researcher is working. A second problem encountered with Boolean searches is that the search retrieves a significant amount of irrelevant textual objects. (It should be noted that in the context of research, a textual object could be any type of written material. The term textual object is used to stress the fact that the present invention applies to all types of databases. The only requirement that a textual object must satisfy in order to be selected by a Boolean search program is that part of the textual object match the particular request of the researcher. Since the researcher cannot possibly know all of the groupings of text within all the textual objects in the database, the researcher is unable to phrase his request to only retrieve the textual objects that are relevant.

Aside from the inefficiency of Boolean searches, the present systems for computerized searching of data are inadequate to serve the needs of a researcher for several other reasons. Even if one assumes that all the textual objects retrieved from a Boolean search are relevant, the listing of the textual objects as done by any currently available systems does not convey some important and necessary information to the researcher. The researcher does not know which textual objects are the most significant (i.e., which textual object is referred to the most by another textual object) or which textual objects are considered essential precedent (i.e., which textual objects describe an important doctrine).

In the legal research field, both Westlaw™ and Lexis™ have a Shepardizing™ feature that enables the researcher to view a list of textual objects that mention a particular textual object. The Shepardizing feature does not indicate how many times a listed textual object mentions the particular textual object. Although the Shepardizing feature uses letter codes to indicate the importance of a listed textual object (e.g., an "f" beside a listed textual object indicates that the legal rule contained in particular textual object was followed in the listed textual object), data on whether a listed textual object followed the rule of a particular textual object is entered manually by employees of Shepard's™/McGraw Hill, Inc., Div. of McGraw-Hill Book Co., 420 N. Cascade Ave., Colorado Springs, Colo. 80901, toll free 1-800-525-2474. Such a process is subjective and is prone to error.

Another legal research system that is available is the Westlaw™ key number system. The Westlaw™ key number system has problems similar to the shepardizing feature on the Lexis™ and Westlaw™ systems.

The video displays of both the West™ and Lexis™ systems are difficult to use. The simple text displays of these systems do not provide a researcher with all the information that is available in the database.

Computerized research tools for legal opinions and related documents are probably the most sophisticated computer research tools available and therefore form the background for this invention. However, the same or similar computer research tools are used in many other areas. For example, computer research tools are used for locating prior art for a patent application. The same problems of inefficiency discussed above exist for computer research tools in many areas of our society.

What is needed is a system for computerized searching of data that is faster than the available systems of research.

What is needed is a system for computerized searching of data that enables researchers to research in a manner in which they are familiar.

What is needed is a computerized research tool that will reorganize, re-index or reformat the data into a more efficient format for searching.

What is needed are more sophisticated methods to search data.

What is needed is a system for computerized searching of data that will significantly reduce the number of irrelevant textual objects it retrieves.

What is needed is a user friendly computerized research tool.

What is needed is a visual user interface which can convey information to a user conveniently.

What is needed is a system for computerized searching of data that easily enables the researcher to classify the object according to his or her own judgment.

What is needed is a system for computerized searching of data that provides a visual representation of "lead" objects and "lines" of objects, permitting a broad overview of the shape of the relevant "landscape."

What is needed is a system for computerized searching of data that provides an easily-grasped picture or map of vast amounts of discrete information, permitting researchers to "zero in" on the most relevant material.

What is needed is a system for computer searching of data that provides a high degree of virtual orientation and tracking, the vital sense of where one has been and where one is going, and that prevent researchers from becoming confused while assimilating a large amount of research materials.

Accordingly, there is an unanswered need for a user friendly computerized research tool. There is a need for "intelligent" research technology that emulates human methods of research. There is a need in the marketplace for a more efficient and intelligent computerized research tool.

The present invention is designed to address these needs.

SUMMARY OF THE INVENTION

This invention is a system for computerized searching of data. Specifically, the present invention significantly aids a researcher in performing computerized research on a database or a network. The invention simplifies the research task by improving upon methods of searching for data including textual objects, and by implementing a user interface that significantly enhances the presentation of the data.

The invention can be used with an existing database by indexing the data and creating a numerical representation of the data. This indexing technique called proximity indexing generates a quick-reference of the relations, patterns, and similarity found among the data in the database. Using this proximity index, an efficient search for pools of data having a particular relation, pattern or characteristic can be effectuated. This relationship can then be graphically displayed.

There are three main components to the invention: a data indexing applications program, a Computer Search Program for Data Represented by Matrices ("CSPDM"), and a user interface. Each component may be used individually. Various indexing application programs, CSPDMs, and user interface programs can be used in combination to achieve the desired results. The data indexing program indexes data into a more useful format. The CSPDM provides efficient computer search methods. The preferred CSPDM includes multiple search subroutines. The user interface provides a user friendly method of interacting with the indexing and CSPDM programs. The preferred user interface program allows for easy entry of commands and visual display of data via a graphical user interface.

The method which the invention uses to index textual objects in a database is called Proximity Indexing. This method can also be used to index objects located on a network. The application of this method to network domains is discussed in greater detail later in this specification. Proximity Indexing is a method of preparing data in a database for subsequent searching by advanced data searching programs. Proximity Indexing indexes the data by using statistical techniques and empirically developed algorithms. The resulting search by an advanced data searching program of the Proximity Indexed data is significantly more efficient and accurate than a simple Boolean search.

The Proximity Indexing Application Program indexes (or represents) the database in a more useful format to enable the Computer Search Program for Data Represented by Matrices (CSPDM) to efficiently search the database. The Proximity Indexing Application Program may include one or more of the following subroutines: an Extractor: a Patterner: and a Weaver. The Proximity Indexing Application Program indexes (or represents) data in a locally located database or remotely located database. The database can contain any type of data, including text, alphanumerics, or graphical information.

In one embodiment, the database is located remotely from the Computer Processor and contains some data in the form of textual objects. The Proximity Indexing Application Program indexes the textual objects by determining how each full textual object (e.g., whole judicial opinion, statute, etc.) relates to every other full textual object by using empirical data and statistical techniques. Once each full textual object is related to each other full textual object, the Proximity Indexing Application Program compares each paragraph of each full textual object with every other full textual object as described above. The Proximity Indexing Application Program then clusters related contiguous paragraphs into sections. Subsequently, the Proximity Indexing Application Program indexes each section and the CSPDM evaluates the indexed sections to determine which sections to retrieve from the database. Such organization and classification of all of the textual objects in the database before any given search commences significantly limits the number of irrelevant textual objects that the CSPDM program retrieves during the subsequent search and allows retrieval of material based on its degree of relevancy.

In a preferred embodiment, the Proximity Indexing Application Program includes a link generation subroutine wherein direct and indirect relationships between or among data is used to generate a representation of the data. Generally, direct and indirect relationships in the database are identified as links and placed in a table.

Again, this method of computerized research can be used for nearly any database including those containing non-textual material, graphical material, newspapers material, data on personal identification, data concerning police records, etc.

The remaining two programs in the present invention are the CSPDM and the GUI Program. The CSPDM has seven subroutines that each search for different pools of objects. The GUI Program also has seven subroutines. Each CSPDM subroutine performs a different type of search. Each of the subroutines of the GUI uses the results of the corresponding subroutine of the CSPDM to create the proper display on the display.

After the Proximity Indexing Application Program indexes a database, the CSPDM application program is used to search the indexed database. For example, the CSPDM program can either be located in memory that is remote from the Computer Processor or local to the Computer Processor. In addition, the CSPDM program can either be remote or local in relation to the database.

The subroutines of the CSPDM utilize the coefficients and other data created by the Proximity Indexing Application Program to facilitate its search. However, if the researcher does not have the particular object citation available, the researcher can perform a Boolean search to retrieve and organize a pool of objects. Alternatively, the researcher can subsequently search for related objects by using the Pool-Similarity Subroutine, the Pool-Paradigm Subroutine, the Pool-Importance Subroutine or the Pool-Paradigm-Similarity Subroutine as defined below.

If the researcher already has the citation of a particular object available, the researcher can search for related objects by utilizing the Cases-In Subroutine, Cases-After Subroutine or Similar-Cases Subroutine. The Cases-In Subroutine retrieves all of the objects from the database to which a selected object refers. In addition, the subroutine determines the number of times the selected object refers to each retrieved object and other characteristics of each object, including its importance, and degree of relatedness to the selected object.

The Cases-After Subroutine retrieves all of the objects from the database that refer to the selected object. Also, the subroutine determines the number of times each retrieved object refers to the selected object and other characteristics of each object, including its importance and degree of relatedness to the particular object to which it refers.

The Similar-Cases Subroutine determines the degree of similarity between the retrieved objects and the selected object. Similarity may be defined, in the context of legal cases, as the extent to which the two objects lie in the same lines of precedent or discuss the same legal topic or concept. Numerous other relationships may be used to define similarity.

In addition, for a textual, object, if the researcher does not know of a particular textual object on which to base his or her search, the researcher may execute a Boolean word search. After a standard Boolean word search has been run, the researcher may run the Pool-Similarity Subroutine to retrieve information containing the degree of similarity between each textual object in the pool and a particular textual object selected by the user. Similarly, the Pool-Importance Subroutine can be used to determine the degree of importance (i.e., whether a judicial opinion is a Supreme Court opinion or a District Court opinion) and other characteristics of each textual object retrieved using the Boolean word search.

The Pool-Paradigm Subroutine calculates the geographic center in vector space of the pool of textual objects retrieved by the Boolean word search or other pool generating method. It then orders the retrieved textual objects by their degree of similarity to that center or "paradigm." The researcher can then evaluate this "typical textual object" and utilize it to help him or her find other relevant textual objects. In addition, the researcher can scan through neighboring "typical textual objects" to evaluate legal subjects that are closely related to the subject of the researcher's search.

The Pool-Paradigm-Similarity Subroutine similarly creates a paradigm textual object from the retrieved textual objects. However, the subroutine calculates the similarity of all textual objects in the database to the paradigm textual object in addition to the similarity of the retrieved textual objects to the paradigm textual object.

After the CSPDM has retrieved the desired objects, the Graphical User Interface (GUI) Program may be used to display the results of the search on the display. In one embodiment, the GUI is a user interface program. The GUI Program contains three main subroutines: Cases-In Display Subroutine (CIDS), Cases-After Display Subroutine (CADS) and Similar-Cases Display Subroutine (SCDS). The main subroutines receive information from the corresponding subroutines Cases-In, Cases-After and Similar-Cases of the CSPDM. The GUI Program also contains four secondary subroutines: Pool-Similarity Display Subroutine ("PSDS"), Pool-Paradigm Display Subroutine ("PPDS"), Pool-Importance Display Subroutine ("PIDS"), and the Pool-Paradigm-Similarity Subroutine (PPSDS). The secondary subroutines also receive information from the corresponding subroutines Pool-Similarity Subroutine, Pool-Paradigm Subroutine, Pool-Importance Subroutine and the Pool-Paradigm Similarity Subroutine of the CSPDM.

The CIDS subroutine receives information gathered from the Cases-In Subroutine of the CSPDM. The CIDS subroutine displays user friendly active boxes and windows on the display which represent the textual objects retrieved from the database represented in Euclidean space. It can also use the boxes to represent objects retrieved from a network. Various active box formats and arranging of information within the boxes may be utilized. The display depicts the appropriate location of textual objects in Euclidean space on a coordinate means. An algorithm may be used to determine the appropriate location of the boxes. The coordinate means may have one or more axis. In one embodiment, the horizontal axis of the coordinate means may represent the time of textual object creation; the vertical axis could represent a weighted combination of the number of sections in which that particular retrieved text is cited or discussed, its degree of importance, and its degree of similarity to the host textual object and the depth axis (Z-axis) represents the existence of data and length of the textual data or object.

The invention can also alter the background color of the window itself to communicate additional information graphically to the user. For example, if the horizontal axis represented time, then the invention could display the portion of the window containing objects occurring previous to the search object in one color and the portion containing the objects occurring after in another. Thus, the researcher can understand at a glance the relative position of his search target in relation to all the other objects related to it.

CIDS also enables the researcher to open up various active boxes on the display by entering a command into the computer processor with the input means. After entering the proper command, the active box transforms into a window displaying additional information about the selected textual object. These windows can be moved about the display and stacked on top or placed beside each other via the input means to facilitate viewing of multiple windows of information simultaneously. In one embodiment, the windows are automatically arranged by the computer system. Since the number of textual objects retrieved in a single search may exceed the amount which could be displayed simultaneously, the GUI Program enables the researcher to "zoom in" or "zoom out" to different scales of measurement on both the horizontal and vertical axis.

The CADS receives information gathered by the Cases-After Subroutine of the CSPDM. The CADS creates a display similar to the CIDS display. However, the active boxes representing the retrieved textual objects indicate which textual objects in the database refer to a selected textual object as opposed to which textual objects a selected textual object refers.

The SCDS receives information gathered by the Similar-Cases Subroutine of the CSPDM. The SCDS causes a similar display on the display as the CIDS and the CADS except that the vertical axis indicates the degree of similarity between the retrieved textual objects and the selected textual object.

The GUI Program contains four secondary subroutines: Pool-Search Display Subroutine (PSDS), Pool-Paradigm Display Subroutine (PPDS), Pool-Importance Display Subroutine (PIDS) and the Pool-Paradigm-Similarity Display Subroutine (PPSDS). The PSDS receives the results gathered by the Pool-Search Subroutine of the CSPDM. The PPDS receives the results gathered by the Pool-Paradigm Subroutine of the CSPDM. The PIDS receives the results gathered by the Pool-Importance Subroutine of the CSPDM. The PPSDS receives the results gathered by the Pool-Paradigm-Similarity Subroutine of the CSPDM. The results of the PSDS, PPDS, PIDS and PPSDS are then displayed in a user friendly graphical manner similar to the results of the CIDS, CADS and SCDS. A researcher can access the PSDS, PIDS, PSDS or PPSDS from any of the three main or four secondary subroutines of the GUI to gather information corresponding to the active boxes that represent the pool of textual objects retrieved by the corresponding subroutine of the CSPDM.

By using the graphical display, the researcher can view immediately a visual representation of trends in the data (for example, trends developing in the law and current and past legal doctrines). In addition, the researcher can immediately identify important data or important precedent and which object serving as the precedent is most important to the project on which the researcher is working. This visual representation is a vast improvement over the current computerized research tools. Furthermore, the researcher using the present invention does not have to rely on the interpretation of another person to categorize different textual objects because the researcher can immediately visualize the legal trends and categories of law. In addition, new topic areas can be recognized without direct human intervention. The current research programs require a researcher to view objects in a database or to read through the actual text of a number of objects in order to determine which objects are important, interrelated, or most closely related to the topic at hand and which ones are not.

It is an object of this invention to create an efficient and intelligent system for computerized searching of data that is faster than available systems of research.

It is an object of the invention to integrate the system of computerized searching into the techniques to which researchers are already accustomed.

It is an object of the invention to utilize statistical techniques along with empirically generated algorithms to reorganize, re-index and reformat data in a database into a more efficient model for searching.

It is an object of the invention to utilize statistical techniques along with empirically generated methods to increase the efficiency of a computerized research tool.

It is an object of the invention to create a system of computerized searching of data that significantly reduces the number of irrelevant objects retrieved.

It is an object of this invention to create a user friendly interface for computer search tools which can convey a significant amount of information quickly.

It is an object of the invention to enable the researcher to easily and immediately classify retrieved database objects according to the researcher's own judgment.

It is an object of the invention to provide a visual representation of "lead" objects and "lines" of objects, permitting a broad overview of the shape of the relevant "landscape."

It is an object of the invention to provide an easily-grasped picture or map of vast amounts of discrete information, permitting researchers to "zero in" on the most relevant material.

It is an object of the invention to provide a high degree of virtual orientation and tracking that enables a researcher to keep track of exactly what information the researcher has already researched and what information the researcher needs to research.

These and other objects and advantages of the invention will become obvious to those skilled in the art upon review of the description of a preferred embodiment, and the appended drawings and claims.

DESCRIPTION OF THE DRAWINGS

FIG. 5C is an example of the display after a user selects an active box representing a textual object retrieved by the Cases-After Subroutine and chooses to open the "full text" window relating to the icon.

FIG. 5G is an example of the display after a user chooses to execute the Similar Cases Subroutine for one of the cases retrieved by the Similar-Cases Subroutine represented in FIG. 5F.

DETAILED DESCRIPTION OF THE PREFERRED EMBODIMENT

Figure 1:
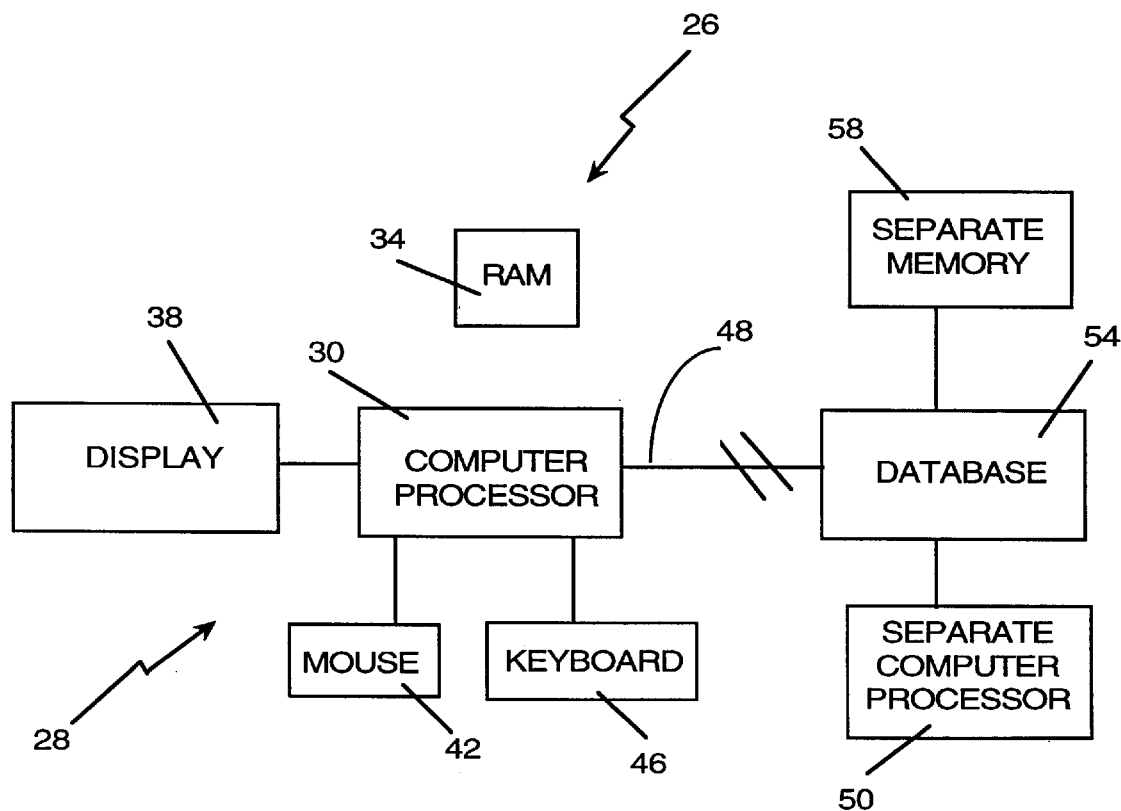
FIG. 1 is a high level diagram of the hardware for the system for computerized searching of data.

Referring now to the drawings, the preferred embodiment of the present invention will be described.

FIG. 1 is an overview of the preferred embodiment of the hardware system 26 for computerized searching of data. The hardware system 26 comprises a Computer Processor 30, a database 54 for storing data, input means, display 38, and RAM 34.

The Computer Processor 30 can be a processor that is typically found in Macintosh computers, IBM computers, portable PCs, clones of such PC computers (e.g. Dell computers), any other type of PC, or a processor in a more advanced or more primitive computing device. Parallel processing techniques may also be utilized with this invention.

The database 54 is connected to the Computer Processor 30 and can be any device which will hold data. For example, the database 54 can consist of any type of magnetic or optical storing device for a computer. The database 54 can be located either remotely from the Computer Processor 30 or locally to the Computer Processor 30. The preferred embodiment shows a database 54 located remotely from the Computer Processor 30 that communicates with the personal computer 28 via modem or leased line. In this manner, the database 54 is capable of supporting multiple remote Computer Processors 30. The preferred connection 48 between the database 54 and the Computer Processor 30 is a network type connection over a leased line. It is obvious to one skilled in the art that the database 54 and the Computer Processor 30 may be electronically connected in a variety of ways. In the preferred embodiment the database 54 provides the large storage capacity necessary to maintain the many records of textual objects.

The input means is connected to the Computer Processor 30. The user enters input commands into the Computer Processor 30 through the input means. The input means could consist of a keyboard 46, a mouse 42, or both working in tandem. Alternatively, the input means could comprise any device used to transfer information or commands from the user to the Computer Processor 30.

The display 38 is connected to the Computer Processor 30 and operates to display information to the user. The display 38 could consist of a computer monitor, television, LCD, LED, or any other means to convey information to the user.

The Random Access Memory (RAM 34) is also connected to the Computer Processor 30. The software system 60 for computerized searching of data may reside in the RAM 34, which can be accessed by the Computer Processor 30 to retrieve information from the software routines. A Read Only Memory (ROM), Erasable Programmable Read Only Memory (EPROM), disk drives, or any other magnetic storage device could be used in place of the RAM 34. Furthermore, the RAM 34 may be located within the structure of the Computer Processor 30 or external to the structure.

The hardware system 26 for computerized searching of data shown in FIG. 1 supports any one, or any combination, of the software programs contained in the software system 60 for computerized searching of data. The software system 60 for the computerized searching of data comprises one or more of the following programs: the Proximity Indexing Application Program 62, the Computer Search Program for Data Represented by Matrices (CSPDM 66) and the Graphical User Interface (GUI 70) Program. The Proximity Indexing Application Program 62 could reside in RAM 34 or in separate memory 58 connected to the database 54. The Computer Processor 30 or a separate computer processor 50 attached to the database 54 could execute the Proximity Indexing Application Program 62. In the preferred embodiment the Proximity Indexing Application Program 62 resides in separate memory 58 that is accessible to the database 54, and a separate computer processor 50 attached to the database 54 executes the Proximity Indexing Application Program 62.

The CSPDM 66 could reside in the RAM 34 connected to the Computer Processor 30 or in the separate memory connected to the database 54. In the preferred embodiment, the CSPDM 66 is located in the RAM 34 connected to the Computer Processor 30. This is also the preferred embodiment for the application of this method to network searching. For network application, a separate database 54 storing information to be analyzed is remotely connected to the computer processor 30. The CSPDM 66 may use the display 38 to depict input screens for user entry of information.

The GUI Program 70 could likewise reside in the RAM 34 connected to the Computer Processor 30 or in separate memory 58 connected to the database 54. In the preferred embodiment, the GUI Program 70 is located in the RAM 34 connected to the Computer Processor 30. The GUI Program 70 also communicates with the display 38 to enhance the manner in which the display 38 depicts information.

Figure 2:
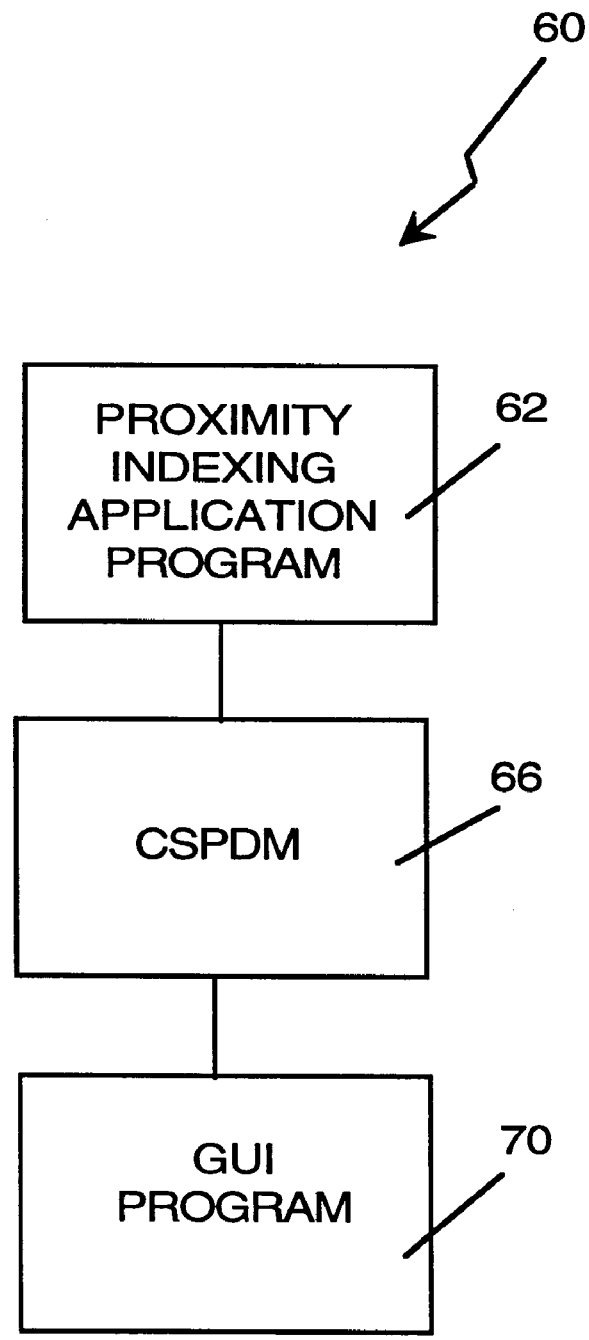
FIG. 2 is high level diagram of the software for the system for computerized searching of data. The three main programs are the Proximity Indexing Application Program, the Computer Search Program for Data Represented by Matrices (CSPDM) Application Program and the Graphical User Interface (GUI) Program.

FIG. 2 is an overview of the preferred embodiment of the software system 60 for computerized searching of data. The software system 60 for computerized searching of data comprises at least one or more of the following programs: the Proximity Indexing Application Program 62, the Computer Search Program for Data Represented by Matrices (CSPDM 66) and the Graphical User Interface (GUI 70) Program. Proximity Indexing is a method of identifying relevant data by using statistical techniques and empirically developed algorithms. (See Appendix #2) The Proximity Indexing Application Program 62 is an application program which represents or indexes the database 54 to a proper format to enable the Computer Search Program for Data Represented by Matrices (CSPDM 66) to properly search the database 54. The Proximity Indexing Application Program 62 can index data in a local database 54 or a remote database 54. The Proximity Indexing Application Program 62 is shown in more detail in FIGS. 3A to 3H.

After the Proximity Indexing Application Program 62 indexes the database 54, the CSPDM 66 application program can adequately search the database 54. The CSPDM 66 program searches the database 54 for objects according to instructions that the user enters into the Computer Processor 30 via the input means. The CSPDM 66 then retrieves the requested objects. The CSPDM 66 either relays the objects and other information to the GUI Program 70 in order for the GUI Program 70 to display this information on the display 38, or the CSPDM 66 sends display commands directly to the Computer Processor 30 for display of this information. However, in the preferred embodiment, the CSPDM 66 relays the objects and other commands to the GUI Program 70. The CSPDM 66 is described in more detail in FIGS. 4A to 4I.

After the CSPDM 66 has retrieved the objects, the Graphical User Interface (GUI 70) Program, which is a user interface program, causes the results of the search to be depicted on the display 38. The GUI Program 70 enhances the display of the results of the search conducted by the CSPDM 66. The GUI Program 70, its method and operation, can be applied to other computer systems besides a system for computerized searching of data. The GUI Program 70 is described in more detail in FIGS. 5A to 5H.

Figure 3A:
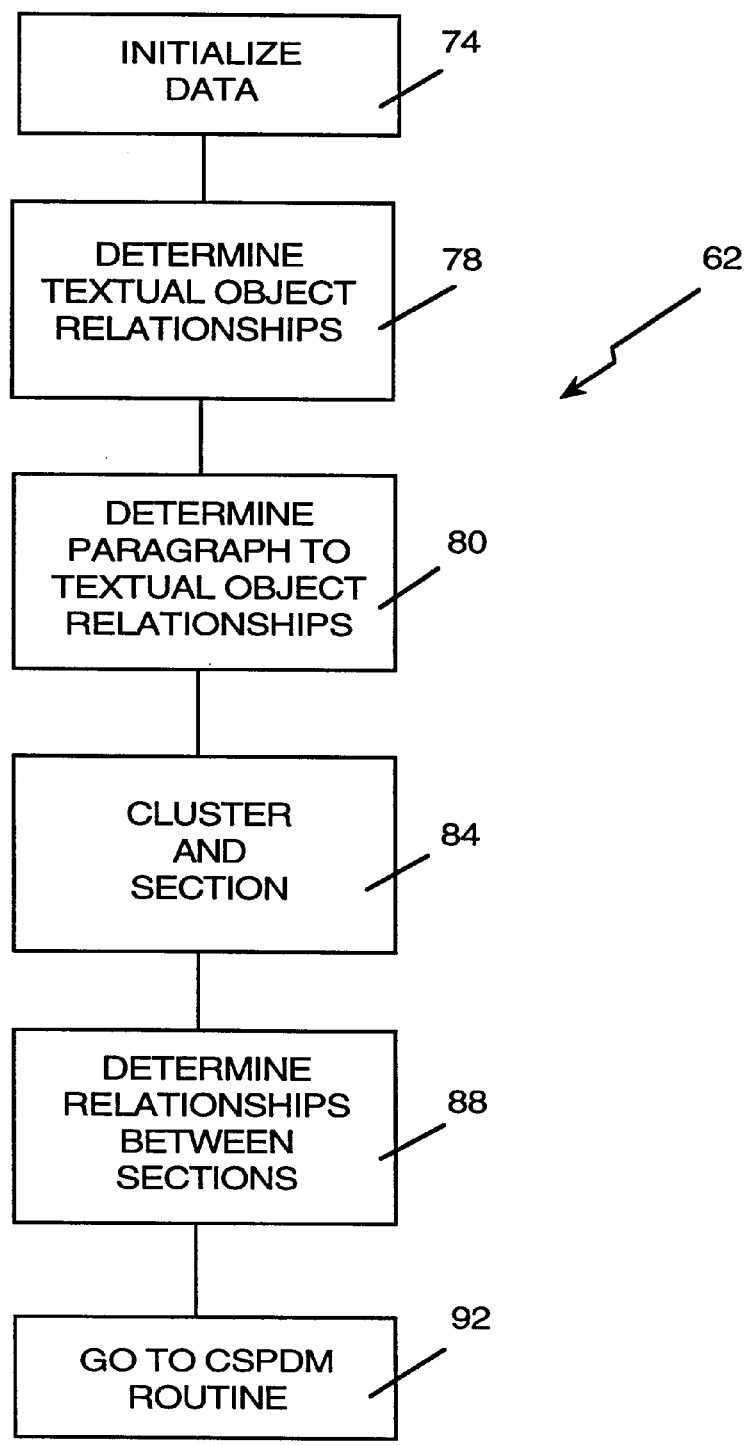
FIG. 3A is a flow chart illustrating a possible sequence of procedures that are executed during the Proximity Indexing Application Program.
Figure 3B:
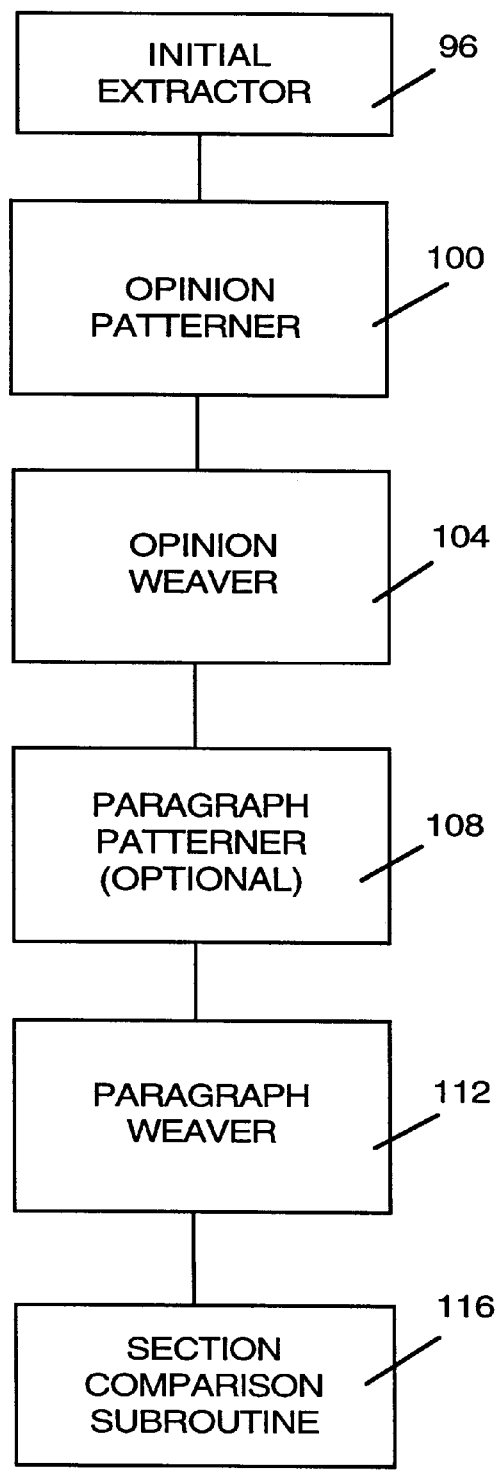
FIG. 3B is a flow chart illustrating a possible sequence of the specific subroutines that are executed during one stage of the Proximity Indexing Application Program. The subroutines are the Initial Extractor Subroutine, Opinion Patterner Subroutine, the Opinion Weaver Subroutine, the Paragraph Patterner Subroutine (Optional), the Paragraph Weaver Subroutine and the Section Comparison Subroutine.
Figure 3C:
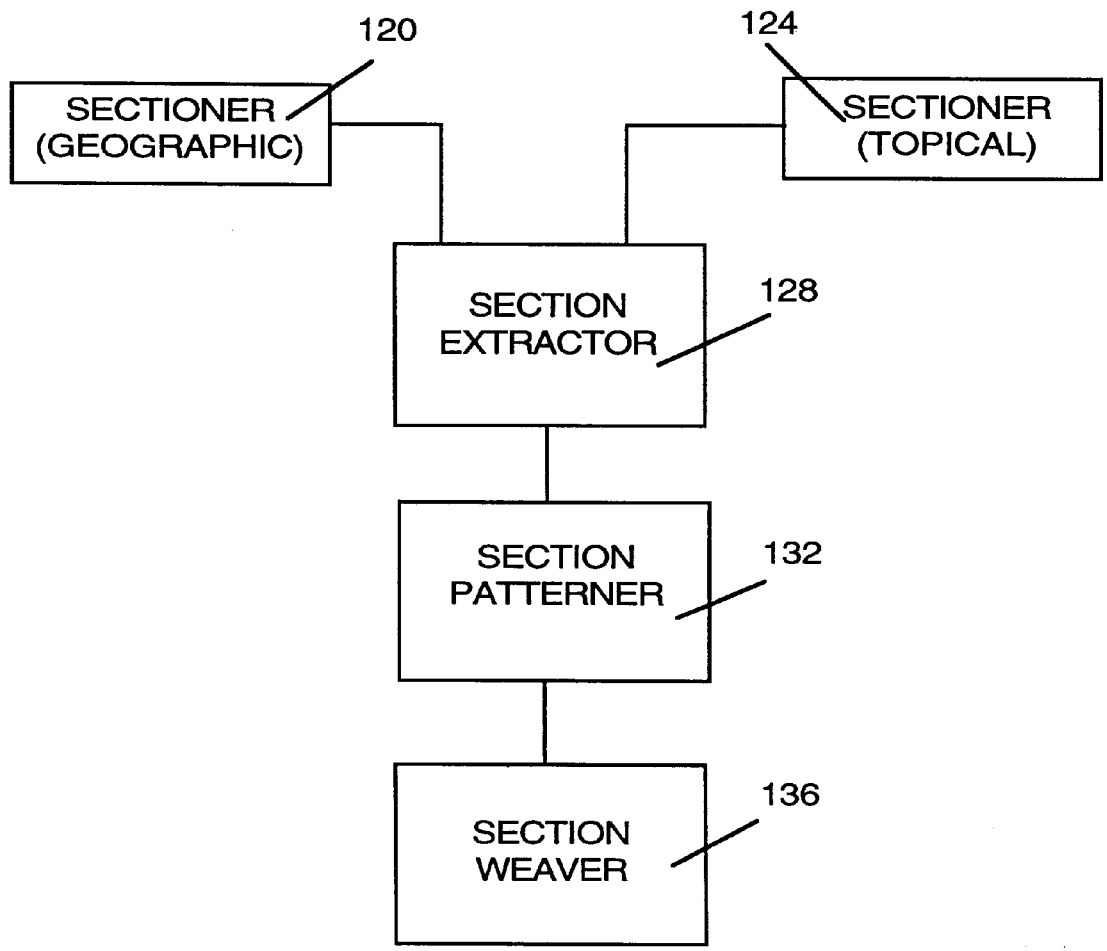
FIG. 3C is flow chart illustrating a possible sequence of subroutines that are executed after the Section Comparison Subroutine. The Section Comparison Subroutine may comprise the Sectioner-Geographic Subroutine and the Section-Topical Subroutine (Optional). The sequence of subroutines executed after the Section Comparison Subroutine are the Section Extractor Subroutine, the Section Patterner Subroutine and the Section Weaver Subroutine.
Figure 3D:
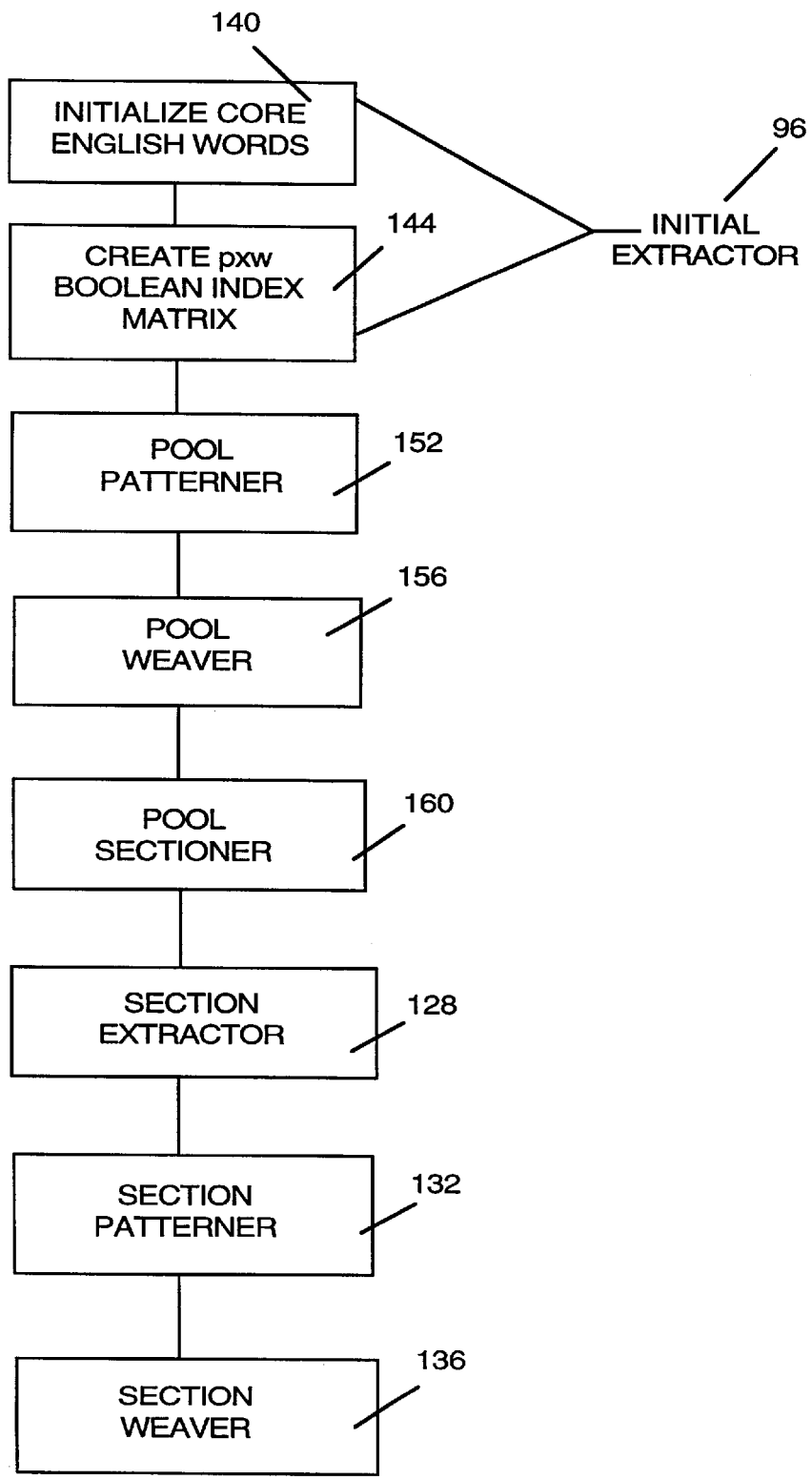
FIG. 3D is a high level flow chart illustrating a possible sequence of subroutines that comprise the Boolean Indexing Subroutine which are executed during another stage of the Proximity Indexing Application Program. The first two subroutines, Initialize Core English Words and Create p×w Boolean Matrix, are executed by the Initial Extractor Subroutine. The results are then run through the Pool-Patterner Subroutine, the Pool-Weaver Subroutine, the Pool-Sectioner Subroutine, the Section-Extractor Subroutine, the Section-Patterner Subroutine and the Section Weaver Subroutine.

FIGS. 3A to 3D depict examples of the procedures and subroutines of a Proximity Indexing Application Program 62, and possible interactions among the subroutines. FIG. 3A depicts a sequence of procedures followed by the Proximity Indexing Application Program 62 to index textual objects for searching by the CSPDM 66. FIG. 3B depicts specific subroutines that the Proximity Indexing Application Program 62 executes to partition full textual objects into smaller sections. FIG. 3C depicts subroutines executed by the Section Comparison Routine of FIG. 3B and subsequent possible subroutines to format and index the sections. FIG. 3D depicts a sequence of subroutines of the Proximity Indexing Application Program 62 which first sections and then indexes these sections of "core english words" 140 contained in the database 54. "Core english words" 140 are words that are uncommon enough to somewhat distinguish one textual object from another. The word searches of the CSPDM 66 search these sections of core English words to determine which textual objects to retrieve.

FIGS. 3E–3H show a preferred embodiment for representing the data in a database 54 or documents in a network in accordance with the present invention. The application of this method for representing documents on a network is described in greater detail later in this specification.

Figure 3E:
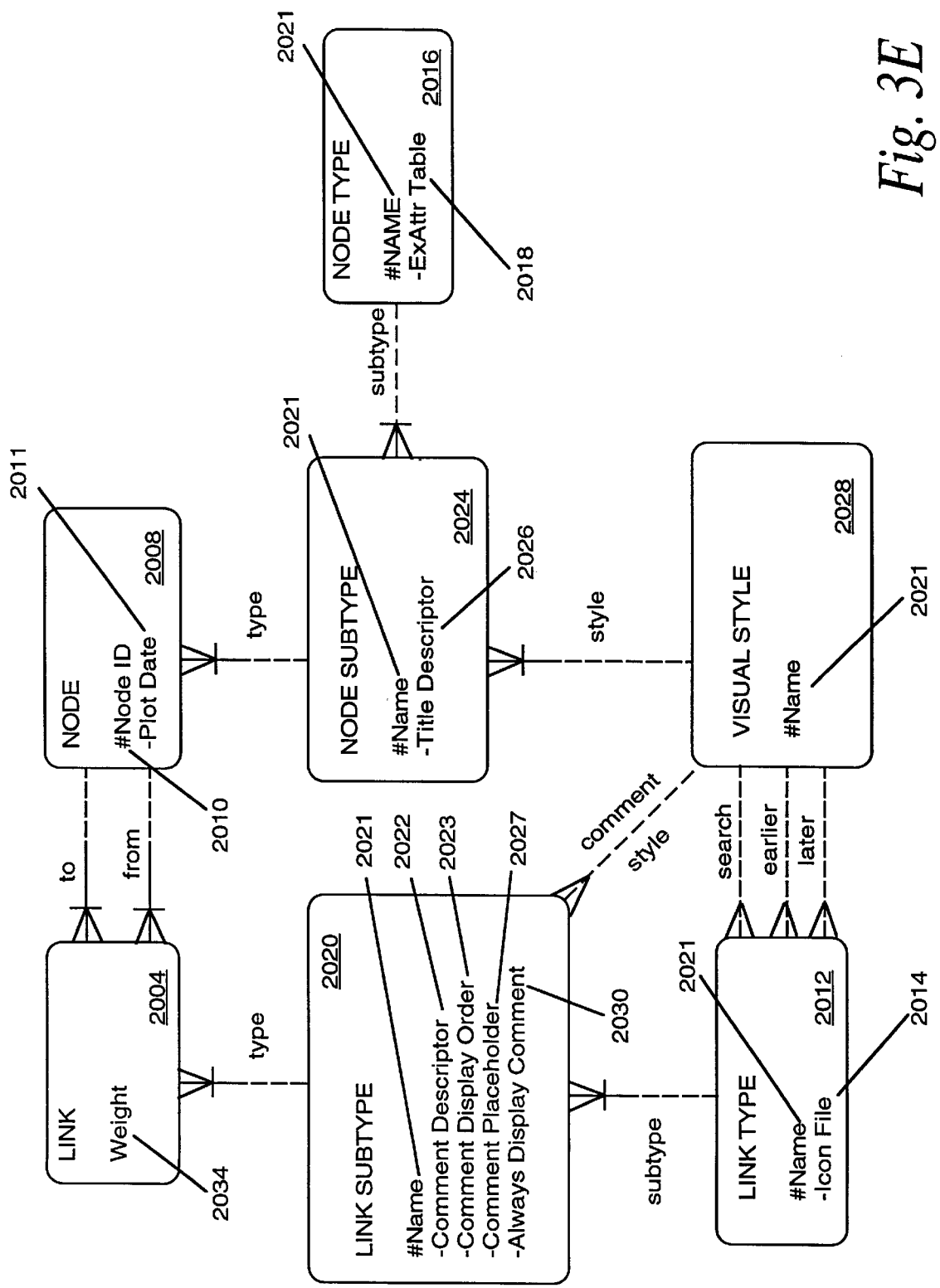
FIG. 3E is a chart illustrating the database format. The figure shows the types of structures contained within the database, links, link types, link subtypes, nodes, node types, node subtypes, and visual styles and also shows the various types of information that can be assigned to the links and nodes, including weights, identifications, names, comments, icons, and attributes.

FIG. 3E shows a method for representing the data using the present invention. Specifically, FIG. 3E shows a method in which links 2004 and nodes 2008 can be used along with link types 2012, link subtypes 2020, node types 2016 and node subtypes 2024 to represent the data.

A node 2008 is any entity that can be represented by a box on a display 38 such as a GUI 70. A node 2008 might be, for example, an object in a database 54, a portion of an object in a database 54, a document, a section of a document, a World Wide Web page, or an idea or concept, such as a topic name. A node 2008 need not represent any physical entity such as an actual document. It is preferred that a node 2008 have links 2004, specifically, it is preferred that a node 2008 have links to other nodes 2008 (for example source links (a source link is a link 2004), or influence links (an influence link is a link 2004)). A node 2008 can represent any idea or concept that has links to other ideas or concepts. For example, two nodes 2008 can exist such as a node 2008 called Modem Architecture (not shown) and a node 2008 called Classical Architecture (not shown) and the links would show that Classical Architecture is a source for Modern Architecture and that Modem Architecture is influenced by Classical Architecture. In this example, a source link 2004 and an influence link 2004 would exist between the two nodes 2008. (Many times, links 2004 represent inverse relationships such as source links 2004 and influence links 2004, and one type of link may be derived or generated from analysis of another link.)

More specifically, in the preferred embodiment, the software defines a node 2010 as something that has a unique node 2008 identification, a node type 2016, a node subtype 2024, and an associated date (or plot date 2011). Node types 2016 or subtypes 2024 may have names 2021 or identifications, title descriptors 2026 and external attributes 2018. A node 2008 may have a corresponding numerical representation assigned, a vector, a matrix, or a table. In the preferred embodiment a table format is used for the nodes.

Figure 3F:
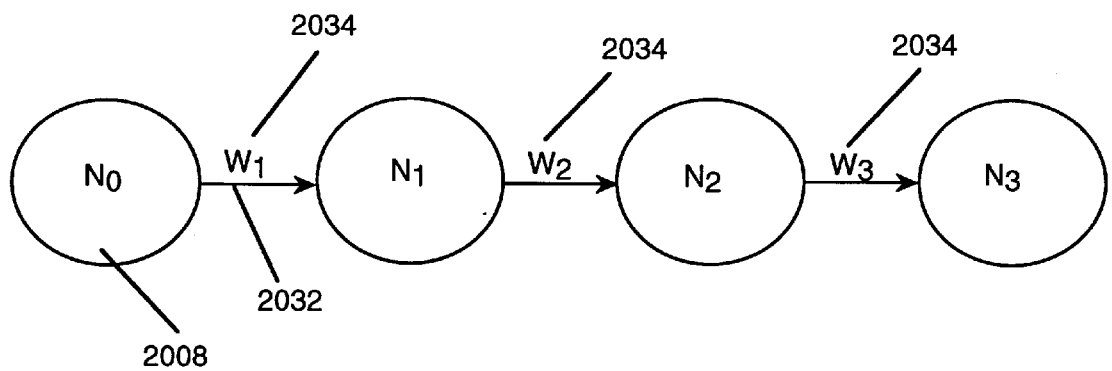
FIG. 3F is a high level diagram showing a sequence of nodes, $N_o$–$N_3$, connected by direct links which have weights $W_1$–$W_3$.
Figure 3G:
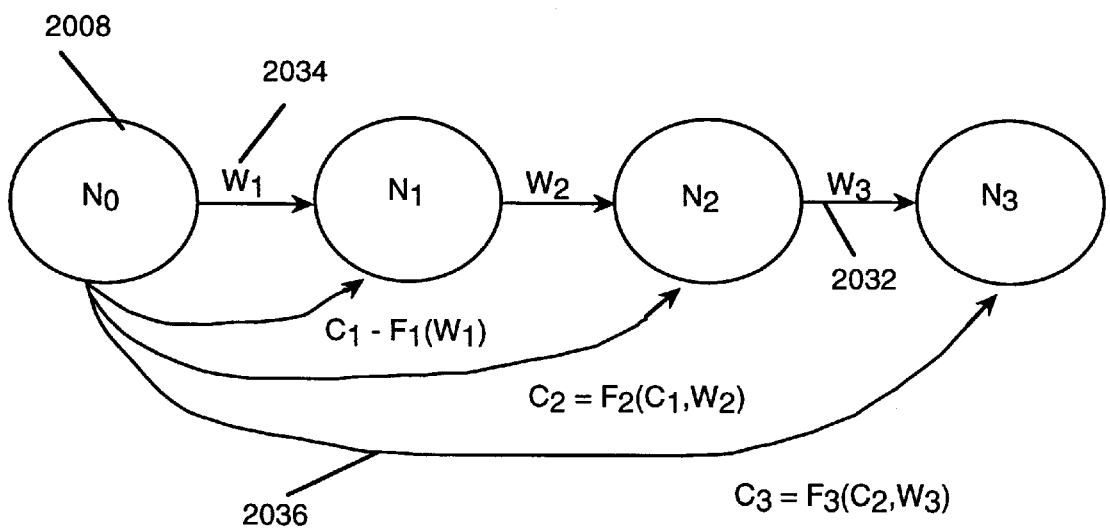
FIG. 3G is a high level diagram showing a sequence of nodes, $N_1$–$N_3$, connected by direct and indirect links. The set of cluster links are also shown in the figure as functions of the weights associated with the direct links and the weight of the previous cluster link.

Referring to FIGS. 3E, 3F, and 3G, a link 2004 is another name or identification for a relationship between two nodes 2008. The relationship may be semantical, non-semantical, stated, implied, direct 2032, indirect 2036, actual, statistical and/or theoretical. A link 2004 can be represented by a vector or an entry on a table and contain information for example, a from-node identification 2010 (ID), a to-node ID 2010, a link type 2012, and a weight 2034. A group of links 2004 may be represented by a series of vectors or entries in a table, a link table. Link subtypes 2020 may be used, named and assigned comments.

In addition, to better integrate the GUI 70 and the data representation, visual styles 2028 may be assigned for example to nodes 2008, links 2004, link types 2012, and link subtypes 2020 to assist in the visual displays 38.

In the preferred embodiment, three types of links 2004 are used: source links 2004, influence links 2004 and cluster links 2004. Source links 2004 generally link a first node 2008 to second node 2008 that represents information or documentation specifically cited or referred to by the first node 2008. Influence links 2004 are generally the inverse of a source link 2004. The relationships represented by these links 2004 may be explicit or implied.

Links 2004 and nodes 2008 may be manually entered by a user or automatically generated by a computer 30. It is preferred that cluster links 2004 be generated automatically by a processor. A cluster link 2004 is a relationship between two nodes 2008, for example, two nodes 2008 both directly linked to the same intermediate nodes 2008, may be indirectly linked through many paths and therefore have a cluster link 2004 between them. The cluster links 2004 may be determined using the specific or general methods described later for finding relationships in a database 54. However, the preferred method is through using a Proximity Indexing Application Program 62.

"Proximity indexing" is a method of indexing that uses statistical techniques and empirically generated algorithms to organize and categorize data stored in databases or on a network. The Proximity Indexing Application Program 62 applies the Proximity indexing method to a database 54. One embodiment of the present invention uses the Proximity Indexing Application Program 62 to Proximity index textual objects used for legal research by indexing objects based on their degree of relatedness—in terms of precedent and topic—to one another.

Applying the method to legal research, the "Proximity indexing" system treats any discrete text as a "textual object." Textual objects may contain "citations," which are explicit references to other textual objects. Any legal textual object may have a number of different designations of labels. For example, 392 U.S. 1, 102 S.Ct 415, 58 U.S.L.W. 1103, etc. may all refer to the same textual object.

Cases are full textual objects that are not subsets of other textual objects. Subjects of a full textual object include words, phrases, paragraphs, or portions of other full textual objects that are referred to in a certain full textual object. (The system does not treat textual objects as subsets of themselves.)

Every case, or "full" textual object, is assigned a counting-number "name"—designated by a letter of the alphabet in this description—corresponding to its chronological order in the database 54. Obviously, textual objects may contain citations only to textual objects that precede them. In other words, for full textual objects, if "B cites A," (i.e. "A is an element of B" or "the set 'B' contains the name 'A'"), textual object A came before B, or symbolically, A<B. Every textual object B contains a quantity of citations to full textual objects, expressed as Q(B), greater than or equal to zero, such that Q(B)<B.

Textual objects other than full textual objects may be subsets of full textual objects and of each other. For example, a section, page, or paragraph of text taken from a longer text may be treated as a textual object. Phrases and words are treated as a special kind of textual object, where Q(w)=0. Sections, pages, and paragraphs are generally subsets of only one full textual object, and may be organized chronologically under the numerical "name" of that full textual object. For purposes of chronology, phrases and words are treated as textual objects that precede every full textual object, and can generally be treated as members of a set with name "0," or be assigned arbitrary negative numbers.

Any two textual objects may be related to each other through a myriad of "patterns." Empirical research demonstrates that eighteen patterns capture most of the useful relational information in a cross-referenced database 54. A list of these eighteen patterns, in order of importance, follows:

Given that:
 a, b, c<A;
 A<d, e, f<B; and
 B<g, h, i.

Patterns Between A and B Include

1. B cites A.
2. A cites c, and B cites c.
3. g cites A, and g cites B.
4. B cites f, and f cites A.
5. B cites f, f cites e, and e cites A.
6. B cites f, f cites e, e cites d, and d cites A.
7. g cites A, h cites B. g cites a, and h cites a.
8. i cites B, i cites f [or g], and f [or g] cites A.
9. i cites g, i cites A, and g cites B.
10. i cites g [or d], i cites h, g [or d] cites A, and h cites B.
11. i cites a, i cites B, and A cites a.
12. i cites A, i cites e, B cites e.
13. g cites A, g cites a, A cites a, h cites B, and h cites a.
14. A cites a, B cites d, i cites a, and i cites d.
15. i cites B, i cites d, A cites a, and d cites a.
16. A cites b, B cites d [or c], and d [or c] cites b.
17. A cites b, B cites d, b cites a, and d cites a.
18. A cites a, B cites b, d [or c] cites a, and d [or c] cites b.

Figure 6:
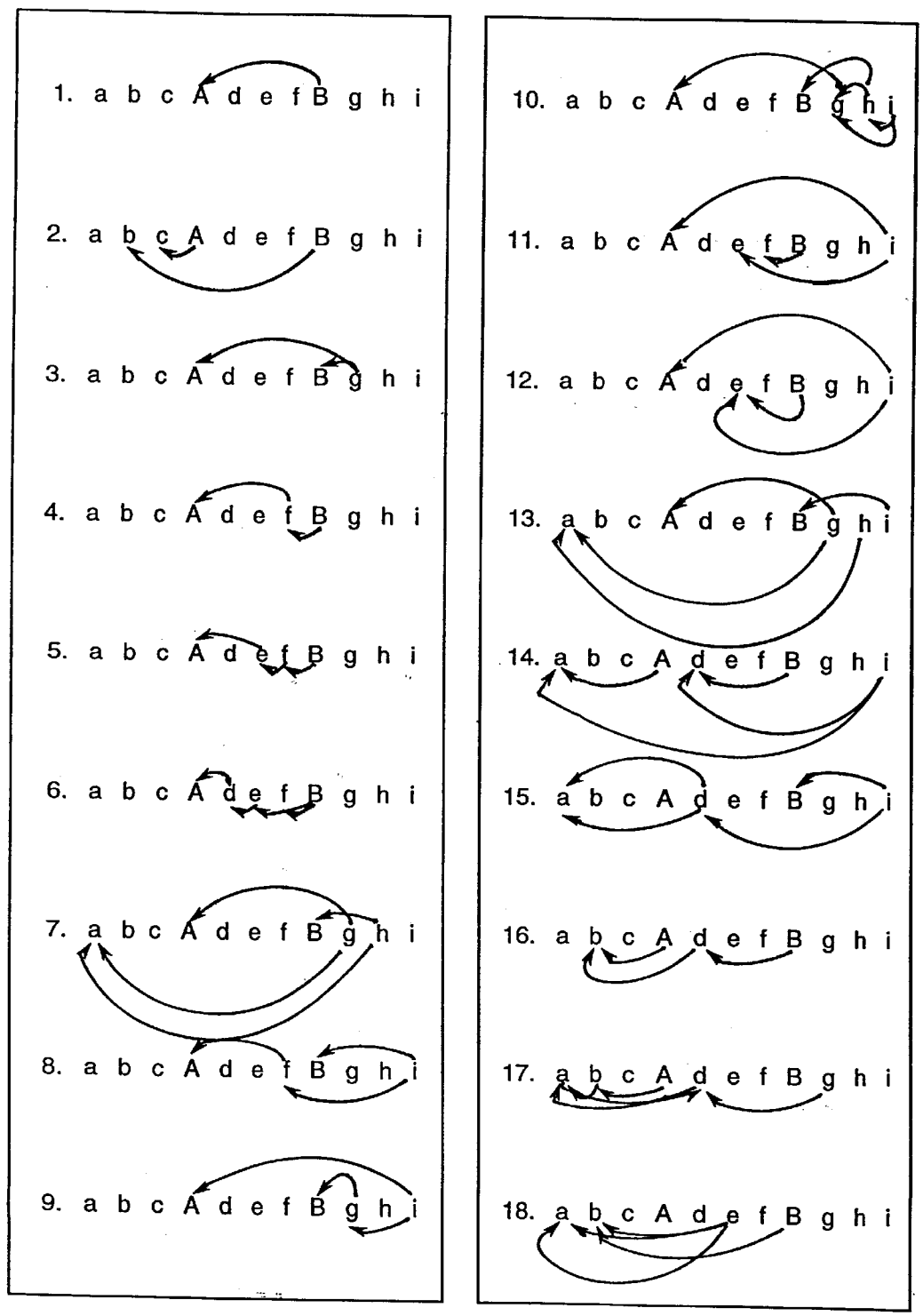
FIG. 6 depicts a schematic representation of eighteen patterns.

These 18 patterns are shown schematically in FIG. 6.
(For a discussion on probability theory and statistics, see Wilkinson, Leland; SYSTAT: The System for Statistics; Evanston, Ill.: SYSTAT Inc., 1989 incorporated herein by reference.) Some patterns occur only between two full textual objects, and others between any two textual objects; this distinction is explained below.

Semantical patterning is only run on patterns number one and number two, shown above.

For purposes of explaining how patterns are used to generate the Proximity Index, only the two simplest patterns are illustrated.

The simplest, Pattern #1, is "B cites A." See FIG. 6. In the notation developed, this can be diagramed: a b c A d e f B g h i, where the letters designate textual objects in chronological order, the most recent being on the right, arrows above the text designate citations to A or B, and -arrows below the text designate all other citations. The next simplest pattern between A and B, Pattern #2, is "A cites c, and B cites c," which can also be expressed as "there exists c, such that c is an element of (A intersect B)." See Appendix #1. This can be diagramed: a b c A d e f B g h i. For every textual object c from 0 to (A−1), the existence of Pattern #2 on A and B is signified by 1, its absence by 0. This function is represented as P#2AB(c)=1 or P#2AB(c)=0. The complete results of P#1AB and P#2AB can be represented by an (A)×(1) citation vector designated X.

The functions of some Patterns require an (n)×(1) matrix, a pattern vector. Therefore it is simplest to conceive of every Pattern function generating an (n)×(1) vector for every ordered pair of full textual objects in the database 54, with "missing" arrays filled in by 0s. Pattern Vectors can be created for Pattern #1 through Pattern #4 by just using the relationships among textual object A and the other textual objects in the database 54 and among textual object B and the other textual objects in the database 54. Pattern Vectors for Patterns # 5 through # 18 can only be created if the relationship of every textual object to every other textual object is known. In other words, Pattern Vectors for Patterns # 1 through # 4, can be created from only the rows A and B to the Citation Matrix but Pattern Vectors for Patterns #5 through #18 can only be created from the whole Citation Matrix.

(total textual objects c)/(theoretical maximum textual objects c) $[(x)(x)^T/TMax]$,
(total textual objects c)/(actual maximum textual objects c) $[(x)(x)^T/AMax]$
frequency of object c per year [f], and
the derivative of the frequency [f'].

In pattern # 2, given that A<B, the theoretical maximum ("TMax") number Q(A intersect B)=A minus 1. The actual maximum possible ("AMax"), given A and B, is the lesser of Q(A) and Q(B). The ratios "$X(X)^T/TMax$" and "$X(X)^T/AMax$," as well as the frequency of occurrence of textual objects c per year, f2(A, B), and the first derivative f'2(A, B), which gives the instantaneous rate of change in the frequency of "hits," are all defined as "numerical factors" generated from patterns #1 and #2. These are the raw numbers that are used in the weighing algorithm.

For Pattern #2, the total number of possible textual objects c subject to analysis, i.e., TMax, is A−1, one only for the years at issue which are those up to the year in which A occurred. However, a relationship may remain "open," that is, it may require recalculation of f(x) and f'(x) as each new textual object is added to the database 54, (for a total of n cases subject to analysis).

The "numerical factors" for all eighteen patterns are assigned various weights in a weighing algorithm used to generate a scalar F(A, B). The function F generates a scalar derived from a weighted combination of the factors from all eighteen patterns. The patterns are of course also weighted by "importance," allowing Supreme Court full textual objects to impose more influence on the final scalar than District Court full textual objects, for example. The weighing of the more than 100 factors is determined by empirical research to give results closest to what an expert human researcher would achieve. The weighing will vary depending upon the type of material that is being compared and the type of data in the database 54. (See Thurstone. The Vectors of Mind, Chicago, Ill.: University of Chicago Press, 1935, for a description of factor loading and manipulating empirical data incorporated herein by reference.) In a commercial "Proximity Indexer" it will be possible to reset the algorithm to suit various types of databases.

A scalar F(A, B) is generated for every ordered pair of full cases in the database 54, from F(1, 2) to F(n−1, n). F(z,z) is defined as equal to 0.

The full results of F(A,B) are arranged in an (n)×(n) matrix designated F. Note that F(B, A) is defined as equal to F(A, B), and arrays that remain empty are designated by 0. For every possible pairing of cases (A,B), a Euclidean distance D(A,B) is calculated by subtracting the Bth row of Matrix F from the Ath row of Matrix F. In other words:

$$D(A,B)=[(F(1, A)-F(1, B))^2+(F(2, A)-F(2, B))^2+ \ldots +(F(n, A)-F(n, B))^2]^{1/2}.$$

A function designated D(A,B) generates a scalar for every ordered pair (A,B), and hence for every ordered pair of textual objects (A,B) in the database 54. The calculations D(A,B) for every ordered pair from D(1,1) to D(n,n) are then arranged in an (n)×(n) "proximity matrix" D. Every column vector in D represents the relationship between a given case A and every other case in the database 54. Comparing the column vectors from column A (representing textual object A) and column B (representing textual object B) allows one to identify their comparative positions in n-dimensional vector space, and generate a coefficient of similarity, S(A,B), from 0–100%, which is more precise and sophisticated than F(A,B) or D(A,B) alone. A similarity subroutine can run directly on F(A,B). However, the real power of the Proximity Matrix D is that it allows one to identify "groups" or "clusters" of interrelated cases.

Through factor loading algorithms, the relationships represented by D for "n" cases can be re-represented in a vector space containing fewer than "n" orthogonal vectors. This knowledge can be reflected in S(A,B).

The Proximity Indexing Application Program 62 is an application program that applies the above techniques and algorithms to index and format data to be searched by the CSPDM 66.

FIG. 3A describes the overall procedure of the Proximity Indexing Application Program 62. The first stage initializes the data 74 in the database 54. The second stage determines the relationships between full textual objects 78. The third stage determines the relationships between paragraphs of each textual object and each full textual object 80. The fourth stage clusters related paragraphs using factor loading and empirical data and then groups the paragraphs into sections based on such data 84. The fifth stage determines the relationships between the sections 88. In the final stage, the sectioned textual objects are not further processed until commands are received from the CSPDM Routine 92.

The following description of FIG. 3B and FIG. 3C elaborates on this general procedure by describing specific subroutines of a Proximity Indexing Application Program 62. The following is a step by step description of the operation of the Proximity Indexing Application Program 62.

Section A Initial Extractor Subroutine 96

FIG. 3B describes subroutines for the first portion of the preferred Proximity Indexing Application Program 62. The first subroutine of the Proximity Indexing Applications Program is the Initial Extractor Subroutine 96. The Initial Extractor Subroutine 96 performs three primary functions: Creation of the Opinion Citation Matrix, creation of the Paragraph Citation Matrix, and creation of Boolean Word Index.

The following steps are performed by the Initial extractor subroutine 96.

1. Number all full textual objects chronologically with arabic numbers from 1 through n.

2. Number all paragraphs in all the full textual objects using arabic numbers from 1 through p.

3. Identify the page number upon which each paragraph numbered in step two above begins.

4. Create Opinion Citation Vectors (X). By comparing each full textual object in the data base to every other full textual object in the data base that occurred earlier in time.

5. Combine Opinion Citation Vectors to create the bottom left half portion of the n×n Opinion citation matrix.

6. Create a mirror image of the bottom left half portion of the Opinion citation matrix in the top right half portion of the same matrix, to complete the matrix. In this manner only $n^2/2$ comparisons need to be conducted. The other ½ of the comparisons are eliminated.

7. Create the p×n Paragraph Citation Vectors by comparing each paragraph to each full textual object that occurred at an earlier time. This will require (n/2)p searches.

8. Create a Paragraph Citation Matrix by combining Paragraph Citation Vectors to create the bottom left half portion of the matrix.

9. Complete the creation of the Paragraph Citation Matrix by copying a mirror image of the bottom left half portion of the matrix into the top right half portion of the matrix.

10. Initialize the Initial Extractor Subroutine 96 with a defined set of core English words 140.

11. Assign identification numbers to the core English words 140. In the preferred embodiment 50,000 English words are used and they are assigned for identification the numbers from −50,000 to −1.

12. Create a Boolean Index Matrix 144 with respect to the core English words by searching the database 54 for the particular word and assigning the paragraph number of each location of the particular word to each particular word. This procedure is described in greater detail in FIG. 3D.

Section B Opinion Patterner Subroutine 100

The Opinion Patterner Subroutine 100 performs three primary functions: Pattern analysis 6n matrices, calculation of the numerical factors and weighing the numerical factors to reach resultant numbers.

13. Process the Opinion Citation Matrix through each of the pattern algorithms described above and in FIG. 6 for each ordered pair of full textual objects to create opinion pattern vectors for each pattern and for each pair of full textual objects. The pattern algorithms determine relationships which exist between the ordered pair of textual objects. The first four pattern algorithms can be run utilizing just the Opinion Citation Vector for the two subject full textual objects. Each pattern algorithm produces a opinion pattern vector as a result. The fifth through eighteenth pattern algorithms require the whole Opinion Citation Matrix to be run through the Opinion Patterner Subroutine 100.

14. Calculate total hits (citation) for each pattern algorithm. This can be done by taking the resultant opinion pattern vector (OPV) and multiplying it by the transposed opinion pattern vector $(OPV)^T$ to obtain a scalar number representing the total hits.

15. Calculate the theoretical maximum number of hits. For example, in the second pattern, the theoretical maximum is all of the full textual objects that occur prior in time to case A (A−1).

16. Calculate the actual maximum number of hits. For example, in the second pattern, the actual maximum possible number of hits is the lesser of the number of citations in full textual object Q(A) or full textual object Q(B).

17. Calculate the total number of hits (citations) per year. This is labeled f(A,B).

18. Calculate the derivative of the total change in hits per year. This is the rate of change in total hits per year and is labeled f′ (A,B).

19. Calculate the ratio of total hits divided by theoretical max $[((OFV)(OVP)^{t/TMAX})$.

20. Calculate the ratio of the total hits divided by the actual maximum $[(OPV)(OPV)^t{}_{/AMAX}]$.

21. Calculate a weighted number F(A,B) which represents the relationship between full textual object A and full textual object B. The weighted number is calculated using the four raw data numbers, two ratios and one derivative calculated above in steps 14 through 20 for each of the 18 patterns. The weighing algorithm uses empirical data or loading factors to calculate the resulting weighted number.

22. The Opinion Patterner Subroutine 100 sequence for the Opinion Citation Matrix is repeated n−1 times to compare each of the ordered pairs of full textual objects. Therefore, during the process, the program repeats steps 13 through 21, n−1 times.

23. Compile the Opinion Pattern Matrix by entering the appropriate resulting numbers from the weighing algorithm into the appropriate cell locations to form an n×n Opinion Pattern Matrix.

Section C The Opinion Weaver Subroutine 104

The Opinion Weaver Subroutine 104 shown in FIG. 3B, performs two primary tasks: calculation of the Opinion Proximity Matrix and calculation of the Opinion Similarity Matrix. The Opinion Proximity Matrix D is generated by calculating the Euclidean Distance between each row A and B of the Opinion Pattern Matrix (D(A,B)) for each cell DC(A,B). The Opinion Similarity Matrix is generated by calculating the similarity coefficient from 0 to 100 between each row A and B of the Opinion Proximity Matrix (S(A,B)) in each cell SC(A,B) in matrix S.

24. Calculate the n×n Opinion Proximity Matrix. To calculate D(A,B) the program takes the absolute Euclidian distance between column A and column B of the n×n Opinion Pattern Matrix. The formula for calculating such a distance is the square root of the sum of the squares of the distances between the columns in each dimension, or:

$$D(A,B)=[(F(1,A)-F(1,B))^2+(F(2,A)-F(2,B))^2+ \ldots +(F(N,A)F(N,B))^2]^{1/2}$$

The Opinion Proximity Matrix created will be an n×n matrix. The smaller the numbers in the Opinion Proximity Matrix the closer the relationship between full textual object A and full textual object B.

25. Create n×n Opinion Similarity Matrix. To calculate the Opinion Similarity Matrix each scalar number in the Opinion Proximity Matrix is processed through a coefficient of similarity subroutine which assigns it a number between 0 and 100. By taking the coefficient of similarity, the program is able to eliminate full textual objects which have Euclidian distances that are great. (For example, a Euclidean distance that is very large and is run through the coefficient of similarity would result in a very low coefficient of similarity. Euclidean distances resulting in similarities below four are eliminated in the preferred embodiment).

Section D Paragraph Patterner Subroutine 108 (Optional)

26. Obtain the p×n Paragraph Citation Matrix calculated by the Initial Extractor Subroutine 96.

27. Run each ordered pair of rows of the p×n Paragraph Citation Matrix for an individual full textual object i through the pattern algorithms number one and two and determine the resultant Paragraph Pattern Vector.

28. Calculate the various numerical factors (AMax, TMax, etc.) by evaluating the values in the Paragraph Pattern Vector.

29. Run the Paragraph Pattern Vector and the numerical factors through the weighing algorithm to determine the appropriate value for each cell of the $c_i \times n$ Partial Paragraph Pattern Matrix where $c_i$ is the number of paragraphs in full textual object i.

30. Repeat steps 27 through 29 for each full textual object i where i=1 to n, to create the $p \times n$ Paragraph Pattern Matrix.

Section E Paragraph Weaver Subroutine 112

31. Calculate the Euclidean distance of each ordered pair of rows of either the $p \times n$ Paragraph Citation Matrix or the $p \times n$ Paragraph Pattern Matrix for a single full textual object i.

32. Place the resultant Euclidean distance values in the appropriate cell of the $c_i \times c_i$ Paragraph Proximity Matrix where $c_i$ is the number of paragraphs in full textual object i, where 0<i<n+1.

33. Repeat steps 31 through 32 n times in order to calculate n different Paragraph Proximity Matrices (one for each full textual object i).

34. The Section Comparison Subroutine 116 clusters all p paragraphs in the database 54 into sections. Then the sections are compared and indexed in the database 54. This procedure is described in greater detail in FIG. 3C.

FIG. 3C depicts possible subroutines that the Section Comparison Subroutine 116 comprises. The subroutines are the Sectioner Geographical Subroutine 120, the Sectioner Topical Subroutine 124 (Optional), the Section Extractor Subroutine 128, the Section Patterner Subroutine 132 and the Section Weaver Subroutine 136. Section F Sectioner Geographical Subroutine 120

35. For each full textual object i, the Sectioner Geographical Subroutine 120 uses the corresponding $c_i \times c_i$ Paragraph Proximity Matrix and a contiguity factor for each paragraph to determine which paragraphs may be clustered into sections. Sections are made up of continuous paragraphs that are combined based upon weighing their Euclidean distances and contiguity.

36. Repeat step 35 for all n full textual objects until all p paragraphs are grouped into q sections.

Section H Sectioner Topical Subroutine 124 (Optional)

37. The Sectioner Topical Subroutine 124 provides additional assistance to the Sectioner Geographical Subroutine 120 by considering the factor of topical references to determine the q sections.

38. For the total number of discrete references "z" to each full textual object in a particular full textual object, a $z \times z$ Citation Proximity Matrix is formed by comparing the Euclidean distances between each reference to a full textual object contained in each paragraph and calculating the topical weight given to each paragraph.

Section I Section Extractor Subroutine 128

39. The Section Extractor Subroutine 128 numbers each section created by the Sectioner Geographical Subroutine 120 and Sectioner Topical Subroutine 124 Subroutines from 1 to q.

40. The Sectioner Extractor Subroutine 128 creates a $q \times q$ Section Citation Matrix by determining which sections refer to every other section.

Section J Section Patterner Subroutine 132 (shown in FIG. 3C)

41. The Section Patterner Subroutine 132 then calculates 18 Section Pattern Vectors corresponding to each row of the $q \times q$ Section Citation Matrix using the 18 pattern algorithms.

42. From the Section Pattern Vectors, the numerical factors (AMax, TMax, etc.) are calculated.

43. The weighing algorithm evaluates the numerical factors and the Section Pattern Vectors and determines the values for each cell of the $q \times q$ Section Pattern Matrix.

Section K Section Weaver Subroutine 136

44. The Section Weaver Subroutine 136 calculates the Euclidean distances between each row of the $q \times q$ Section Pattern Matrix and creates a $q \times q$ Section Proximity Matrix.

45. The Section Weaver Subroutine 136 then creates a $q \times q$ Section Similarity Matrix with coefficients 0 to 100 using the values of the Section Proximity Matrix and empirical data and factor loading.

Section L Semantical Clustering of a Boolean Index Routine 138

FIG. 3D depicts a possible Semantical Clustering of a Boolean Index Routine 138. (See Hartigan, J. A. *Clustering Algorithms.* New York: John Wiley & Sons, Inc., 1975, for detailed description of clustering algorithms incorporated herein by reference.) The Semantical Clustering routine of a Boolean Index 138 indexes the textual objects according to the similarity of phrases and words contained within each textual object in a database 54. The routine comprises seven possible subroutines: the Initial Extractor Subroutine 96, the Pool Patterner Subroutine 152, the Pool Weaver Subroutine 96 the Pool Sectioner Subroutine 160, the Section Extractor Subroutine 128, the Section Patterner Subroutine 132 and the Section Weaver Subroutine 136, In fact, it is quite possible, using only semantical statistical techniques, to "Proximity-index" documents that do not refer to one another at all based on there Boolean indices.

Section M Initial Extractor Subroutine 96

46. As described in steps 10 and 11, the Initial Extractor Subroutine 96 initializes a set of core English words 140 and assigns each word a number. The preferred embodiment uses 50,000 discrete core English words and assigns each discrete core English word a number from −50,000 to −1.

47. The Initial Extractor Subroutine 96 then converts the core English words into a $p \times w$ matrix. The number of columns (w) represents the number of discrete core English words in the database 54 and the number of rows (p) represents the number of paragraphs in the database 54.

48. The Initial Extractor Subroutine 96 fills the $p \times w$ matrix by inserting a "1" in the matrix cell where a certain paragraph contains a certain word.

Section N Pool Patterner Subroutine 152

49. The Pool Patterner Subroutine 152 creates two pattern algorithm vectors for only the first two patterns and determines values for the total number of hits, the theoretical maximum number of hits, the actual maximum number of hits, the total number of hits per year and the derivative of the total number of hits per year.

50. The weighing algorithm of the Pool Patterner Subroutine 152 uses empirical data and factor loading to determine values to enter into a $p \times w$ Paragraph/Word Pattern Matrix.

51. The Pool Weaver Subroutine 156 creates a $p \times w$ Paragraph/Word Pattern Matrix by filling the appropriate cell of the Matrix with the appropriate value calculated by the weighing algorithm.

52. The Pool Patterner Subroutine 152 creates a $p \times w$ Paragraph/Word Proximity Matrix taking the Euclidean distance between the rows of the Paragraph/Word Pattern Matrix.

Section O Pool Sectioner Subroutine 160

53. The Pool Sectioner Subroutine 160 evaluates the Euclidean distances in the Paragraph/Word Proximity Matrix and the contiguity factor of each paragraph to cluster the paragraphs (p) into a group of (v) sections and create a $v \times w$ Preliminary Cluster Word Matrix.

Section P Section Extractor Subroutine 128

54. The-Section Extractor Subroutine 128 numbers each section chronologically and creates a $v \times v$ Section Word Citation Matrix.

Section Q Section Patterner Subroutine 132

55. The Section Patterner Subroutine 132 evaluates the v×v Section Word Citation Matrix to create two word pattern vectors for only the first two patterns algorithms (described above and shown in FIG. 6) and determines numerical factors for the total number of hits, the theoretical maximum number of hits, the actual maximum number of hits, the total number of hits per year and the derivative of the total number of hits per year.

56. The Weighing algorithm uses empirical data and factor loading to weigh the numerical factors created from the word pattern vectors and uses the numerical factors and the word pattern vectors to determine values t o enter into a v×v Section Word Pattern Matrix.

Section R Section Weaver Subroutine 136

57. The Section Weaver Subroutine 136 creates a v×v Section Word Proximity Matrix by taking the Euclidean distance between the rows of the Section Word Pattern Matrix and placing the appropriate Euclidean distance value in the appropriate cell of the Section Word Proximity Matrix.

58. The Section Weaver Subroutine 136 create a v×v Section Word Similarity Matrix by evaluating the Euclidean distances from the Section Word Proximity Matrix and empirical data, and calculating the similarity coefficient for each order ed pair of sections, and places the value in the appropriate cell of the Section Word Similarity Matrix.

59. The Pool Searches of the CSPDM 66 evaluate the Section Word Similarity Matrix as well as other matrices to determine whether or not to retrieve a full textual object.

The following describes a preferred cluster link generator 2044 which implements a specific type of patterer or clustering system for use alone or in conjunction with other proximity indexing subroutines, and prior to searching. The cluster link generator 2044 analyzes a set of numerical representations of a database 54 and generates a second set of numerical representations of the database 54. This second set is stored in the RAM 34. This second set of numerical data can represent indirect 2036, direct 2032, or a combination of both direct 2032 and indirect 2036 relationships in the database 54. Preferably, the second set of numerical representations accounts for indirect 2036 relationships in the database 54. It is preferred that the first and second set of numerical data be in a table format and that-the first set represent direct 2032 relationships or links and the second set represent cluster links 2004.

Figure 3H:
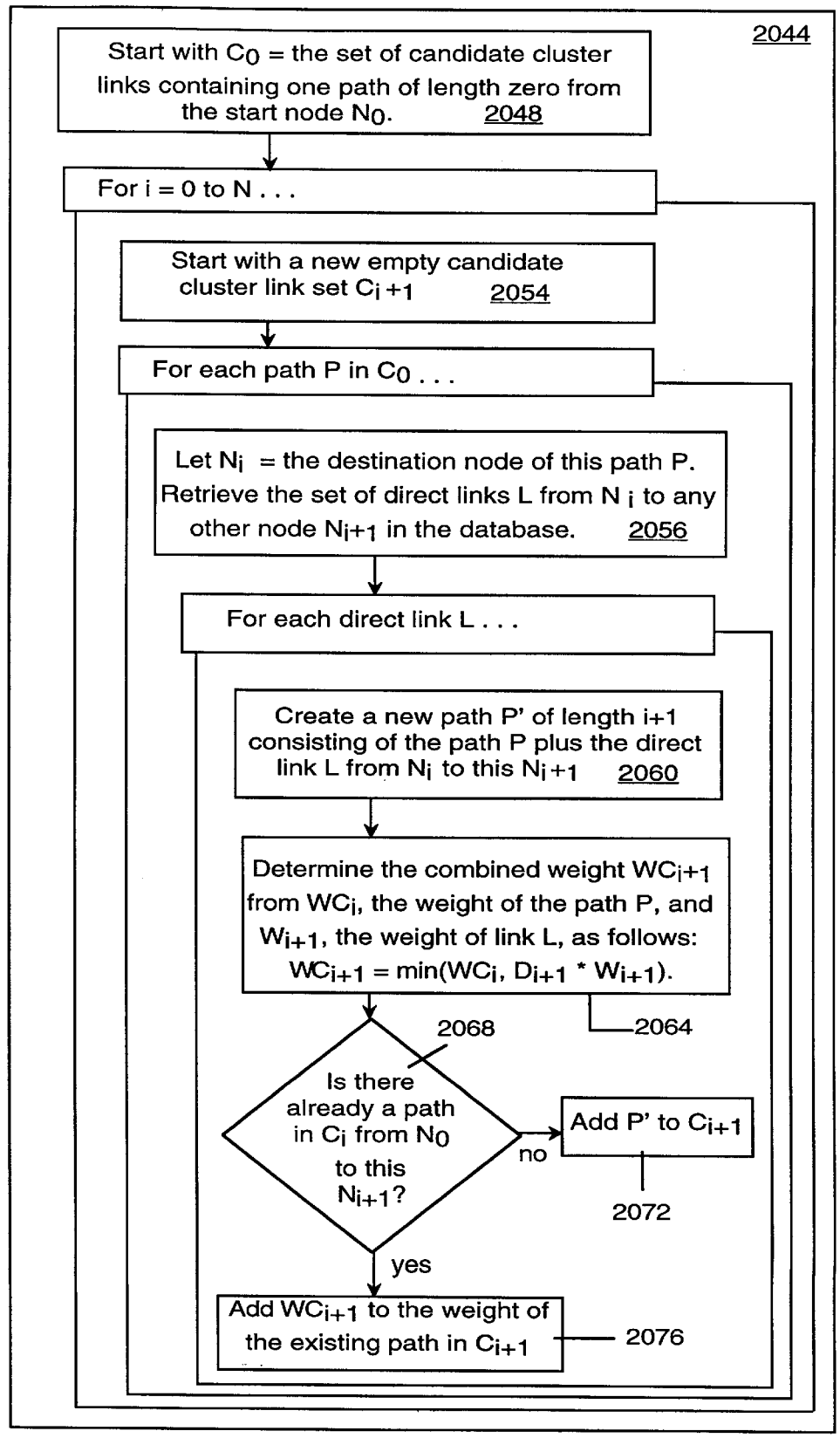
FIG. 3H is a flow chart which depicts the Cluster Link Generation Algorithm.

Referring to FIG. 3H, the cluster link generation algorithm 2044 analyzes links to generate a set of cluster links 2004. More specifically, the cluster link generation algorithm 2044 generates a set of cluster links 2004 by analyzing direct 2032 and/or indirect relationships 2036 between nodes 2008 or between objects in a database 54 and generates a set of cluster links 2004.

In the preferred embodiment, the cluster link generator 2044 analyzes direct links 2004 (for example source links 2004 and influence links 2004). These direct links 2032 may be represented by a table or series of vectors. The cluster link generator 2044 then locates indirect relationships 2036 between nodes 2008 or objects in a database 54. The indirect relationships 2036 are preferably made up of direct links 2032. The indirect relationship 2036 paths are preferably made up of direct links 2004. The cluster link generator 2040 then generates a set of cluster links 2004 based upon both the direct links 2032 and on the indirect relationships. The set of cluster links 2004 may be represented by a table or a series of vectors. Another embodiment of this invention uses candidate cluster links 2004 to provide a more efficient search. Candidate cluster links are the set of all possible cluster links 2004 between a search node 2008 and a target node 2004. In this embodiment, only a subset of the candidate cluster links 2004, the actual cluster links 2004, which meet a certain criteria are used to locate nodes 2008 for display.

Consider a set of nodes 2008 $N_0 \ldots N_3$ connected by a sequence of direct links 2032 whose weights 2034 are given by $W_1 \ldots W_3$, as shown in FIGS. 3F.

Node 2008 $N_1$ is reachable from $N_0$ through a path $P_1$ of length 1 (that is, $N_0 \rightarrow N_1$); node 2008 $N_2$ is reachable through a path $P_2$ of length 2 ($N_0 \rightarrow N_1 \rightarrow N_2$); and so on.

Each path P provides some evidence that the start node 2008 ($N_0$) and destination node 2008 ($N_1$, $N_2$, or $N_3$) are related to some extent. The strength of the indirect relationship 2036 depends on a length L of the path P and on the weights 2034 of the individual direct links 2032 along that path P.

In FIG. 3G, the indirect relationship 2036 from $N_0$ to $N_1$, $N_2$, and $N_3$ are shown as arcs.

The weight $C_1 \ldots C_3$ of each implied relationship, is a function of the weight 2034 from the path to the previous node 2008 and the weight 2034 of the last direct link 2032.

The individual functions F1 . . . F3 describe how to combine the weights 2034 of the direct links 2004 to determine the weight c of an indirect link 2036. Selecting appropriate functions is the key to making cluster link generation work well. A preferred definition of $F_N$ is as follows:

$$C_N = F_N(C_{N-1}, W_N) = \min(C_{N-1}, D_N * W_N),$$

where $D_N$ is a damping factor that decreases rapidly as N increases.

The cluster link algorithm 2044 determines the set of all paths P from a given start node 2008 $N_0$ that have a length less than or equal to a given length L. Each path is rated using the method described above. The paths are then grouped by destination node 2008; the candidate cluster link 2004 $C(N_0, N_N)$ between $N_0$ and a given destination node 2008 $N_N$ has a weight $C_N$ equal to the sum of the weights 2034 of all paths $P_N$ leading to $N_N$.

The set of all candidate cluster links 2004 is then sorted by weight 2034. A subset of the candidate links 2004 is chosen as actual cluster links 2004. The number of cluster links 2032 chosen may vary, depending on the number of direct links 2004 from $N_0$, and on the total number of candidate cluster links 2004 available to choose from.

Performance considerations and efficiency are more important with large databases than for small databases. For large databases, finding the set of all paths P from a given node 2008 $N_0$ that have a length less than or equal to a given length L may be impractical, since the number of unique paths may number in the tens of millions.

One embodiment of this invention uses candidate cluster links 2004 to provide a more efficient search. Candidate cluster links 2004 are the set of all possible cluster links 2004 between a start node (2008) and a destination node (2008).

Clearly, it is not necessary to examine millions of paths when the goal is to select the top or strongest duster links 2004 for each start node 2008 $N_0$ (for example, the top 20 to 25 cluster links 2004). The great majority of paths have an insignificant effect on the final results. What is needed is an implementation of the cluster link algorithm 2044 where the total number of paths examined is bounded, independent of the size of the database 54, without a loss in effectiveness. To this end, we have an implementation of the algorithm 2044 such that a cluster link 2004 is defined recursively.

We define $C_L$ ($N_0$, $N_N$), the order-L cluster link 2004 from start node 2008 to destination node 2008, as the cluster link 2004 between $N_0$ and $N_N$, considering only paths of length less than or equal to L. Then, we can derive $C_{L+1}$ ($N_0$, $N_N$) from $C_L$ ($N_0$, $N_N$) and $C_1$ ($N_0$, $N_N$).

The assumption is that most of the paths $P_L$ ($N_0$, $N_N$) of length L (or greater) from $N_0$ to $N_N$ will not have a significant impact on cluster link generation. Therefore, we an use a set of candidate duster links 2004 $C_L$ ($N_0$, $N_N$) as a summary of that path information for the purpose of determining $C_{L+1}$ ($N_0$, $N_N$). This assumption has a significant impact on the performance of the algorithm 2044 in this implementation, since the search space is significantly reduced at each step. The computer processing "cost" of generating cluster links 2004 is bounded by the size of the candidate cluster link 2004 sets generated at the intermediate steps, rather than by the total number of relevant paths in the database 54.

The size of the candidate duster link 2004 set generated at each intermediate step affects the speed of the algorithm 2044 in this implementation. If too many candidate cluster links 2004 are generated at each intermediate step, the algorithm 2044 is too slow. On the other hand, if too few candidate cluster links 2004 are generated, and too many paths are pruned, then $C_L$ ($N_0$, $N_N$) is no longer an accurate summary of $P_L$ ($N_0$, $N_N$).

Finally, since the weights 2034 of the individual candidate cluster links 2004 in $C_L$ ($N_0$, $N_N$) are generally much greater than the weights 2034 of the individual paths in $P_L$ ($N_0$, $N_N$), the damping factors $D_N$ used to derive the combined weights 2034 at each step must be decreased accordingly in this implementation.

The specifics for the basic generator algorithm 2044 of this implementation, for determining the set of order N cluster links 2004 from a given start node 2008 $N_0$, are shown in FIG. 3H. The generator algorithm 2044 works for any value of N greater than zero. If N=1, the set of candidate cluster links 2004 generated is simple. The processing cost of determining the candidate cluster links 2004 increases with N. In practice, N=3 appears to yield the best results.

The generator algorithm 2044 starts by initializing the candidate cluster link 2004 set 2048 and creating a loop for i=0 to N 2052. The generator algorithm 2044 then performs a series of steps for each path P 2056. First, it selects the destination node 2008 as the node to analyze and retrieves the set of direct links 2032 (L) from the selected node 2008 to any other node 2008 in the database 54, $N_{i+1}$. Second, for each direct link 2032 L, the generator algorithm 2044 performs a series of steps.

The generator algorithm 2044 creates a new path P' of length i+1 consisting of the path P plus the direct link 2064 L from the selected node 2008 to the node 2008 $N_{i+1}$ 2056. The algorithm 2044 then determines the combined weight 2034 $WC_{i+1}$ from $WC_i$, the weight 2034 of the path P, and $W_{i+1}$, the weight 2034 of Link 2004 L 2064, using the following preferred formula:

$$WC_{i+1} = \min(WC_i, D_{i+1} * W_{i+1}).$$

Following these computations, the generator algorithm 2044 decides whether there already is a paths P in the cluster link 2004 from $N_0$ to $N_{i+1}$ 2068. If there is a not already a path, the algorithm 2044 adds P' to $C_{i+1}$ 2072. If there already is a path, the algorithm 2044 adds $WC_{i+1}$ to the weight 2034 of the existing path in $C_{i+1}$ 2076. These steps are then repeated as necessary.

Once the candidate cluster link 2004 set has been generated, deriving the actual cluster links 2004 is a simple matter of selecting or choosing the T top rated candidate links 2004, and eliminating the rest. In practice, the following formula has yielded good results:

$$T = \min(\text{constant}, 4*d),$$

where d is the number of direct links 2004 from $N_0$. Setting the constant equal to twenty has yielded good results. More than T cluster links 2004 may be generated if there are ties in the ratings. After each iteration, the candidate cluster link 2004 set $C_i$ may be pruned so that it contains only the top candidate cluster links 2004 (for example, the top 200).

Figure 4A:
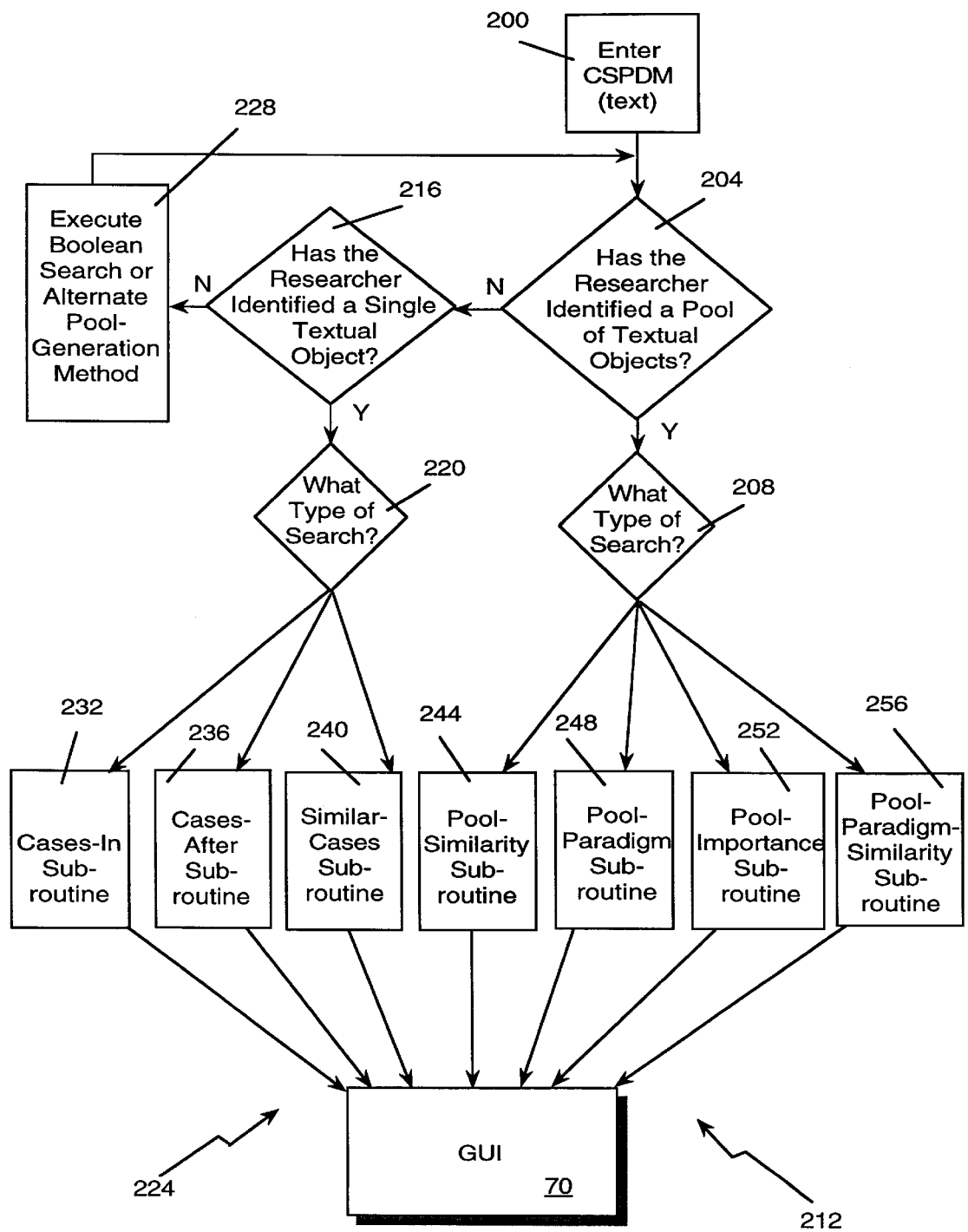
FIG. 4A is a high level diagram illustrating the flow of various search routines depending on the type of search initiated by the user by inputting commands to the Computer Processor via the input means. The diagram further illustrates the interaction between the CSPDM and the GUI Program.
Figure 4B:
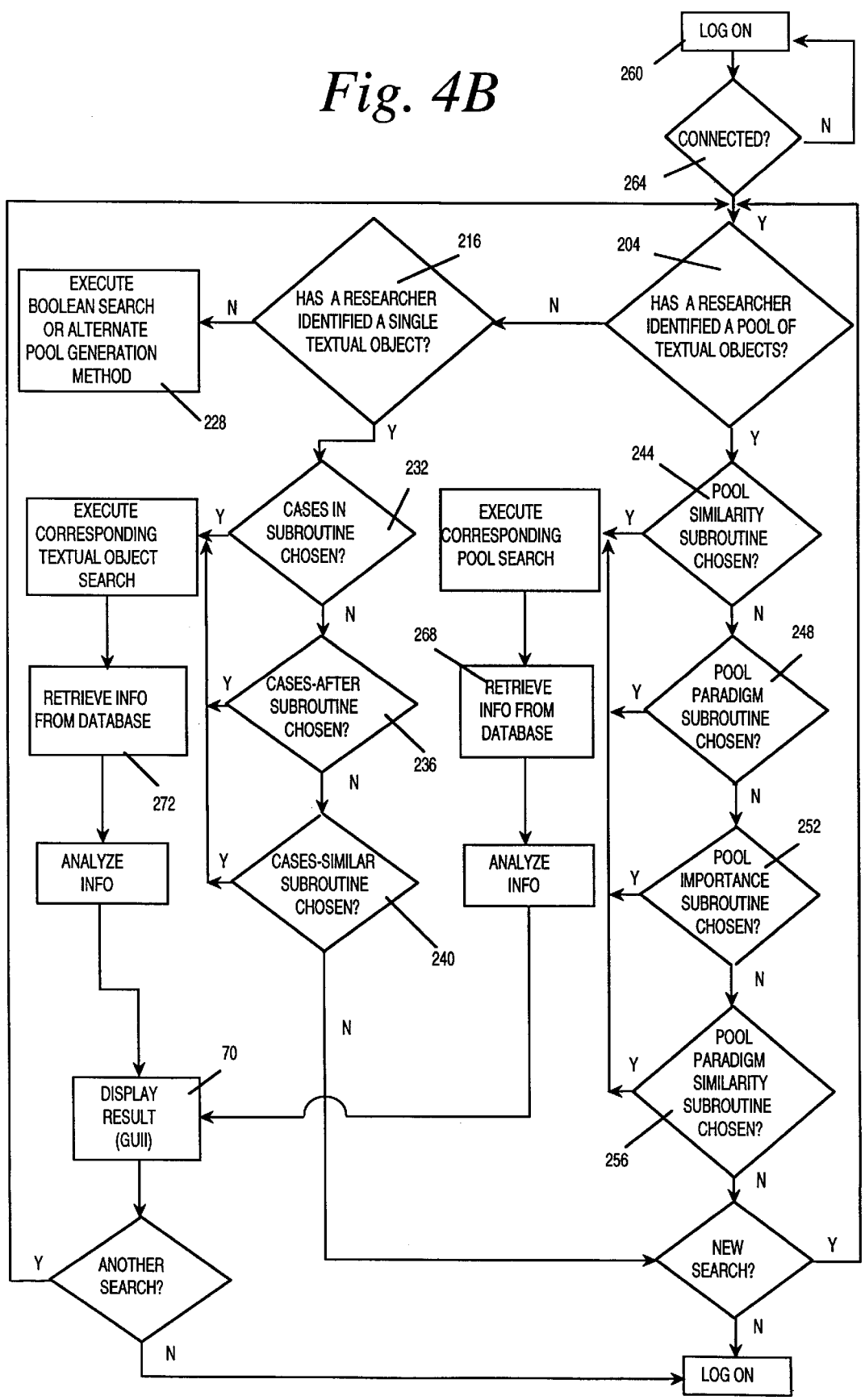
FIG. 4B is a high level flow chart illustrating the sequence of subroutines in the CSPDM program and user interactions with the subroutines.

FIGS. 4A and 4B are high level flow charts that illustrate the general flow of the subroutines of the CSPDM 66. FIG. 4A illustrates that the flow of various search routines depend on the type of search initiated by the researcher. The diagram further illustrates the interaction between the CSPDM 66 and the GUI Program 70. FIG. 4B illustrates the sequence of subroutines in the CSPDM 66 program and the user interactions with the subroutines. FIG. 4B further shows that the researcher can access the different search subroutines and use information that the researcher has already received to find new information.

FIG. 4B provides a high level flow chart illustrating the sequence of subroutines in the CSPDM 66 program and the researcher's interactions with the subroutines. Assuming that the database 54 the researcher desires to access has been proximity indexed, the researcher must log on 260 to the database 54. By entering the appropriate information into the Computer Processor 30 via the input means, the researcher electronically accesses 264 the database 54 and enables the CSPDM 66 to search 200 the database 54.

FIGS. 4A and 4B both show the preliminary options that the researcher can choose from before selecting one of the searching subroutines of the CSPDM 66. The CSPDM 66 questions the researcher on whether the researcher has identified a pool of textual objects 204. If the researcher has selected a pool of textual objects 204, then the researcher is able to choose one of the pool search 208 subroutines 212. If the researcher has not selected a pool of textual objects, the CSPDM 66 questions the researcher on whether the researcher has selected a single textual object 216. If the researcher has selected a single textual object 216, then the researcher is able to choose one 220 of the textual object searches 224. If the researcher has not selected either a pool of textual objects 204 or a single textual object 216, then the researcher must execute a Boolean Word Search or alternate Pool-Generation Method 228 to retrieve textual objects 268, 272.

After CSPDM 66 subroutine has executed a particular search, the CSPDM 66 retrieves the appropriate data from the database 54, analyzes the data, and sends the data to the GUI Program 70 in order for the GUI Program 70 to display the results of the search on the display 38.

FIG. 4B illustrates that after the CSPDM 66 has completed the above procedure, the researcher has the option to exit the CSPDM 66 by logging off, executing a search based on the results of a previous search, or executing a new search.

FIGS. 4A and 4B also depict the seven subroutines of the CSPDM 66. There are three textual object search subroutines 224 and four pool search subroutines 212. The three textual object search subroutines 224 are: the Cases-In Subroutine 232, the Cases-After Subroutine 236 and the Similar Cases Subroutine 240. The four pool search subroutines 212 are the Pool-Similarity Subroutine 244, the Pool-Paradigm Subroutine 248, the Pool-Importance Subroutine 252, and the Pool-Paradigm-Similarity Subroutine 256. Each of these subroutines are described in more detail in FIGS. 4C to 4I. The following is a step by step description of the subroutines 224, 212 of the CSPDM 66.

Section A Cases-In Subroutine 232

Figure 4C:
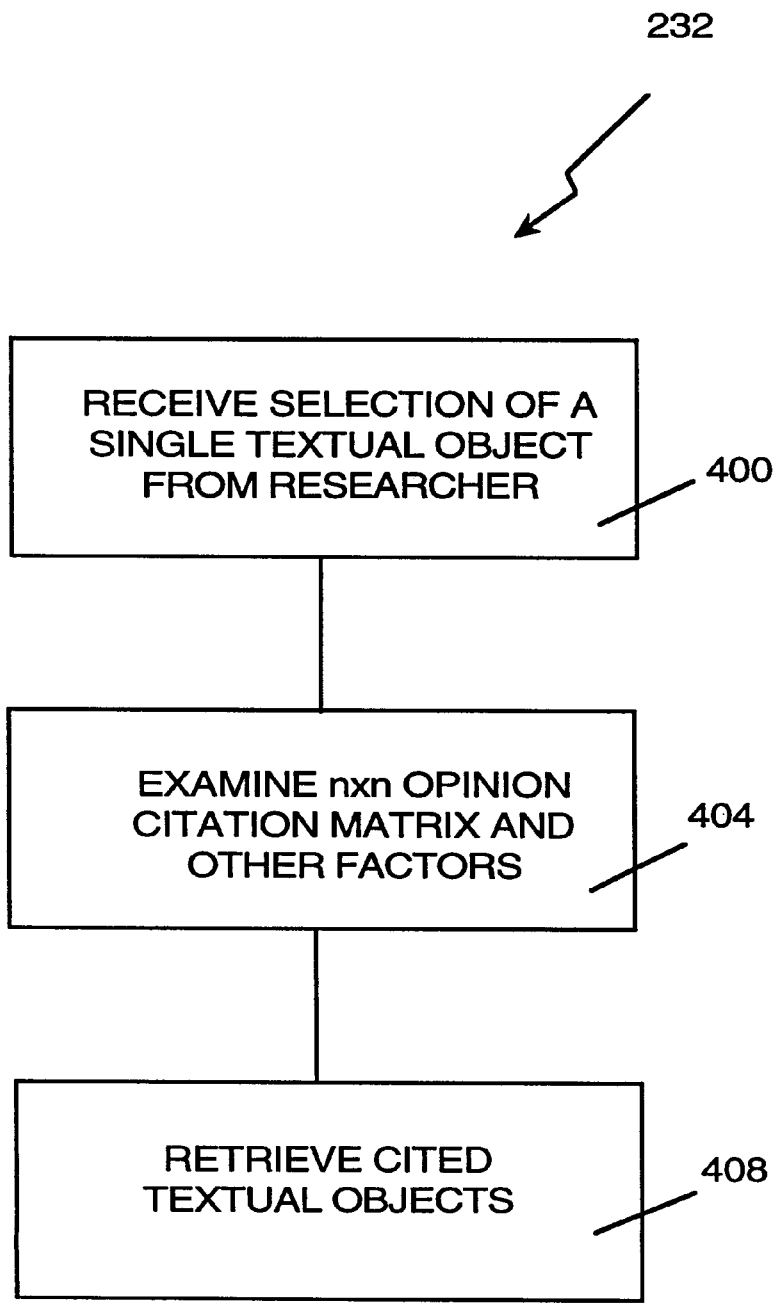
FIG. 4C is a high level flow chart for the Cases-In Subroutine.

FIG. 4C is a high level flow chart for the Cases-In Subroutine 232.

1. The researcher must select a single textual object 400.
2. The researcher selects the Cases-In Subroutine 232 option.
3. The Cases-In Subroutine 232 examines the n×n Opinion Citation Matrix and other matrices 404 created by the Proximity Indexing Application Program 62 and retrieves the textual objects to which the selected textual object refers 408, data relating to the number of times the selected textual object refers to the retrieved textual objects, data relating to the importance of each textual object, and other relevant data.

Section B Cases-After Subroutine 236

Figure 4D:
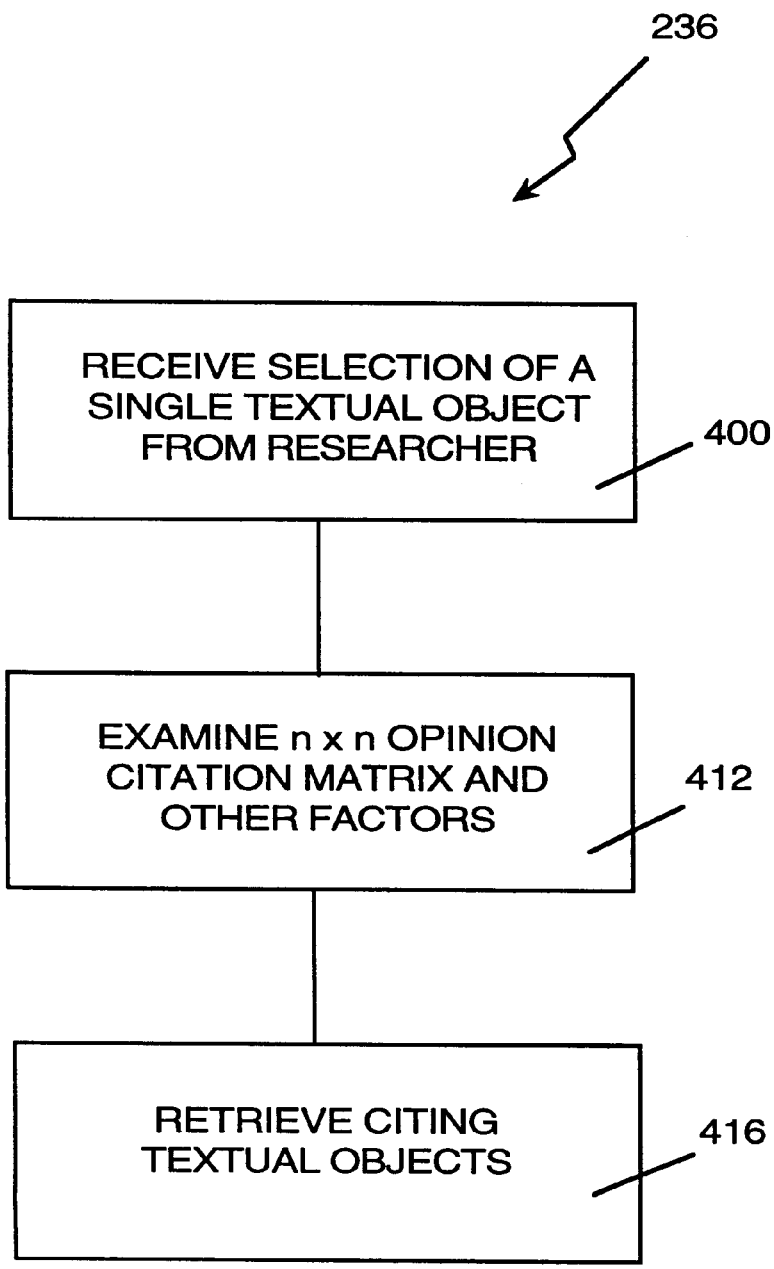
FIG. 4D is a high level flow chart for the Cases-After Subroutine.

FIG. 4D is a high level flow chart for the Cases-After Subroutine 236.

4. The researcher must select a single textual object 400.
5. The researcher selects the Cases-After Subroutine 236 option.
6. The Cases-After Subroutine 236 examines the n×n Opinion Citation Matrix and other matrices 412 created by the Proximity Indexing Application Program 62 and retrieves the textual objects that refer to the selected textual object 416, data relating to the number of times the retrieved textual objects refer to the selected textual object, data relating to the importance of each textual object, and other relevant data.

Section C Similar-Cases Subroutine 240

Figure 4E:
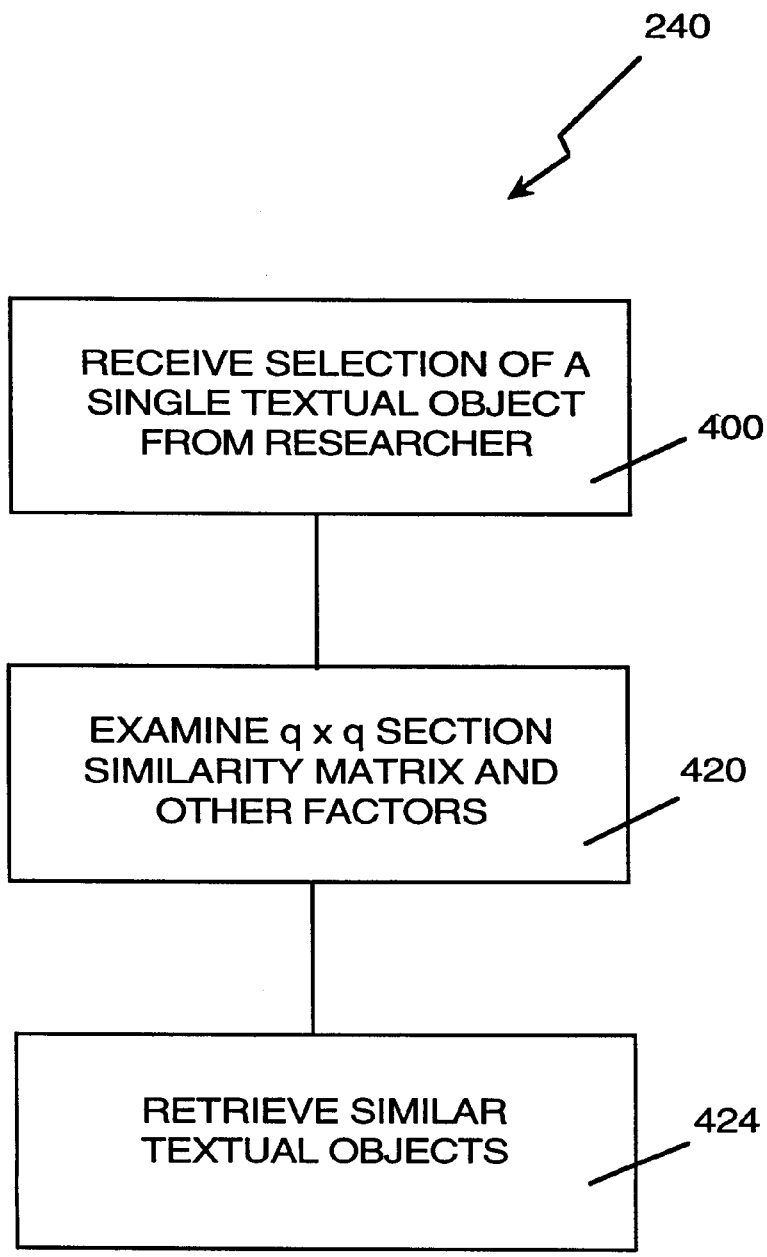
FIG. 4E is a high level flow chart for the Similar-Cases Subroutine.

FIG. 4E is a high level flow chart for the Similar-Cases Subroutine 240.

7. The researcher must select a single textual object 400.
8. The researcher selects the Similar-Cases Subroutine 240 option,
9. The Similar-Cases Subroutine examines the q×q Section Similarity Matrix and other matrices 420 created by the Proximity Indexing Application Program 62 and retrieves the textual objects that are similar to the selected textual object 424, data relating to the degree of similarity between the selected textual object and the retrieved textual objects, data relating to the importance of each textual object, and other relevant data. In order to be retrieved, a textual object must have a similarity coefficient with respect to the selected textual object of at least a minimum value. The preferred embodiment sets the minimum similarity coefficient of four percent (4%).

Section D Pool-Similarity Subroutine 244

Figure 4F:
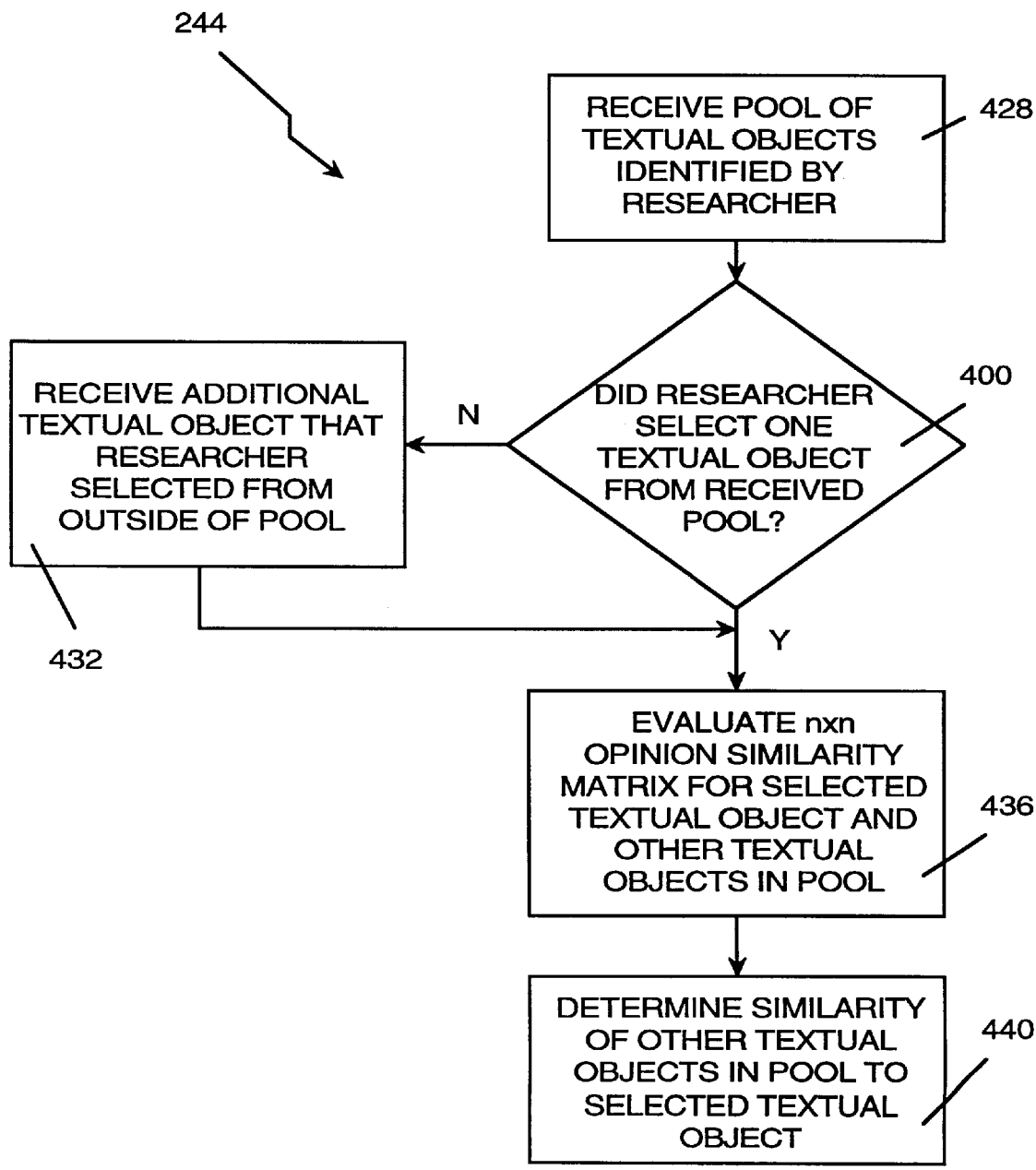
FIG. 4F is a high level flow chart for the Pool-Similarity Subroutine.

FIG. 4F is a high level flow chart for the Pool-Similarity Subroutine 244.

10. The researcher must select a pool of full textual objects 428.
11. The researcher must then select a single full textual object 400 to which in compare the pool of full textual objects. It should be noted that the researcher can select the single textual object from the selected pool of textual objects, or the researcher can select a textual object from outside of the pool 432.
12. The Pool-Similarity Subroutine 244 examines the n×n Opinion Similarity Matrix and other matrices 436 and values created by the Proximity Indexing Application Program 62 for the selected full textual object and the pool of full textual objects.
13. The Pool-Similarity Subroutine 244 determines the degree of similarity of other full textual objects in the pool to the selected full textual object 440.

Section E Pool-Paradigm

Figure 4G:
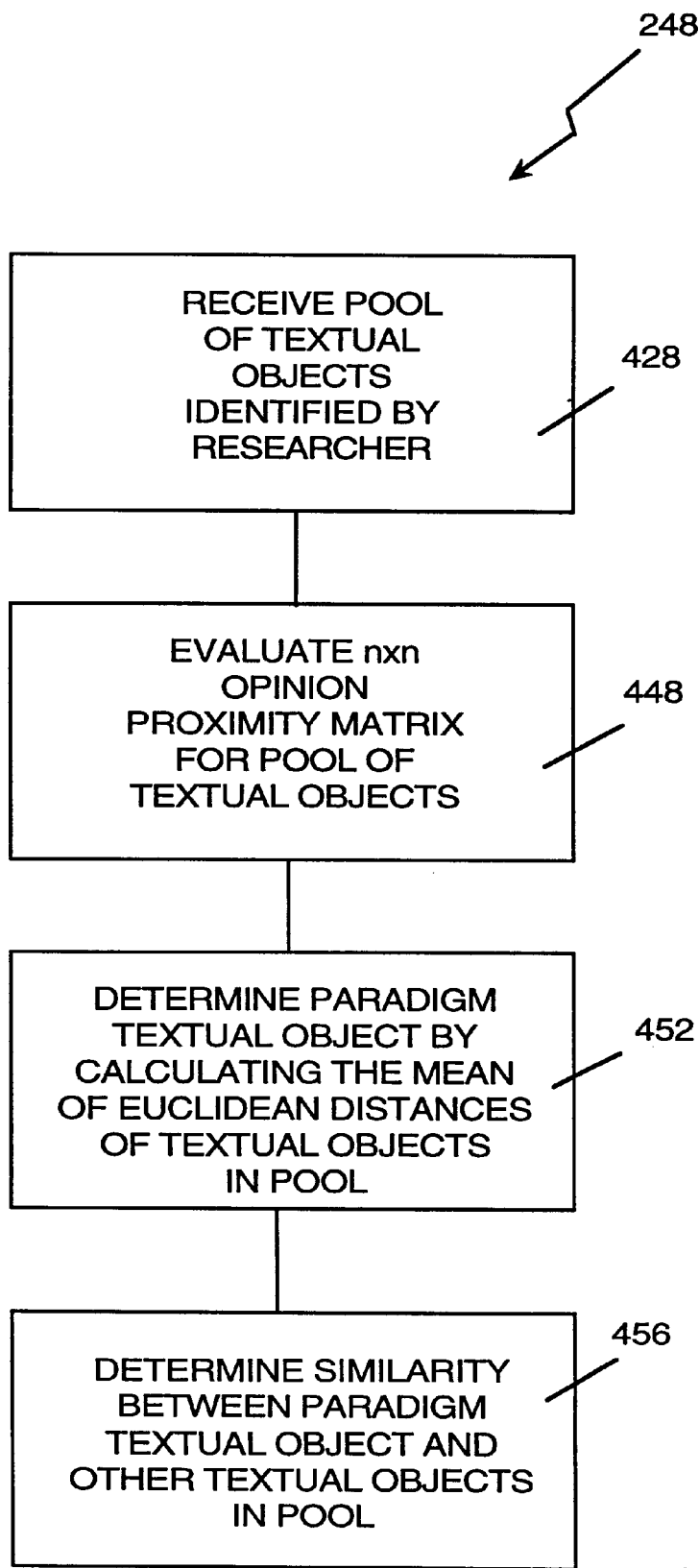
FIG. 4G is a high level flow chart for the Pool-Paradigm Subroutine.

FIG. 4G is a high level flow chart for the Pool-Paradigm Subroutine 248.

14. The researcher must select a pool of full textual objects 428.
15. The Pool-Paradigm Subroutine 248 examines the n×n Opinion Proximity Matrix, the n×n Opinion Similarity Matrix and other matrices and values created by the Proximity Indexing Application Program 62 for the pool of full textual objects 448.
16. The Pool-Paradigm Subroutine 248 determines the Paradigm full textual object by calculating the mean of the Euclidean distances of all the textual objects in the pool 452.
17. The Pool-Paradigm Subroutine 248 determines the similarity of the other full textual objects in the pool to the Paradigm full textual object 456.

Section F Pool-Importance Subroutine 252

Figure 4H:
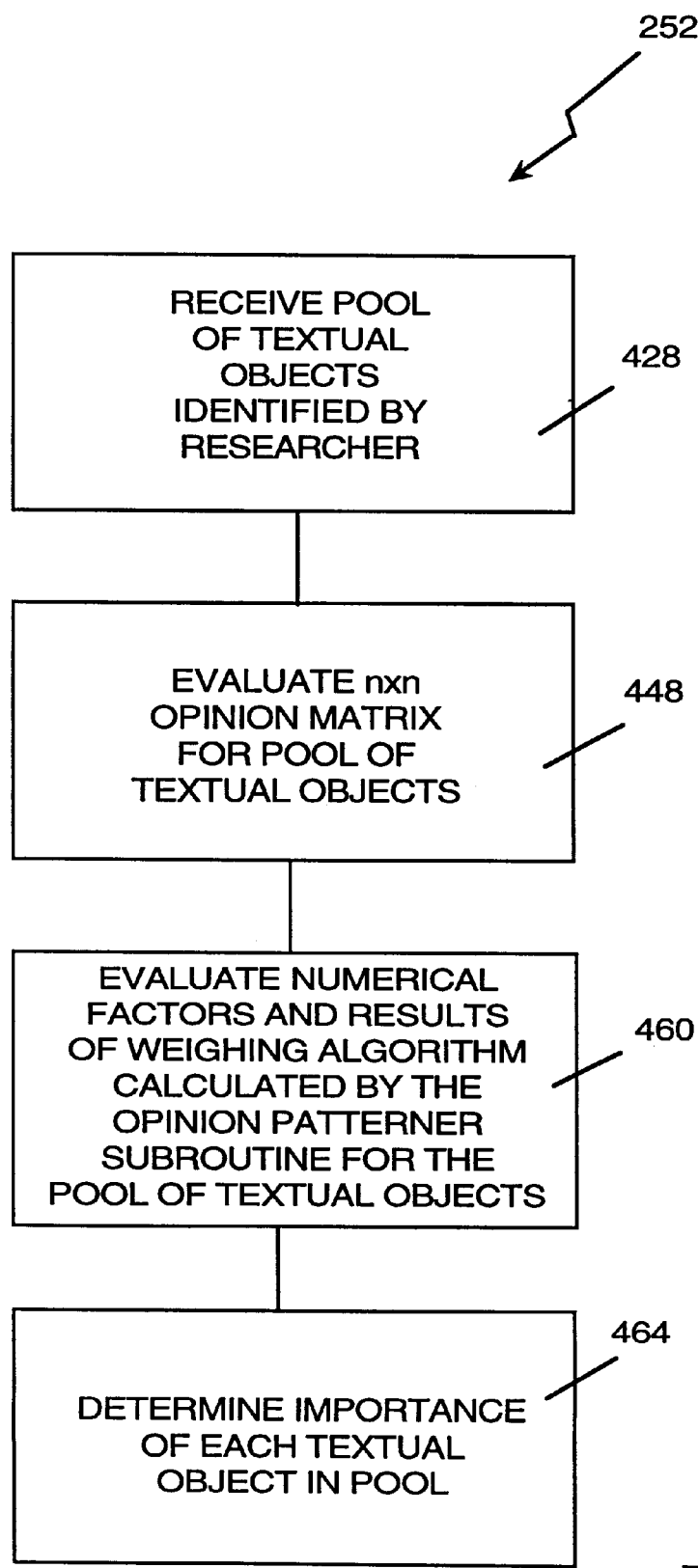
FIG. 4H is a high level flow chart for the Pool-Importance Subroutine.

FIG. 4H is a high level flow chart for the Pool-Importance Subroutine 252.

18. The researcher must select a pool of full textual objects 428.
19. The Pool-Importance Subroutine 252 examines 448 the n×n Opinion Citation Matrix, the n×n Opinion Similarity Matrix, numerical factors and other matrices and values created by the Proximity Indexing Application Program 62 for the pool of full textual objects 460.
20. The Pool-Importance Subroutine 252 then ranks the importance of each of the full textual objects in the pool 464.

Figure 4I:
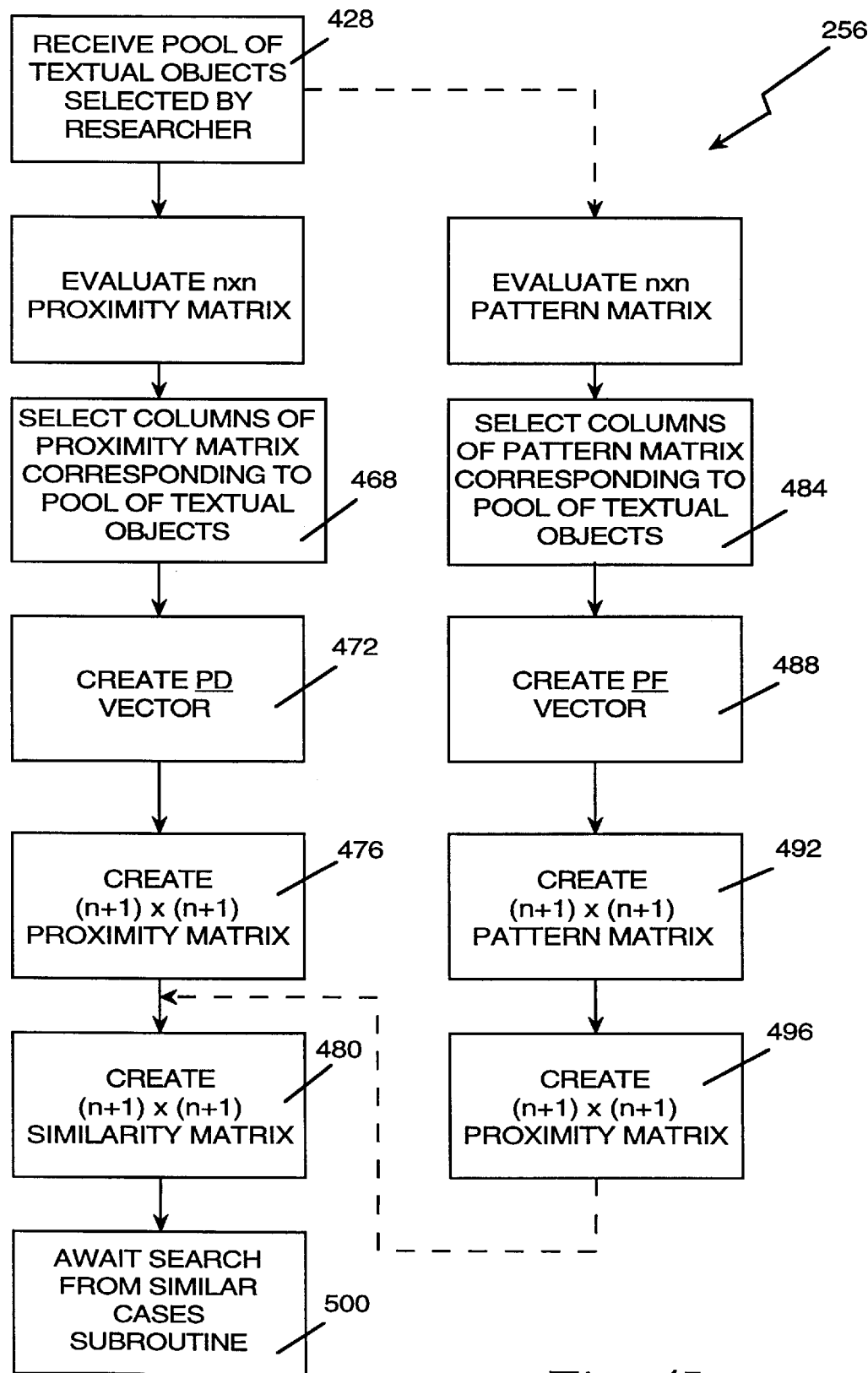
FIG. 4I is a high level flow chart showing two possible alternate Pool-Paradigm-Similarity Subroutines.

FIG. 4I is a high level flow chart showing two possible alternate Pool-Paradigm-Similarity Subroutines 256.

Section G Pool-Paradigm-Similarity Subroutine 256 (Option 1) 256

21. The researcher must select a pool of k full textual objects where k equals the number of full textual objects in the pool 428.
22. For each of the k full textual objects, the Pool-Paradigm-Similarity Subroutine 256 selects a n×1 vector from the corresponding column of the n×n 468.
23. The Pool-Paradigm-Similarity Subroutine 256 creates an n×k matrix by grouping the n×1 vector representing each of the k full textual objects beside each other.
24. The Pool-Paradigm-Similarity Subroutine 256 calculates the mean of each row of the n×k matrix and enters the mean in the corresponding row of an n×1 Paradigm Proximity Vector 472.
25. The Pool-Paradigm-Similarity Subroutine 256 combines the n×1 Paradigm Proximity Vector with the n×n Opinion Proximity Matrix to create an (n+1)×(n+1) Paradigm Proximity Matrix 476.
26. From the (n+1)×(n+1) Paradigm Proximity Matrix, the Pool-Paradigm-Similarity Subroutine 256 evaluates the Euclidian distances and empirical data to create an (n+1)×(n+1) Paradigm Similarity Matrix 480.
27. The Pool-Paradigm Similarity Subroutine 256 searches the row in the (n+1)×(n+1) Paradigm Similarity Matrix that corresponds to the Paradigm full textual object and retrieves the full textual objects that have a maximum degree of similarity with the Paradigm full textual object 500.

Section H Pool-Paradigm Similarity Subroutine 256 (Option 2)

28. The researcher must select a pool of k full textual objects where k equals the number of full textual objects in the pool 428.
29. For each of the k full textual objects, the Pool-Paradigm-Similarity Subroutine 256 selects an n×1 vector from the corresponding column of the n×n 484.

30. The Pool-Paradigm-Similarity Subroutine 256 creates an n×k matrix by grouping the n×1 vector for each of the k full textual objects beside each other.

31. The Pool-Paradigm-Similarity Subroutine 256 calculates the mean of each row of the n×k matrix and enters the mean in the corresponding row of an n×1 Paradigm Pattern Vector PF 488.

32. The Pool-Paradigm-Similarity Subroutine 256 combines the n×1 Paradigm Pattern Vector PF with the n×n Opinion Pattern Matrix to create a (n+1)×(n+1) Paradigm Pattern Matrix 492.

33. From the (n+1)×(n+1) Paradigm Pattern Matrix, the Pool-Paradigm-Similarity Subroutine 256 evaluates the Euclidean distances between the rows of the Paradigm Pattern Matrix and creates an (n+1)×(n+1) Paradigm Proximity Matrix 496.

34. From the (n+1)×(n+1) Proximity Matrix, the Pool-Paradigm-Similarity Subroutine 256 evaluates the Euclidean distances between the rows of the (n×1)×(n×1) Paradigm Proximity Matrix and empirical data to create an (n+1)×(n+1) Paradigm Similarity Matrix 480.

35. The Pool-Paradigm Similarity Subroutine 256 searches the row in the (n+1)×(n+1) Paradigm Similarity Matrix that corresponds to the Paradigm full textual object and retrieves the full textual objects that have a minimum degree of similarity with the Paradigm full textual object 500.

Application of the Proximity Indexing Technique

The above Proximity Indexing Application Program 62 and CSPDM 66 have a number of different applications and versions. Three of the most useful applications are described below.

The first type of Proximity Indexing Application Programs 62 is for use on very large databases. The matrices generated by this type of Proximity Indexer are "attached" to the database 54, along with certain clustering information, so that the database 54 can be searched and accessed using the Cases-In Subroutine 232, Cases-After Subroutine 236, Similar Cases Subroutine 240, Pool-Similarity Subroutine 244, Pool-Paradigm Subroutine 248, Pool-Importance Subroutine 252 and Pool-Paradigm-Similarity Subroutine 256 of the CSPDM 66.

The second type of Proximity Indexing Application Program 62 is a Proximity Indexer that law firms, businesses, government agencies, etc. can use to Proximity Index their own documents in their own databases 54. The researcher can navigate through the small business's preexisting database 54 using the Cases-In Subroutine 232, Cases-After Subroutine 236, Similar Cases Subroutine 240, Pool-Similarity Subroutine 244, Pool-Paradigm Subroutine 248, Pool-Importance Subroutine 252 and Pool-Paradigm-Similarity Subroutine 256 of the CSPDM 66. In addition, this type of Proximity Indexer Application Program 62 will be designed to be compatible with the commercial third-party databases 54 which are Proximity Indexed using the first type of program. In other words, the researcher in a small business may "weave" in-house documents into a commercial database 54 provided by a third party, so that searches in the large database 54 will automatically bring up any relevant in-house documents, and vice versa.

The third type of Proximity Indexing Application Program 62 involves the capacity to do Proximity indexing of shapes. Each image or diagram will be treated as a "textual object." The various matrix coefficients can be generated purely from topological analysis of the object itself, or from accompanying textual information about the object, or from a weighted combination of the two. The text is analyzed using the Proximity Indexing Application Program 62 as explained above. Shapes are analyzed according to a coordinate mapping procedure similar to that used in Optical Character Recognition ("OCR"). The numerical "maps" resulting from scanning the images are treated as "textual objects" that can be compared through an analogous weighing algorithm to generate a proximity matrix for every ordered pair of "textual objects" in the database 54. A similarity matrix can then be generated for each ordered pair, and the results organized analogous to a database 54 totally comprised of actual text.

This third type of Proximity Indexing Applications Program 62 can provide "Proximity Indexed" organization access to many different types of objects. For example, it can be used to search patent diagrams, or compare line drawings of known pottery to a newly discovered archeological find. It can be used to scan through and compare police composite drawings, while simultaneously scanning for similar partial descriptions of suspects. It can be used to locate diagrams of molecular structures, appraise furniture by comparing a new item to a database 54 of past sales, identify biological specimens, etc., etc.

Figure 5A:
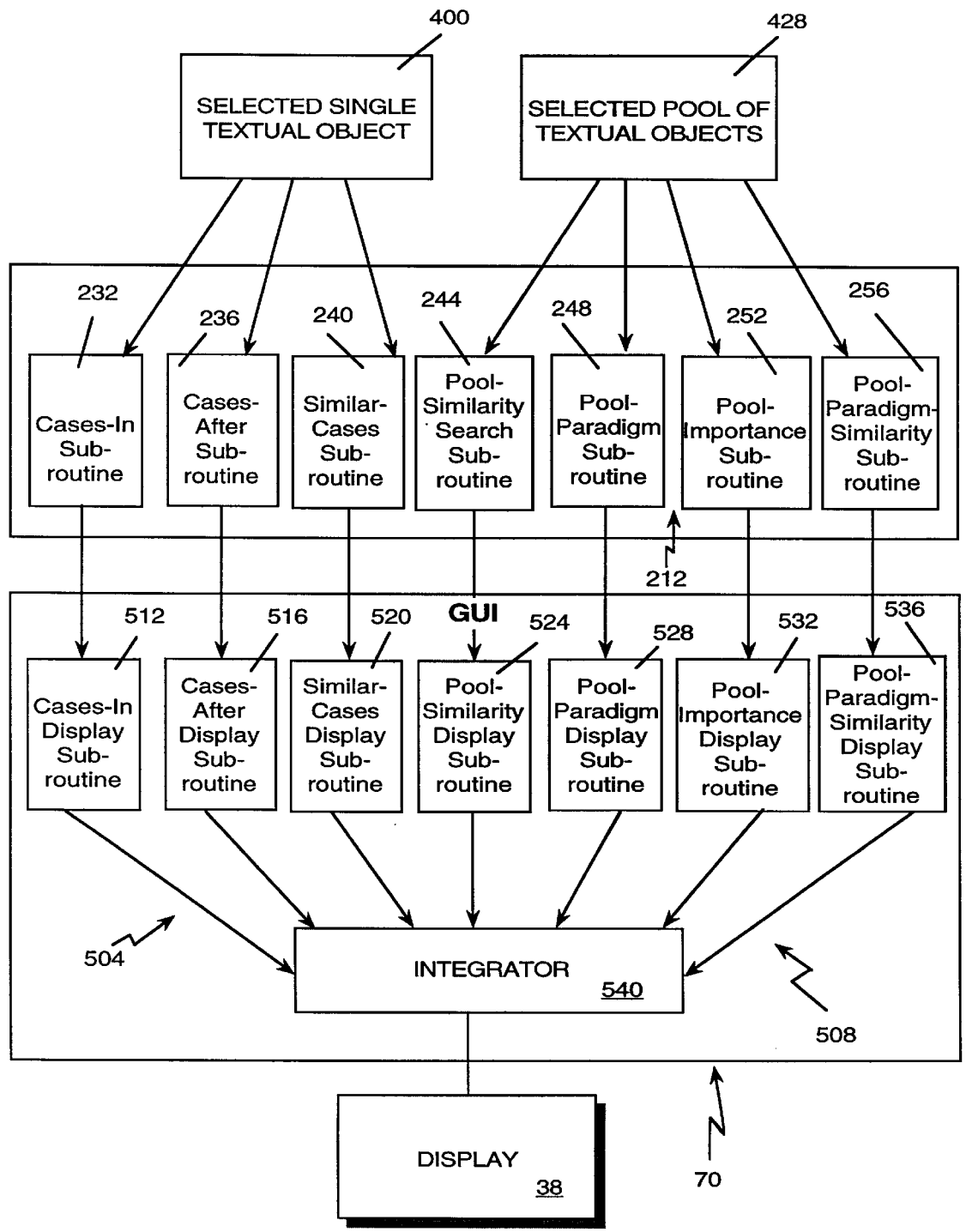
FIG. 5A is a high level diagram illustrating the interaction between respective subroutines of the CSPDM and of the GUI Program. The diagram further illustrates the interaction between the GUI Program and the display.

FIG. 5A is a high level drawing that depicts one embodiment of the GUI Program 70 and its interaction with both the CSPDM 66 and the display 38. The GUI Program 70 has one or more display subroutines. One embodiment contains seven display subroutines. The seven subroutines comprise three textual object display subroutines 504 and four pool display subroutines 508. The three textual object display subroutines 504 are the Cases-In Display Subroutine (CIDS) 512, the Cases-After Display Subroutine (CADS) 516 and the Similar-Cases Display Subroutine (SCDS) 520. The four pool display subroutines 508 are the Pool-Similarity Display Subroutine (PSDS) 524, the Pool-Paradigm Display Subroutine (PPDS) 528, the Pool-Importance Display Subroutine (PIDS) 532 and the Pool-Paradigm-Similarity Display Subroutine (PPSDS) 536. The three textual object display subroutines 504 receive data from the corresponding textual object search subroutine 224 of the CSPDM 66. Similarly, the four pool display subroutines 508 receive data from the corresponding pool search subroutine 212 of the CSPDM 66. Once the display subroutines have processed the data received by the search subroutines, the data is sent to the integrator 540. The integrator 540 prepares the data to be displayed in the proper format on the display 38.

FIGS. 5B through 5H depict screens generated by the textual object display subroutines, CIDS 512, CADS 516 and SCDS 520. The three types of screens are the Cases In screen 1000, the Cases After screen 1004 and the Similarity Screen 1008, respectively. The Similarity Screen 1008 provides the most "intelligent" information, but all three screens generated by the textual object display subroutines 504 work in tandem as a system. The other screens created by the pool display subroutines are variances of these three, and also work in tandem with each other and with the three textual object display screens.

Figure 5B:
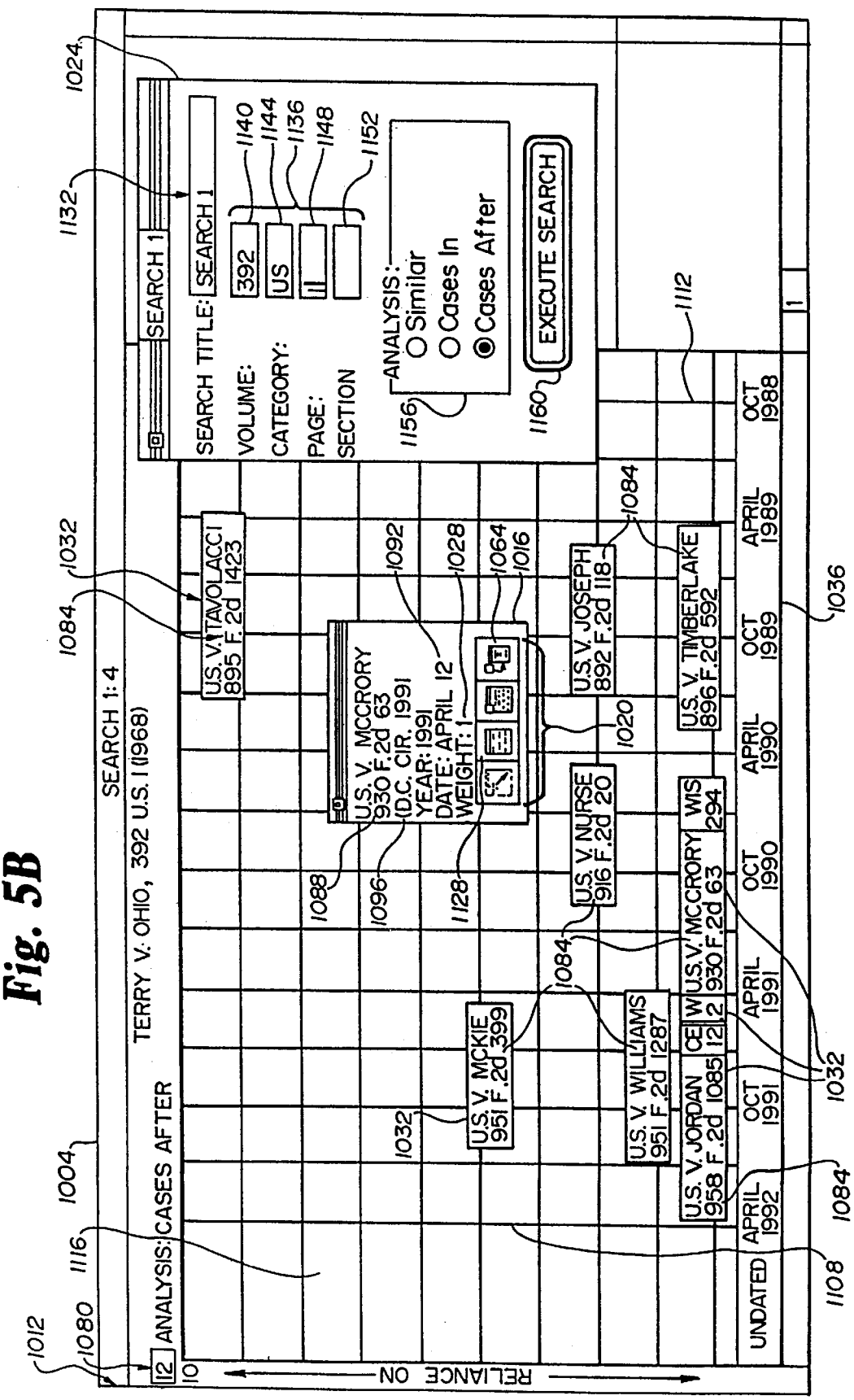
FIG. 5B is an example of the display once the Cases-After Display Subroutine (CADS) is executed.

FIG. 5B depicts the "Cases After" 1004 Screen created by the CADS 516 for the textual object, *Terry v. Ohio*, 392 U.S. 1 (1968). The Cases-After subroutine 236 search produces all of the textual objects, in the designated field (here D.C. Circuit criminal cases since 1990) that cite *Terry*. The number "12" 1080 in the upper left hand corner indicates that there are a total of 12 such textual objects. The vertical axis 1012 indicates the degree to which a given textual object relied upon *Terry*. The number "10" immediately below the 12 indicates that the textual object in the field which most relied upon *Terry* namely *U.S. v. Tavolacci*, 895

F.2d 1423 (D.C. Cir. 1990), discusses or refers to *Terry* in ten of its paragraphs.

The Tear-Off Window 1016 feature is illustrated in FIG. 5B by the Tear-Off Window 1016 for *U.S. V. McCrory*, 930 F.2d 63 (D.C. Cir. 1991). The four Tear-Off Window active boxes 1020 (displayed on the Tear-Off Window 1016): 1) open up the full text 1104 of *McCrory* to the first paragraph that cites *Terry*; 2) run any of the three searches, namely Cases-In Subroutine 232 Cases-After Subroutine 236 or similar cases Subroutine 240 for *McCrory* itself (the default is to run the same type of search, namely Cases-After Subroutine 236 again); 3) hide the *Terry* execute search window 1024; and 4) bring the *Terry* Execute Search window to the foreground, respectively. The weight numeral 1028 indicates the number of paragraphs in *McCrory* that discusses or refers to *Terry*, in this textual object (in this example there is only one).

The Cases After screen 1004 for a given Textual object B displays a Textual Object Active Box 1032 representing every subsequent textual object in the database 54 that refers explicitly to Textual object B. The analysis starts with the same pool of material as a Shepards™ list for Textual object B. As well as some additional material not gathered by Shepards. However, the Cases After screen 1004 conveys a wealth of information not conveyed by a Shepards™ list.

The horizontal axis 1036 may represent time, importance or any other means of measurement to rank the textual objects. The Shepards list itself contains no information as to when a case was decided. The vertical axis 1012 similarly may represent any means of measurement to rank the textual objects. In the preferred embodiment, the vertical axis 1012 represents the degree to which the subsequent Textual object C relied upon the original Textual object B. The display 38 makes it obvious when a textual object has received extensive discussion in another textual object, or provides key precedent for a subsequent textual object, or merely mentions the earlier textual object in passing. It also provides guidance as to possible gradations in between extensive, or merely citing.

The "shape" of the overall pattern of active boxes on the Cases After screen 1004 provides a rich lode of information to be investigated. For example, a "dip" in citation frequency immediately after a particular textual object suggests that the particular textual object, while not formally overruling Textual object B, has largely superseded it. A sudden surge in citation frequency after a particular Supreme Court case may indicate that the Supreme Court has "picked up" and adopted the doctrine first enunciated in Textual object B. The researcher can instantly determine if the holding of Textual object B has been adopted in some circuits but not in others, if Textual object B is losing strength as a source of controlling precedent, etc. None of this information is now available to lawyers in graphical or any other form.

As with the Cases In screen 1000, every Textual Object Active Box 1032 on the Cases After screen 1004 is active, and includes a Tear-Off Window 1016 that may be moved by dragging on the tear-off window 1016 with a mouse 42, and that tear-off window 1016 becomes a text Tear-Off Window 1040, visible even when one moves on to other searches and other screens. Thus one may "tear off" for later examination every relevant citation to Textual object B, or even for a group of textual objects. The text tear-off windows 1040 "tile"; that is, they can be stacked on top of one another to take up less room. There is also a "Select All" feature (not shown), that creates a file containing the citations of every textual object retrieved in a given search.

In Cases After screen 1004 mode, clicking on the expanded-view button 1044 of the text tear-off window 1040 opens the text of the subsequent Textual object C to the first place where Textual object B is cited. A paragraph window 1048 displays a paragraph selection box 1052 indicating what paragraph in Textual object C the researcher is reading, and a total paragraph box 1056 indication how many paragraphs Textual object C contains in total. The user can view paragraphs sequentially simply by scrolling through them, or see any paragraph immediately by typing its number in the paragraph selection box 1052. Clicking on a Next paragraph active box 1060 immediately takes the researcher to the next paragraph in Textual object C where Textual object B is mentioned. Traditional Shepardizing allows the researcher to explore the subsequent application of a doctrine in a range of different factual situations, situations that help to define the outer contours of the applicability of a rule. Combining the expanded-view button 1044 functions and "Next Paragraph" active box 1060 functions allows the researcher to study how Textual object B has been used in all subsequent textual objects, in a fraction of the time the same task currently requires with available searching methods.

Perhaps the most fundamental form of legal research is "Shepardizing." A researcher starts with a textual object known to be relevant, "Textual object B," and locates the "Shepards" for that textual object. The "Shepards" is a list of every subsequent textual object that explicitly refers to Textual object B. The researcher then looks at every single textual object on the list. Shepardizing is often painstaking work. Many subsequent references are made in passing and have almost no legal significance. Although Shepards includes some codes next to its long lists of citations, such as "f" for "followed" and "o" for "overruled," the experience of most lawyers is that such letters cannot be relied upon. For example, the researcher may be citing Textual object B for a different holding than that recognized by the anonymous Shepards reader, interpreting Textual object B differently, or interpreting the subsequent textual object differently. However, for really thorough research, checking a Shepards type of list is essential. The researcher must make absolutely sure that any textual object cited as legal authority in a brief, for instance, has not been superseded by later changes in the law.

Very often, textual objects located on the Shepards list for Textual object B refer back to other important textual objects, some of which may predate Textual object B, all of which may be Shepardized in turn. This "zig-zag" method of research is widely recognized as the only way to be sure that one has considered the full line of textual objects developing and interpreting a doctrine. The real power of the Cases After screen 1004 emerges when it is used in conjunction with the Cases In screens 1000 and Similarity screens 1008. Using the preferred embodiment, the researcher may engage in the same kind of careful "zig-zag" study of a legal doctrine in a much more efficient manner.

For example, consider the following hypothetical search. The researcher reads Textual object B, and makes a list of every Supreme Court textual object it substantially relies upon, perhaps six textual objects. The researcher then Shepardizes Textual object B and reads each of those textual objects, in order to find other Supreme Court textual objects that they relied upon, perhaps eight. One then Shepardizes those fourteen Supreme Court decisions, in order to find any Court of Appeals cases in a selected circuit within the last three years on the same basic topic. This process would take at least an hour, even using Shepards through an on-line service. The same search can be performed with the present invention using the Cases In screens 1000 and Cases After screens 1004 in under five minutes.

In order to perform the same search, a researcher can pull up both the Cases In screens 1000 and Cases After screens 1004 for Textual object B simultaneously. The researcher can then "tear-off" all of the Supreme Court Cases on both lists, run Cases-After Subroutine 236 searches on every Supreme Court Case mentioned on either list, then examine the Cases In screens 1000 for all of the Supreme Court cases produced by these searches. The researcher can locate every recent Court of Appeals case from a selected circuit mentioned in any of those Supreme Court cases. Use of the Similarity screen 1008 as well, allows the researcher to find the pool of relevant Court of Appeals full textual objects even faster.

FIG. 5C depicts the Cases After Screen 1004 for *U.S.* v. *Lam Kwong-Wah,* 924 F.2d 298 (D.C. Cir. 1991). FIG. 5C shows a text Tear-Off Window 1040 on a Cases After Screen 1004, (in this textual object the Tear-Off Window 1016 for *U.S.* v. *Barry,* 938 F.2d 1327 (D.C. Cir. 1991), is opened using the full text active box 1064. A text Tear-Off Window 1040 containing the text of *Barry* opens, to the first cite of *U.S.* v. *Lam Kwong-Wah* at paragraph 15. Clicking on the Next Paragraph active box 1060 will open the text of *Barry* to the next paragraph that cites *Lam Kwong-Wah*.

The number "34" in the lower-left corner of the total paragraph box 1056 indicates that Barry has a total of 84 paragraphs in the cite *U.S.* v. *Lam Kwong-Wah.* Dragging the small squares 1068 to the left and below the text allow the researcher to move within a paragraph, and from paragraph to paragraph, in the text of *Barry,* respectively. The empty space below the text 1072 would contain the text of any footnote in paragraph 15. The compress window active box 1074 now closes the window and replaces it with the corresponding Textual Object Active Box 1032.

Figure 5D:
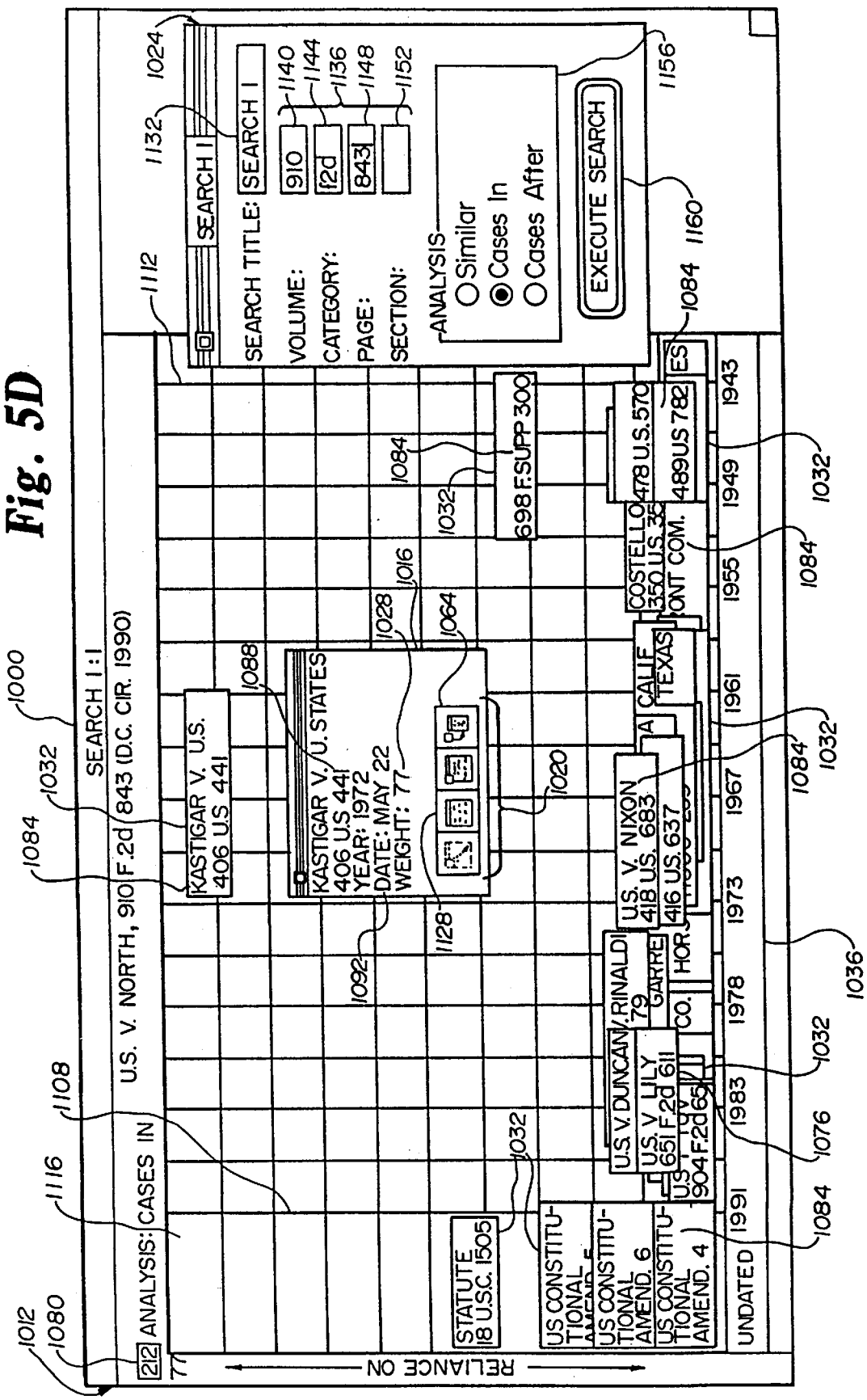
FIG. 5D is an example of the display once the Cases-In Display Subroutine (CIDS) is executed.

FIG. 5D depicts the Cases In Screen 1000 for *U.S.* v. *North,* 910 F.2d 843 (D.C. Cir. 1990). FIG. 5D contains a Textual Object Active Box 1032 representing every textual object or node with persuasive authority, cited in the text of *North.* The vertical axis 1012 represents the degree to which *North* relied upon a given textual object. In this example it is immediately apparent that *Kastigar* v. *United States* 406 U.S. 441 (1972) is the most important precedent, and its Tear-Off Window 1016 have been activated. The weight numeral 1028 indicates that *Kastigar* is referred to in 77 paragraphs of *North*.

A highlighted Textual Object Active Box 1076 can be created by clicking on it, as has been done with *U.S.* v. *Lily,* 651 F.2d 611. The number "212" in the case number box 1080 indicates that citations to two-hundred-twelve distinct texts appear in *North.* Fewer are visible because the textual object active boxes 1032 "tile" on top of one another; the "Zoom" feature is used to focus on a smaller area of the screen, and ultimately resolves down to a day-by-day level, making all the textual object active boxes 1032 visible.

The unique Cases In screen 1000 provides a schematic representation of the precedent from which Textual object A is built. The Cases In screen 1000 contains a textual object active box 1032 representing every textual object which is relied upon, or even mentioned, in Textual object A. Any citation in textual object A to a textual object that possesses potential persuasive authority, whether a statute, constitutional provision, treatise, scholarly article, Rule of Procedure, etc., is treated as a "textual object." The textual object active boxes 1032 are color-coded to indicate the court or other source of each textual object. Supreme Court cases are red, Court of Appeals cases are green, District Court cases are blue, and statutes are purple, for example. Each Textual Object Active Box 1032 contains the full official citation 1084 of its textual object. Clicking on any Textual Object Active Box 1032 immediately pulls up a larger window, known as a tear-off window 1016, also containing the full citation 1084 to the textual object (Tear-Off Window Citation 1088), its date 1092, its circuit 1096, and its weight numeral 1028 to the textual object being analyzed. The user may then drag the Tear-Off Window 1016 free of the Textual Object Active Box 1032 and release it.

This creates a text Tear-Off Window 1040 that remains visible until the researcher chooses to close it, no matter how many subsequent screens the researcher examines. The text Tear-Off Window 1040 can be moved anywhere by dragging it with the mouse 42. The text Tear-Off Window 1040 contains small text active boxes 1100 allowing the researcher to access or "pull up" the full text 1104 of the textual object it represents with a single click of the mouse 42. This feature also allows the researcher to run Cases-In Subroutine 232, Cases-After Subroutine 236, and Similar Cases Subroutine 240 searches on the textual object. (See below for a description of the Similarity screen 1008).

The organization of the boxes on the screen, including their position on the horizontal axis 1036 and vertical axis 1012, represents the real "intelligence" behind the Cases-In screen 1000. The horizontal axis 1036 in the preferred embodiment represents time, with the left margin 1108 corresponding to the present, i.e., the date 1992 when the search is run. The right margin 1112 represents the date of decision of the earliest textual object cited in Textual object A. (Certain special materials, such as treatises updated annually, and the U.S. Constitution, are located in a column 1116 to the left of the margin.)

The vertical axis 1012 in the preferred embodiment represents the degree to which Textual object A relied upon each particular textual object it contains. For example, if the Cases In screen 1000 is run on a district court case (Textual object A) which happens to be a "stop and search" textual object that mainly relies upon *Terry* v. *Ohio,* 392 U.S. 1 (1968), *Terry* will be at the top of the screen, with all other textual object active boxes 1032 appearing far below. The researcher can thus access the text of *Terry* directly without ever reading the text of Textual object A. Of course, the full text 1104 of Textual object A is also instantly available if desired. If the researcher wants to see where *Terry* "came from," the researchers can instantly, by clicking on a text active box 1100 within the *Terry* text Tear-Off Window 1040, run the Cases-In Subroutine 232 for *Terry*—and so on. There is no limit to the number of "levels" or "generations" the researchers may explore using this technique. It is therefore possible (assuming a sufficient database 54) to find, in a matter of seconds, without having to read through layers of texts, the possibly long-forgotten eighteenth-century precursors to a modern doctrine.

The Cases In screen 1000 creates an instant visual summary or "blueprint" of a textual object. The blueprint can help a researcher make a preliminary judgment about whether a particular textual object is worth closer examination. Viewing the Cases In screens 1000 for a group of textual objects allows a researcher to recognize whether there are precedents common to that group. The blueprint tells the researcher whether Textual object A is primarily a statutory construction case, a textual object that relies on local Court of Appeals cases without Supreme Court support, a textual object relying on precedent outside the circuit 1096 as persuasive authority, etc.

The initial Cases In screen 1000 presents every citation within a given textual object. In a textual object with an unusually large number of citations, the screen will be crowded with textual object active boxes 1032. The GUI therefore contains a "zoom" feature that allows the researcher to expand any small portion of the screen. To get back to the "big picture," the researcher simply selects the "Fit in Window" menu item, or else selects the "zoom out" feature. The same "zoom," "zoom out," and "Fit in Window" functions are present in the Cases After screen 1004 and Similarity screen 1008 as well.

The routine that calculates "degree to which Textual object A relies upon the cited textual object" clearly ranks major textual objects at the top, textual objects mentioned only in passing at the bottom, and textual objects of potentially greater relevance in between via display the appropriate textual object active boxes 1032 in the appropriate place. In addition, the routine can recognize when a highly relevant textual object is mentioned only in passing and give a higher weight to that textual object than it would otherwise receive in the ranking procedure.

The "intelligence" behind the entire GUI is driven by the knowledge that the lawyers do not want the computer to do legal analysis or make judgments for them, but simply guide them through the great mass of irrelevant material to those texts where lawyerly analysis of a problem begins.

The Cases In screen 1000 is designed with practical legal research in mind. It is common in legal research to locate a lower court textual object on the correct topic, call it "local Textual object A." However, the researcher desired to find the most persuasive authority available. The aim of this type of research is to find the "lead" textual object or textual objects on a particular topic. The researcher ultimately desires the first textual object, most famous textual object, and most recent textual objects of the Supreme Court (or state Supreme Court in state law issues) that stand for the same principle. ("Lead" textual objects also occur at the intermediate and trial court level.)

The standard way to find lead textual objects is to read through the text of a local Textual object A until one finds references to "higher court textual objects," then look up each of those higher court textual objects in turn. The researcher then reads the text of those textual objects until the researcher determines the textual objects they have in common, the textual objects that appear many times. Very often, the lower court textual object from which the researcher started is of no real value in and of itself—it may well be from a different local jurisdiction—and the researcher reads through it only to find citations within it. Since the GUI quickly locates and schematically diagrams the textual objects, this process is accelerated dramatically using the GUI.

Figure 5E:
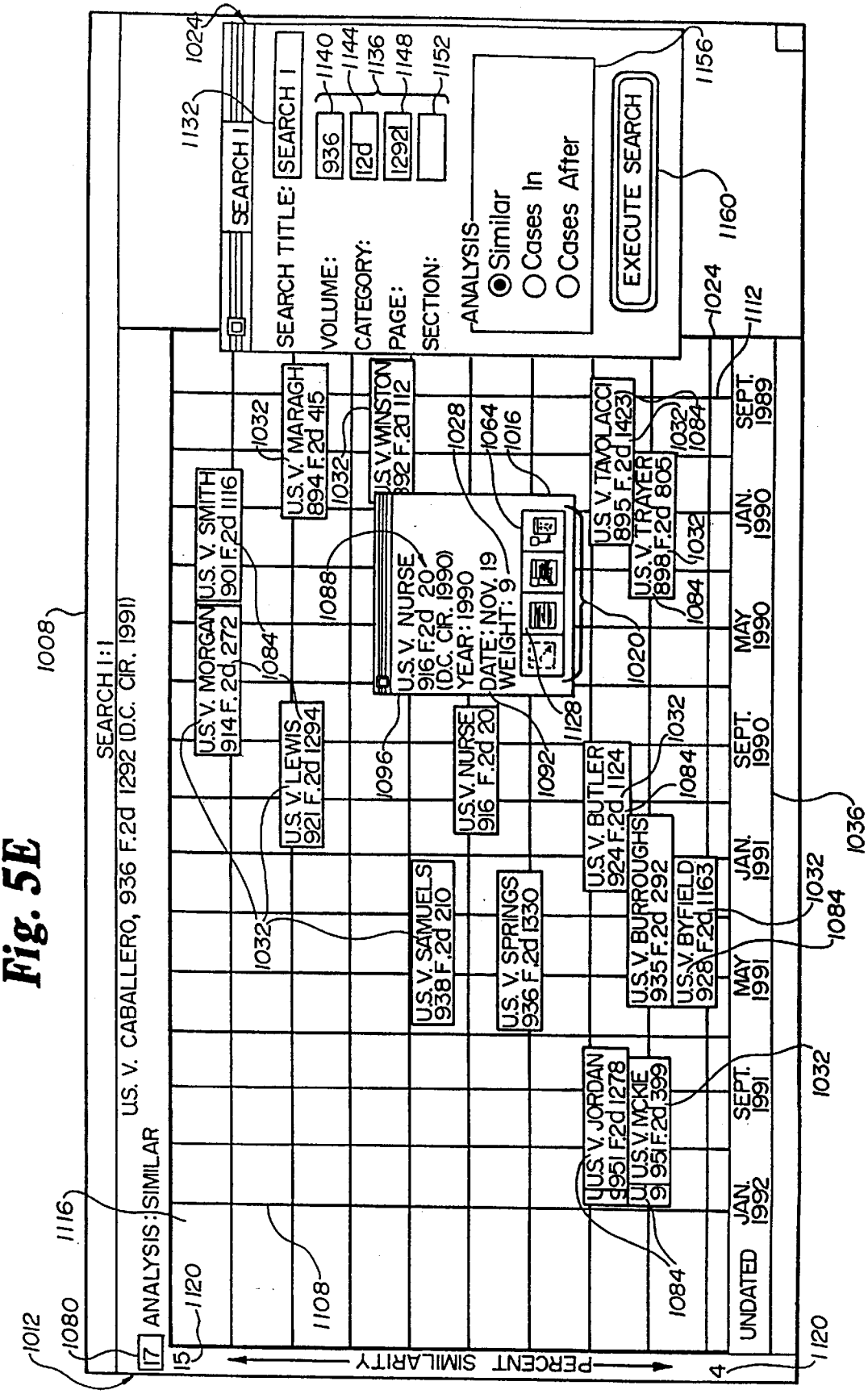
FIG. 5E is an example of the display once the Similar-Cases Display Subroutine (SCDS) is executed.
Figure 5F:
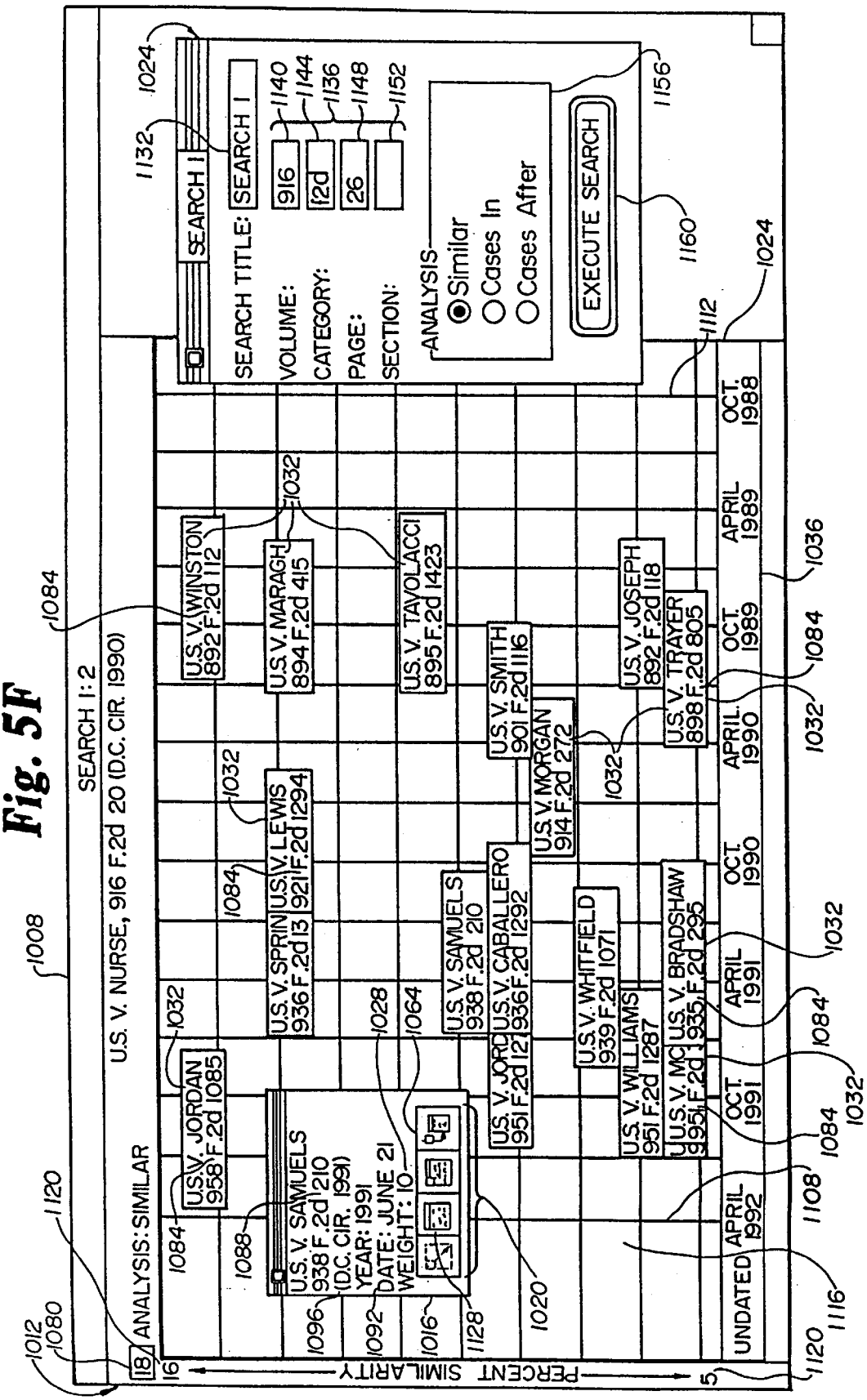
FIG. 5F is an example of the display after a user chooses to execute the Similar Cases Subroutine for a textual object retrieved by the Similar-Cases Subroutine represented in FIG. 5E.

FIGS. 5E through 5G depict multiple Similar Case Subroutine 240 searches run in sequence. A Similarity Screen 1008 for *U.S.* v. *Caballero* 936 F.2d 1292 (D.C. Cir. 1991), reveals via the case number box 1080, that 17 textual objects were retrieved by Similar Cases Subroutine 240 search. The vertical axis 1012 indicates that the textual objects retrieved had similarity coefficients 1120 between 4% and 15% with respect to *U.S.* v. *Caballero*. Textual objects with less than 4% similarity are not shown. The vertical axis 1012 represents degree of similarity, or topical relatedness, so that 100% would be two identical texts. The Tear-Off Window 1016 of *U.S.* v. *Nurse,* 916 F.2d 20 (D.C. Cir. 1990) shows that the textual object has a similarity of 9%.

The Similarity screen for a given Textual object C is organized like the Cases In screen 1000 and Cases After screen 1004, with the same color-coded textual object active boxes representing textual objects, and time on the horizontal axis 1036. However, the vertical axis 1012 represents the degree to which the represented textual object is related to Textual object C. The system is built on the principle that legal doctrines tend to emerge out of lines of textual objects developing a legal principle. Lines of textual objects contain "lead" textual objects that establish basic rules and subsequent textual objects that do not establish new rules, but apply and re-interpret the pre-existing rules in various circumstances. Some lead textual objects invent new doctrines, while others modify or redirect the law based on earlier precedent.

The routine that operates behind the Similarity screen 1008 determines which line or lines of textual objects that Textual object C can be grouped. The routine then ranks the textual objects in that line depending on how closely they are related to Textual object C. For example, a typical similarity search starting with a Court of Appeals case in a certain circuit, Textual object D, will find the Supreme Court and Court of Appeals cases that have established the principles followed in Textual object D. The Supreme Court and Court of Appeals case will appear as textual object active boxes whether or not they are cited in Textual object D. Furthermore, the Similar Cases Subroutine 240 search will find the textual objects decided subsequent to Textual object D that have applied, and possibly modified, those principles, whether or not those textual objects cite Textual object D.

Similarity searches allow a researcher to find textual objects on the same topic that do not share common phrases and might be overlooked by a Boolean word search. Similarity searches also allow researchers, who only have an obscure district court case, to "tap in" to the lead textual objects in any area. By organizing all case law in "conceptual space," the Similarity screens 1008 allow one to locate emerging topics that have not been formally recognized by those assigning "key numbers" or otherwise manually classifying textual objects—or even by the authors of the textual objects themselves.

The "shape" of a Similarity Screen 1008 may convey a great deal of information about a particular legal concept. For example, the screen conveys to the researcher whether a certain concept, which is essentially novel, is supported by Supreme Court case law. Or is an old doctrine that has been recently applied in a new context. The system as a whole gives lawyers the ability to assess what textual objects are "available" on their topic, and to zero in on the textual objects that are most useful. The researcher has the ability to track down every subsequent reference to any particular textual objects by utilizing multiple "Cases After" searches, identifying core precedents through "Cases In" searches, and by running new "Similarity" searches to obtain any textual objects that emerge in closely related topic areas. The "Similarity" algorithm is more "aggressive" then the others, since it contains built-in judgments as to what "relatedness" means. It also judges what is no longer sufficient to display on the screen. The bottom edge of the screen represents a minimum degree of similarity below which the connections are too tenuous to be worth pursuing. In the commercial product, this minimum level can be reset at the preference of the user.

FIG. 5F is the Similarity Screen 1008 for *U.S.* v. *Nurse.* Clicking on the run search Tear-Off Window active box 1128, which is on the Tear-Off Window 1016 for Nurse produces FIG. 5F. Clicking on the Textual Object Active Box 1032 for *U.S.* v. *Jordan,* 951 F.2d 1278 (D.C. Cir. 1991) long enough to pull up its Tear-Off Window 1016, and then clicking on *Jordan's* run search Tear-Off Window active box 1020 (not shown), produces the Similarity Screen 1008 shown in FIG. 5G.

FIG. 5G shows how multiple tear-off windows 1016 can be shown at the same time, here the U.S. v. Jordan similarity Tear-Off Window 1016 depicts for the three textual objects most similar to Jordan. Note that U.S. v. Jordan. 958 F.2d 1085 (D.C. Cir. 1992), is very closely related, i.e., 41%, to U.S. v. Jordan, 951 F.2d 1278 (D.C. Cir. 1991), apparently as it is a subsequent full textual object decision of the same dispute as the first textual object.

Figure 5H:
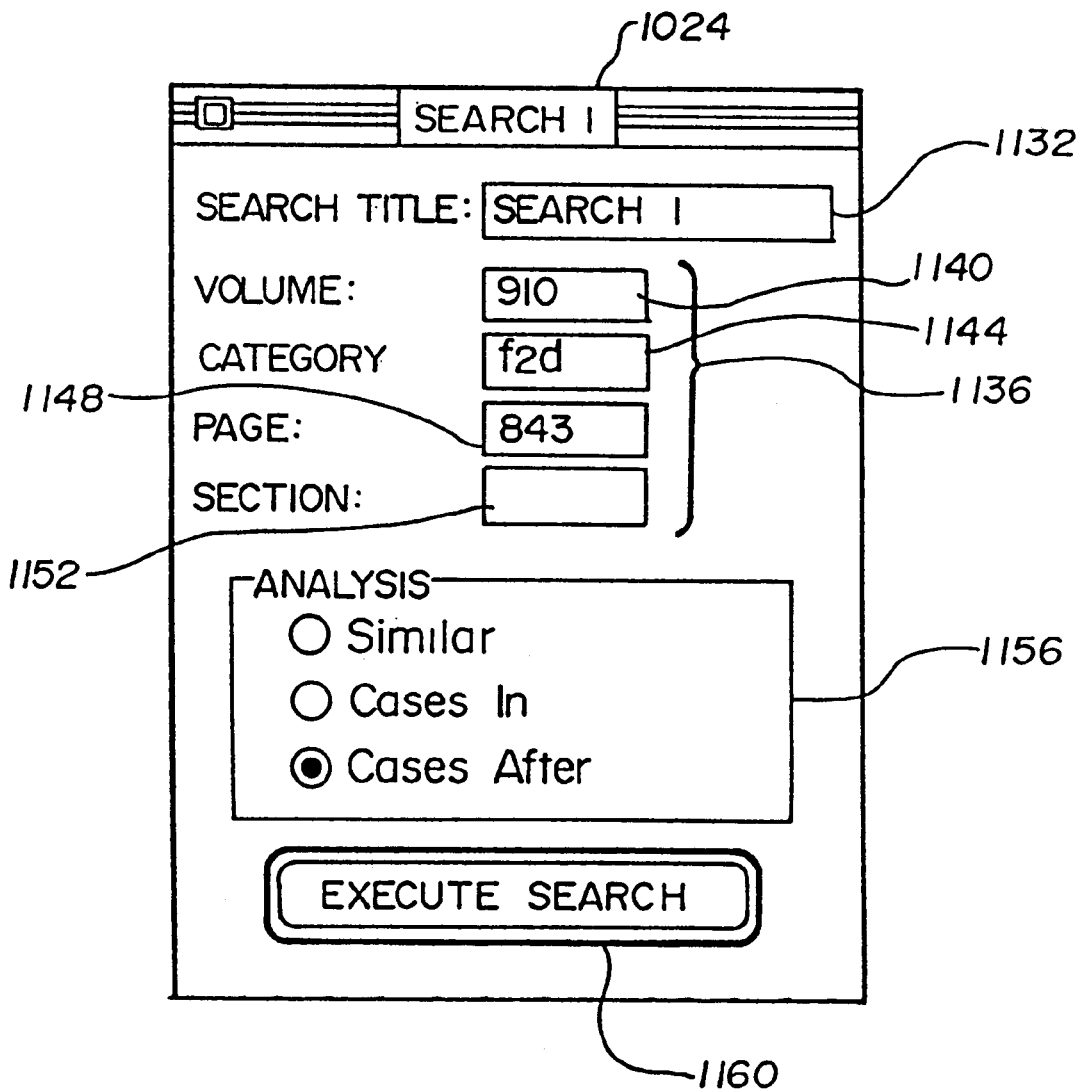
FIG. 5H depicts an Executive Search Window.

FIG. 5H depicts a close-up view of an Execute Search Window 1024. The researcher can input a selected textual object that is either represented or not represented on a display 38 screen as a Textual Object Active Box 1032. The researcher can title his search by inputing the title in the Title Search box 1132. The researcher can then input the reference to the selected textual object in the reference input boxes 1136. The reference input boxes of the preferred embodiment allow the researcher to refer to the selected textual object by Volume, Category, Page and/or Section by inputing the appropriate values in the volume reference box, category reference box, page reference box, and/or section reference box, respectively.

The researcher can also identify the type of search to be performed on the selected textual object by selecting the appropriate search in the Analysis box.

Once the researcher has inputed all the appropriate values, the researcher executes the search by activating the execute search button.

Referring generally to FIGS. 5A through 5H, the PSDS 524, PPDS 528, PIDS 532 and PPSDS 536 of the GUI Program 70, also create similar displays to the CIDS 512, CADS 516, and SCDS 520 subroutines. The only major difference between the screens created by the three textual object display subroutines and the four pool display subroutines is the information contained in the Execute Search window and the options available in the analysis box.

The options in the analysis box enable a researcher to select a textual object outside the pool of textual objects and compare how the selected textual object relates to the pool of textual objects by selecting to the Pool-Similarity Subroutine 244, the Pool-Paradigm Subroutine 248 or Pool-Importance Subroutine 252 of the CSPDM 66.

The PSDS 524 creates a Pool-Similarity Screen 1008. The vertical axis 1012 ranks the similarity of the objects in a pool of textual objects with respect to a selected textual object. All of the other aspects of this display 38 are similar to the Similar Cases Screen.

PPDS 528 creates a Pool-Paradigm Screen. The vertical axis 1012 ranks the similarity of the pool of textual objects on the screen with respect to the paradigm textual object. The paradigm textual object is calculated by averaging the mean of all the Euclidean distances of the pool of textual objects on the screen. All of the other aspects of this display 38 are similar to the Similar-Cases Screen.

The PIDS 532 creates a Pool-Importance Screen. The vertical axis 1012 ranks the importance of the pool of textual objects on the screen. All other aspects of the PIDS 532 display 38 are similar to the Cases-In Screen 1000 and Cases-After Screen 1004.

The PPSDS 536 creates a Pool-Paradigm Similarity Screen 1008. The vertical axis 1012 represents the similarity of all textual objects in the database 54 to the paradigm textual object created by a selected pool of textual objects. All other aspects of the PPSDS 536 display 38 are similar to Similar-Cases Screen 1008.

Before displaying the text boxes 1032 representing result nodes 2104 on the screen to the user, the graphical user interface program 70 optimally organizes and arranges the location of text boxes 1032 on the X and Y axis. In the preferred embodiment, the GUI Program, 70 uses a layout of boxes algorithm to optimally place boxes within a window.

Figure 7:
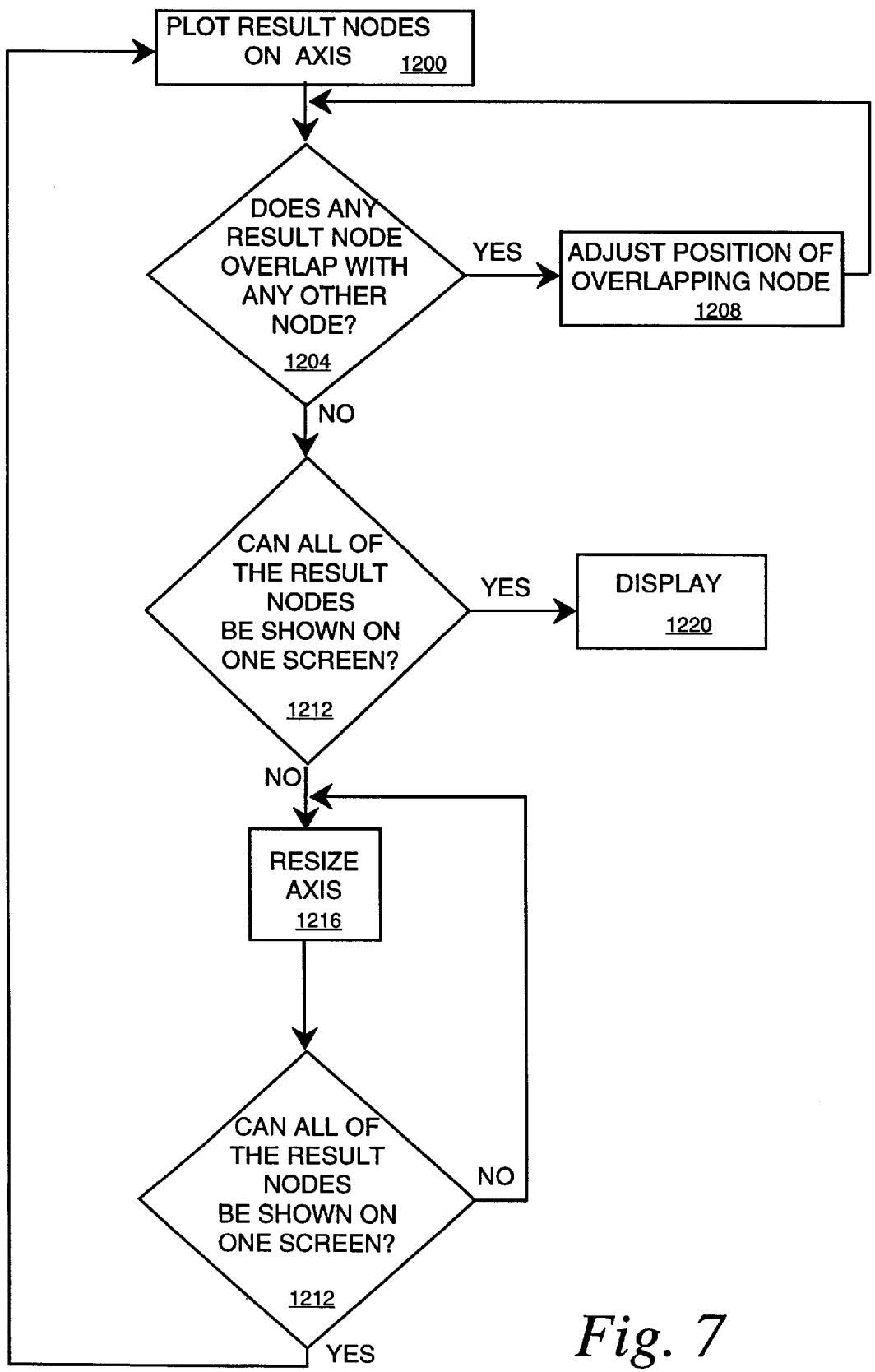
FIG. 7 is a high level diagram of the Layout of Boxes Algorithm.

Referring to FIG. 7, generally, a layout algorithm plots text boxes 1032 on a cartesian axis as determined by their X and Y values 1200. The algorithm compares the locations of boxes 1032 within a display window to determine if there are any overlapping boxes 1204. In order to perform this comparison, the preferred algorithm initializes a first loop, for i=0 to N, and chooses $box_i$ to begin the comparison. The algorithm next creates a second loop, for j=1 to N, and chooses $box_j$ to compare with $box_i$. For both loops, N is the number of result nodes obtained. Performing $N^2$ comparisons provides the optimal number of comparisons needed to determine the existence of any overlaps. If the boxes 1032 are a known size, certain steps may be eliminated from the method.

More particularly, a preferred algorithm compares the X and Y values of a first and second box 1032 to determine if the boxes 1032 are occupying the same Cartesian space 1204. This comparison is accomplished by identifying the X and Y coordinate pairs of the corners of the two boxes 1032, and then choosing one of the coordinate pairs of a corner of the second box 1032 to be compared. The X value of that pair is compared to the X values of all of the coordinate pairs of the corners of the first box 1032. If the X value of the chosen coordinate pair is a value less than all of the first box corner X values or a value greater than all of the first box corner X values, then the algorithm compares the Y value of the chosen pair to all of the first box corner Y values. If the Y value of the chosen pair is either a value less than all of the first box corner Y values or a value greater than all of the first box corner Y values of the first box 1032, then the algorithm determines that the boxes 1032 do not overlap. The algorithm adds 1 to counter j and then repeats the routine. The routine is repeated until j reaches N and then 1 is added to the i value, and the entire process is repeated again. This particular method ensures that every box is compared with every other box 1032.

If during the comparison of the X values the algorithm finds that the X value of the chosen pair is greater than one of the first box corner X values, but is less than one of the first box corner X values, then the algorithm determines that the boxes 1032 overlap. If during the comparison of the Y values the algorithm finds that the Y value of the chosen pair is greater than one of the first box corner Y values but is less than one of the first box corner Y values, then the algorithm determines that the boxes 1032 overlap.

If the preferred algorithm has determined that two boxes 1032 overlap, then the algorithm moves 1208 one of the boxes 1032. Preferably, this is accomplished by adjusting the Y values of the second box 1032 by increasing or adding a predetermined value (to its Y values.) The algorithm performs the above comparison routine 1204 again to see if there is an overlap. If there is an overlap, it moves 1208 the box again. Preferably, it adjusts 1208 the second box's Y value again, and compares 1204 again. If there is no overlap, then the algorithm adds 1 to the j counter and repeats the comparison routine with another box 1032 until $N^2$ comparisons have been completed.

When the preferred layout algorithm has ensured that no boxes 1032 overlaps, the algorithm determines whether the results of the search win fit on one screen 1212. The algorithm compares the Y values of each of the boxes 1032 with the highest Y value represented on a single screen display. If the Y value of one or more boxes 1032 exceeds the highest Y value represented on the screen display, then the preferred algorithm increases the length of the X axis and rescales the Y axis to match (e.g., doubling the length of the X axis) 1216. The algorithm again compares the Y values of each of the boxes 1032 to the highest Y value on the screen to determine if the search results will fit on one screen 1212. If they will not, then the algorithm adjusts the X axis 1216 again and compares the Y values 1212 again until the search results fit on one screen.

Once the search results fit on one screen, the algorithm replots 1200 all of the boxes 1032 to their coordinate positions, and then performs the overlap comparison check 1204 again to see if any boxes 1032 are overlapping. If boxes 1032 are overlapping, the algorithm performs its adjustment step 1208 and the axis resizing step 1216 until the window displays 1220 all of the result nodes on a single screen without any of the boxes overlapping.

At the option of the user, the algorithm can allow the display 1220 to scroll off the screen in the Y direction or the X direction without resizing 1216 the axes. This option enhances the information content of the map by keeping the scale of the axes small.

The preferred algorithm can perform this routine by adjusting 1208 the X axis, the Y axis, or both axes. The algorithm has the additional capability of graphically breaking an axis, if one or a few result nodes 2104 are so far away graphically from the main body of result nodes 2104 that representing the far away result nodes 2104 would unnecessarily encumber the graphical display of the main nodes. This graphical break may be represented by a squiggly line at the break point in the axis. Using this axis break allows all of the result nodes 2104 to be displayed on one window, and still maximizes the informational content that the relative spacing on the X or Y axis provides for the result nodes 2104 which are positioned closer together.

Various other specific methods of optimally organizing and locating boxes 1032 on a graphical computer display 38 may be used with the GUI Program 70.

In the preferred embodiment, the graphical user interface 70 maximizes the types and quantity of information about particular boxes 1032, nodes 2008, objects in the database 54 that can be displayed without visually overloading the user. The preferred embodiments ergonomically and efficiently represent complex data sets. Each embodiment must strike a balance between that which is technically and intellectually possible to be displayed on a screen, and that which can be visually understood and comprehended by the typical user of the database 54 (on a screen). This method can also be used to display objects retrieved from a network, but it is not the preferred method at the present time.

Figures 1, 8:
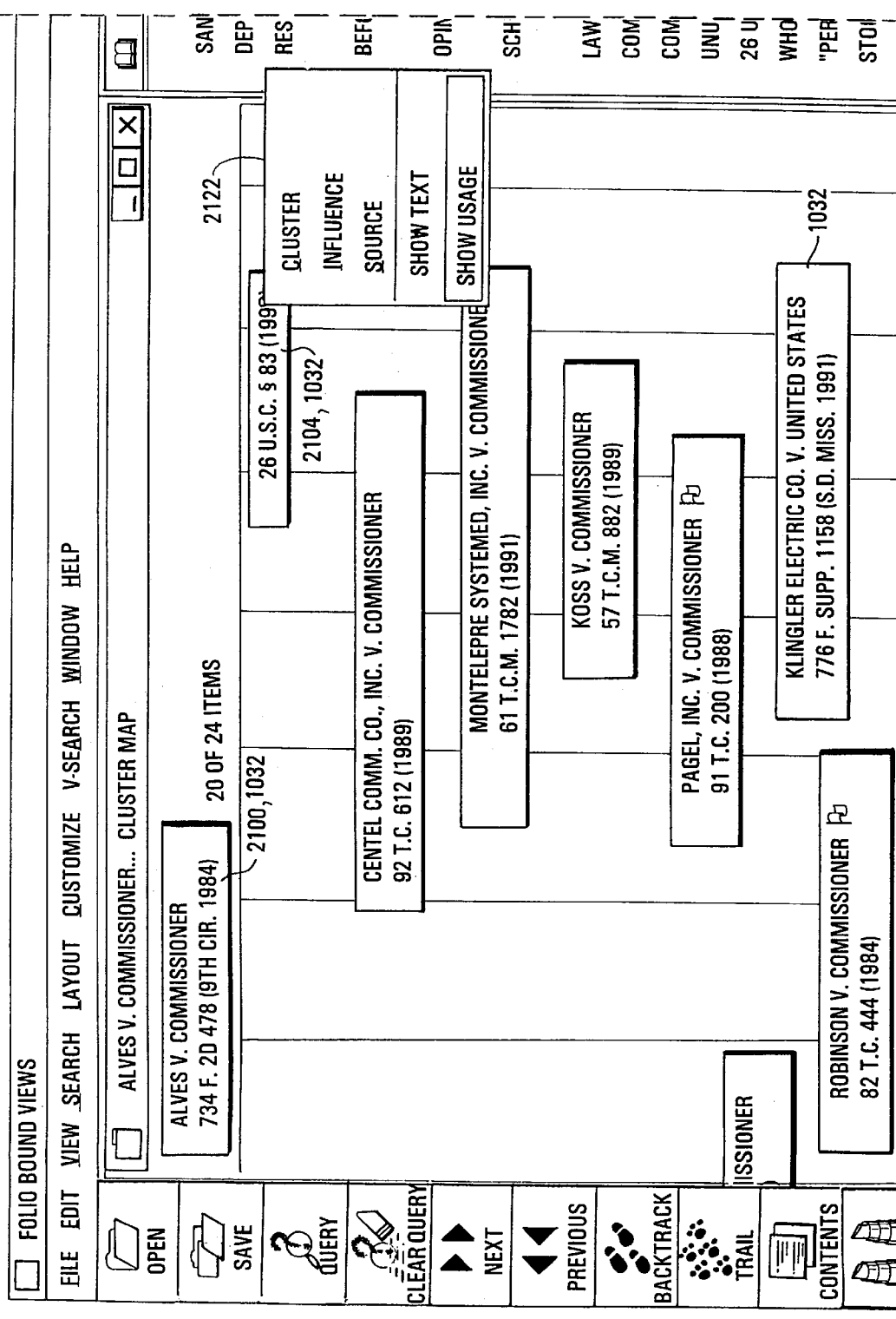
FIG. 8 is a diagram of a screen showing execution of a show usage command.
Figures 2, 8:
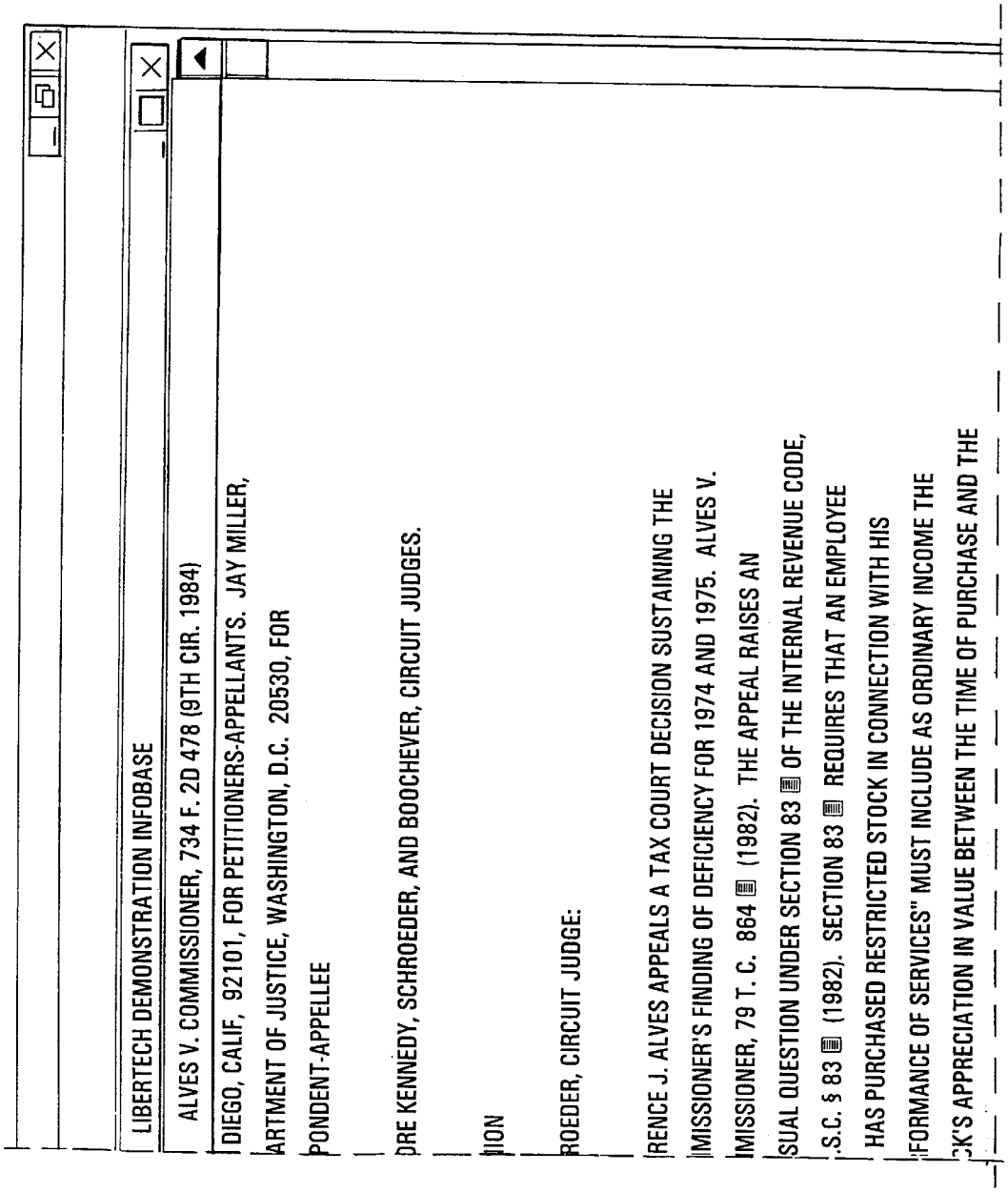
Figures 3, 8:
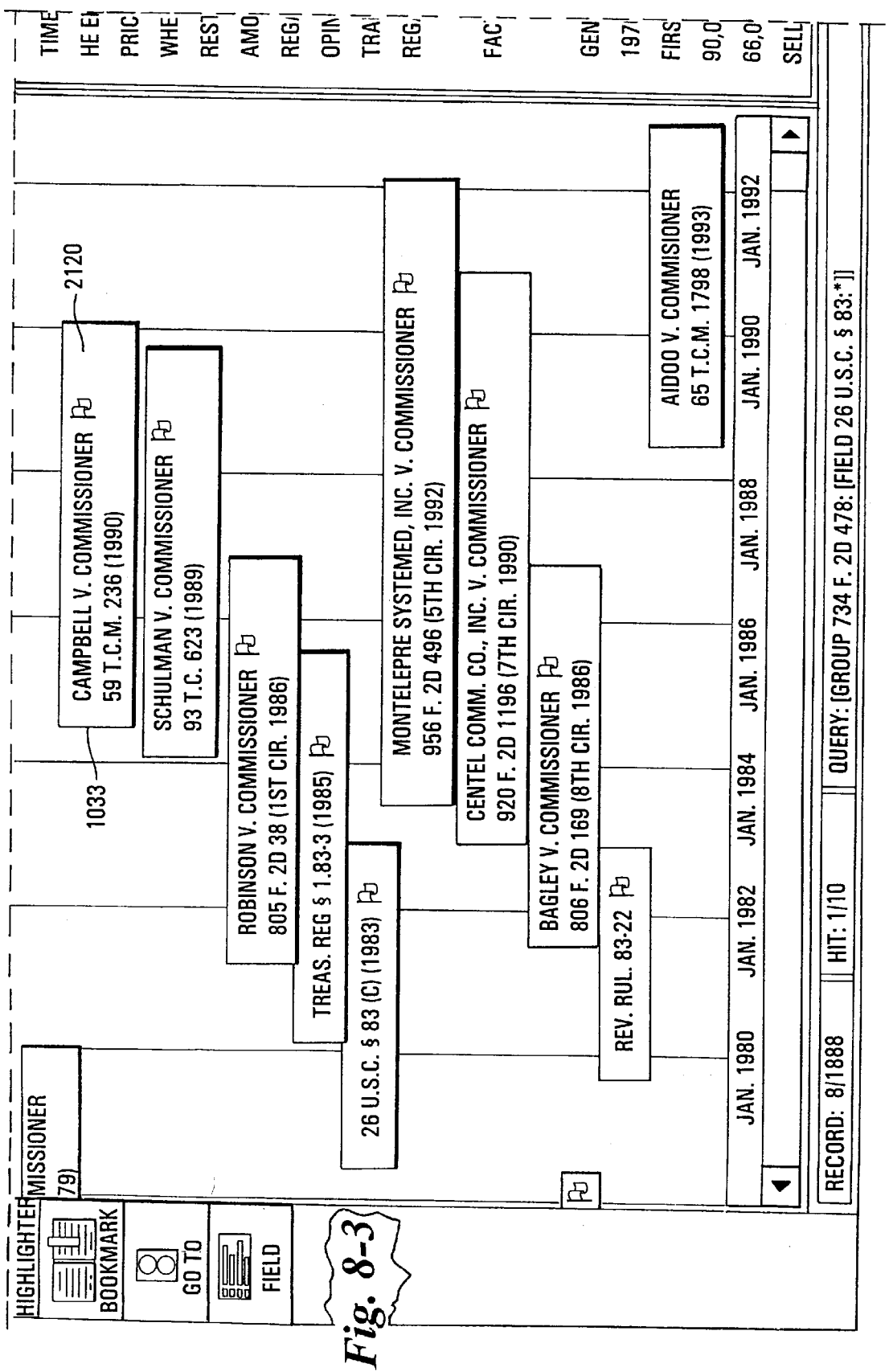
Figures 4, 8:
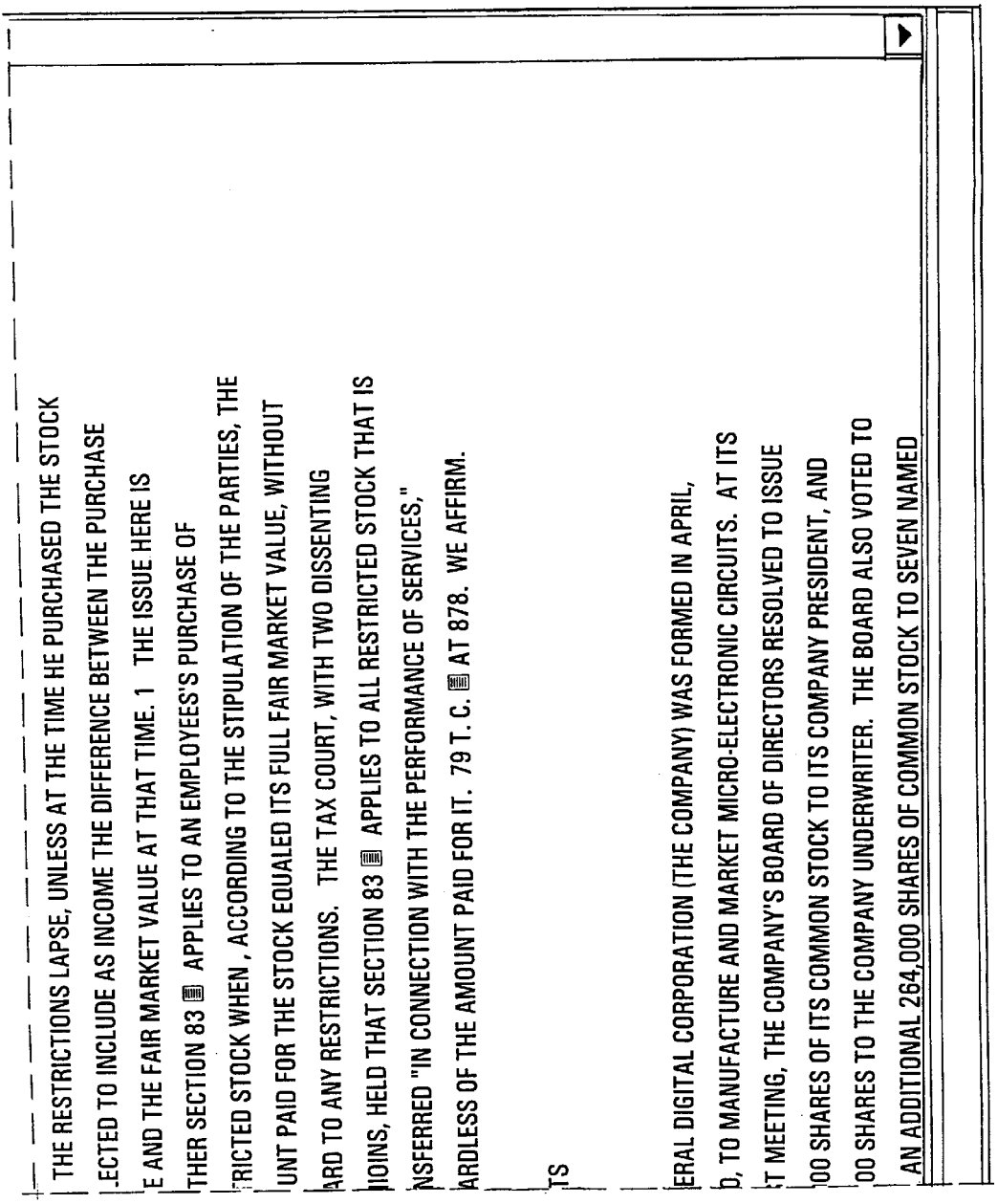

An important feature of the invention is its use of a three-dimensional box to communicate information to the user, in addition to the information provided by the location of the box in the X and Y coordinates. Referring to FIG. 8, in the preferred embodiment a three coordinate view or map is displayed on a two dimensional CRT screen. The variables represented by the X, Y, and Z coordinate planes may be interchanged from one coordinate to another. In other words, the X, Y or Z coordinate plane may represent, for example, the variable time. For use of the Z coordinate, it is preferred that a six-sided box 1033 be used and appear to be "floating" at its appropriate location in the Z direction. More importantly, the invention also can use the depth of the box 1032 (size of the box 1032 in the Z direction) to convey additional information to the user (in addition to the information provided by the location of the box 1032 in the X, Y, Z coordinate).

First, using box depth, a bit of binary information is passed along to the user by the fact that the box 1033 has no depth (little or nominal depth) or the box 1033 has a significant depth in the Z direction. In the preferred embodiment, this binary piece of information informs the user of whether or not there is available (hidden) data associated with that box 1033. For example, a box 1033 or node which represents an object in the database 54 may have associated graphics, maps, menus, or text which is not shown. If the box 1033 is shown on the screen as having a significant depth then additional data associated with that box 1033 is available for viewing by the user. If the box 1033 has nominal or no depth then there is no additional data available to the user.

In addition to the binary information of whether or not additional data is available to the user, in the preferred embodiment the magnitude of the depth of the box 1033 corresponds to the amount of additional or hidden data available to the user. For example, if the box 1033 represents an object in the database 54 which has an extensive amount of associated data the magnitude of the depth of the box 1033 would be large in comparison to other boxes 1033 on the same screen. In this manner, a box 1033 which represents, for example, a textual object of great length would have a larger depth than a box 1033 representing a textual object with little or no text associated with that object in the data base. In this manner, important information is visually passed to the user easily and on the same screen on which other information about the database 54 is being presented.

Also, in advanced embodiments, the depth of a box 1033 or the fact that a box 1033 has depth may be used to represent to the user that the box 1033 enables the user to tie-in or access another application, program, menu, extension, and/or another database 54. In this way, active boxes 1033 with depth can allow a user great flexibility to move around within the database 54 or within associated database 54s or even to access other applications. This can be particularly useful when the underlying data supporting a node or box 1032 is not located locally at the user's location and requires the user to access communication links or a second database 54 in order to obtain the underlying data. With this invention, the user is able to access the underlying data from the graphical user interface screen.

Also in advanced embodiments, an axis may represent a variable such as cost data associated with a node 2008 or the cost of accessing the underlying data. In one example, if the data is available only through a separate application which may impose a cost, the box's depth would increase in proportion to that cost Or, if the application itself imposes a cost for accessing data, then the depth of each box 1033 would represent the cost of accessing that box's data.

In summary, the depth of a box 1033 provides two types of information. First, binary-type information regarding the presence of additional data or information, or lack thereof, and second, based on the relative measure of the depth of the box, 1033 the amount or size of the underlying data or information which is available and associated with that box 1033. Thus, a box 1033 can be activated and brought to life so that there is an extension that points to either data or another entity independent of the original database 54 which assist the GUI 70 user.

Additional information concerning the database is presented by this invention by the intelligent use of comments. Comments attached to the textual object boxes provide the user with easy access to vital information contained in the database. FIG. 3e shows the various information types which can be added to the database 54. For Example, FIG. 3e shows that links 2004 are assigned weights 2032, that nodes 2008 are assigned node identifications (IDs) 2010 and plot dates 2011 (creation date or the like), that link sub-types 2020 can be assigned names 2021, comment descriptors 2022, comment display orders 2023, comment place holders 2027 and always display comment commands 2030, that node sub-types 2024 can be assigned names 2021 and title descriptors 2026, that node types 2016 can also be assigned names 2021 as well as extra attributes in an extra-attributes table 2016, that link types 2012 can be assigned names 2021 and icon files 2014 for icon graphics and various visual styles 2028 can be assigned to nodes 2008 and links 2004. In addition to those items specifically described, various attributes can be assigned to links 2004, nodes 2008 and link sub-types 2020 and node sub-types 2024. The various additional information which is stored in the database 54 can be shown on maps or on menus when using the database 54. These identifications can be used as part of the searching algorithms discussed previously.

Figure 9:
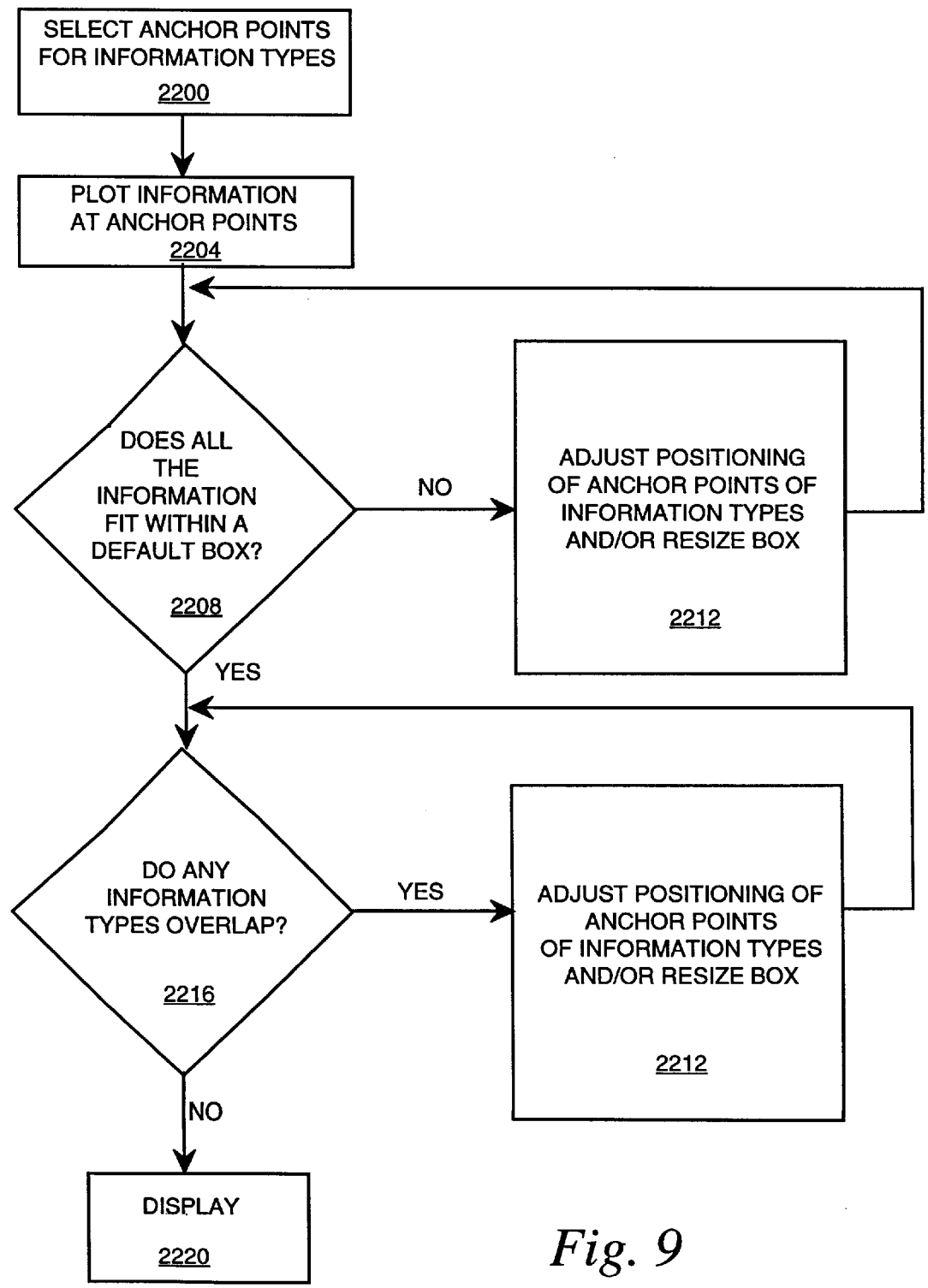
FIG. 9 is a diagram of the Internal Box Layout Algorithm.

A unique feature of the graphical user interface program 70 is its ability to optimally space the information within displayed objects. More particularly, the GUI program 70 arranges text and graphics within boxes 1032 or the like on a computer display 38 screen. The preferred GUI Program achieves this by using a box spacing algorithm as shown in FIG. 9. A preferred box spacing algorithm is described below.

The boxes 1032 used by the preferred GUI Program 70 generally include different types of information or data such as box titles, textual information, and graphical information within the box 1032, as discussed previously. The information types may be assigned to nodes 2008, node sub-types 2024, links 2004, or link sub-types 2020. Preferably, the GUI 70 defines and/or selects points in the box 1032 to serve as anchor points 2200 for each type of information. For example, the GUI 70 may designate a point 2200 near the upper right hand corner of a box 1032 as the anchor point for the graphical information, the lower left hand corner as the anchor for the textual information, and the upper left hand corner as the anchor point for the box title. In the preferred embodiment, the algorithm finds an arrangement which keeps the size of the boxes as small as possible while preventing overlaps between the different types of information.

Also, the preferred embodiment adjusts the positioning 2212 of the information or data within the box 1032 to make the box 1032 aesthetically pleasing. Preferably, the anchor points are moved or adjusted to arrange or rearrange the content within the box.

Referring to FIG. 9, generally, the box spacing algorithm plots 2204 the information types at their designated anchor points and determines whether the plotted information fits within the default box size 2208. If necessary, the box 1032 is resized 2212. Following, the algorithm checks for any overlap of information types within the box 2216 and adjusts the location of anchor points 2212, if necessary.

The overlap checking function performed by the preferred box spacing algorithm is similar to the overlap checking function performed by the preferred layout algorithm discussed above. Various tolerances or thresholds may be set to ensure that the information or data within the box 1032 not only does not overlap, but is sufficiently spaced so that it can be easily understood by a user. If the information overlaps, the anchor points are moved and/or, the boxes are reshaped. Finally, the processed boxes are displayed 2220.

More particularly, to perform the function of arranging anchor points and reshaping boxes, the preferred box spacing algorithm initializes a loop, for i=0 to N, where N is the number of information types to be displayed on the box; chooses information type$_i$ and then initialize a second loop, for j=1 to N; and chooses information type$_j$ to compare to information type$_i$.

The preferred algorithm plots 2204 the first information type on the box 1032 at its designated anchor point. The algorithm plots 2204 the information beginning at the anchor point and fills out horizontally or vertically from there until the information is plotted. After plotting, the algorithm determines if the information fits within a normal or default box size 2208. If the box is too small, the algorithm may adjust 2212 the box 1032 dimensions horizontally or vertically to accommodate the size of the information.

The algorithm then plots 2204 the second type information in the box 1032. After this information is plotted, the algorithm determines X and Y values of the first information type (using the left and lower edges of the main box as coordinate axes) and compares 2216 them with the X and Y values of the second information type. The box spacing algorithm performs this function in the same manner as the layout algorithm performs its comparison function.

If there is an overlap, then the algorithm preferably attempts to adjust the location of anchor points 2212 to eliminate overlap. If this is not possible, the algorithm adjusts the size 2212 of the box by a set value in either the X or Y direction. The algorithm re-plots the information types 2204 at their anchor points. Preferably, the anchor points generally remain in the same relative position in the box, but as the box increases in size, the anchor points are in an absolute sense farther away from each other. After adjustments, the algorithm runs the comparison routine 2216 again to determine if the two information types overlap or are aesthetically displeasing. A box 1032 may be aesthetically displeasing if the data within the box 1032 is not evenly or symmetrically distributed, or if data is too close.

If the information types are appropriately spaced within the box, the algorithm adds 1 to the j counter, and compares 2216 the first information type to the j+1 information type. The algorithm continues to compare 2216 information types until the first information type has been compared 2216 with all of the information types in the box 1032. Then, the algorithm routine returns to the i loop, adds 1 to i, and then compares 2216 the second information type to the other information types until the second has been compared 2216 to all of the information types. If the algorithm ever finds an overlap, the algorithm adjusts 2212 the location of the anchor points and/or the size of the box as described earlier to fit in all of the information. Once the algorithm has compared the information types 2216, found no overlap, and found that the information fits 2208 within the box 1032, it displays 2220 the box 1032. In this way, the graphical user interface program 70 ensures that the information types displayed by the boxes 1032 do not overlap and are aesthetically pleasing, while keeping the size of the box 1032 to a minimum.

Figures 1, 10A:
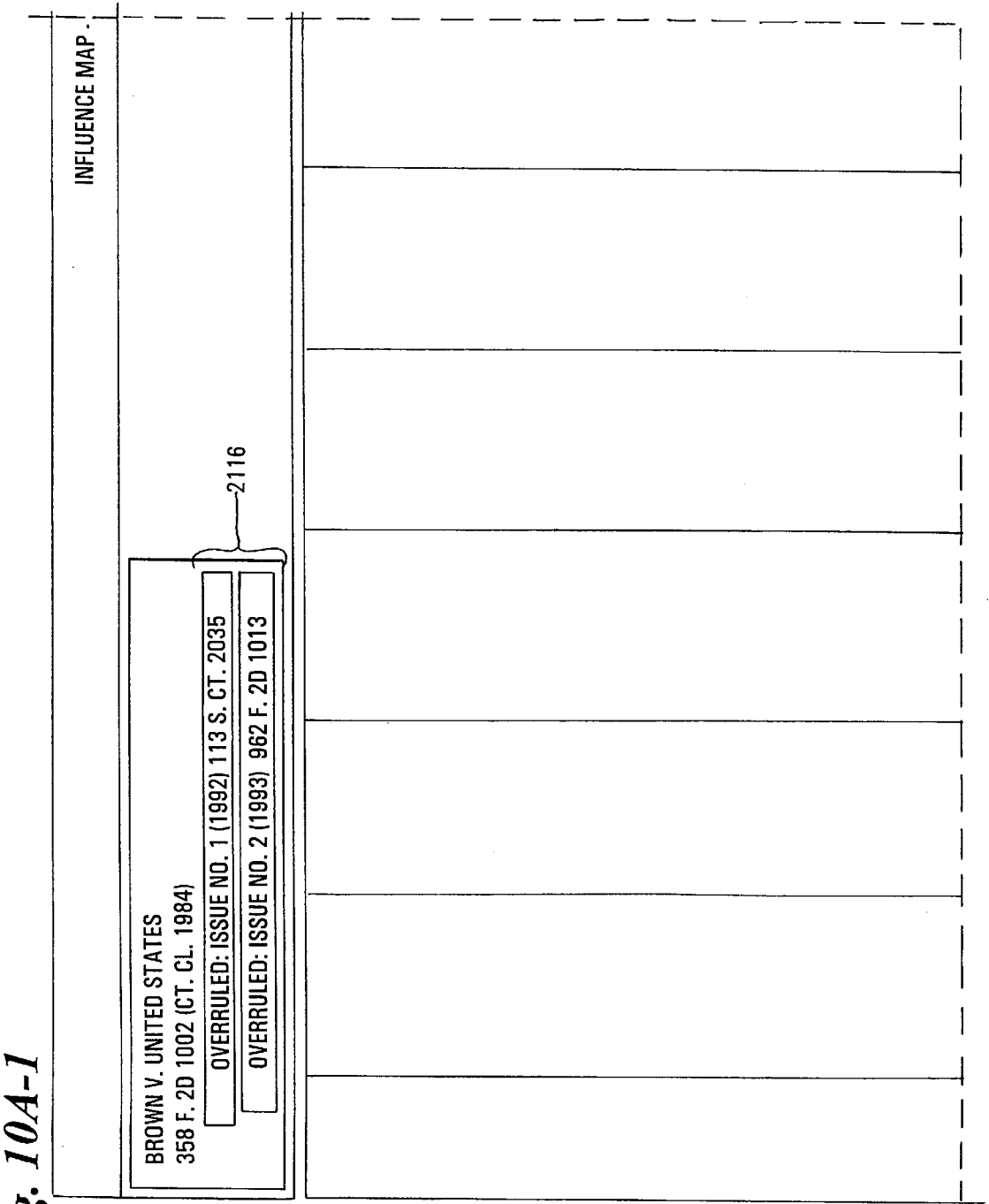
FIG. 10A is a diagram of a screen showing an Influence Map, which is a screen used in one embodiment of this invention.
Figures 2, 10A:
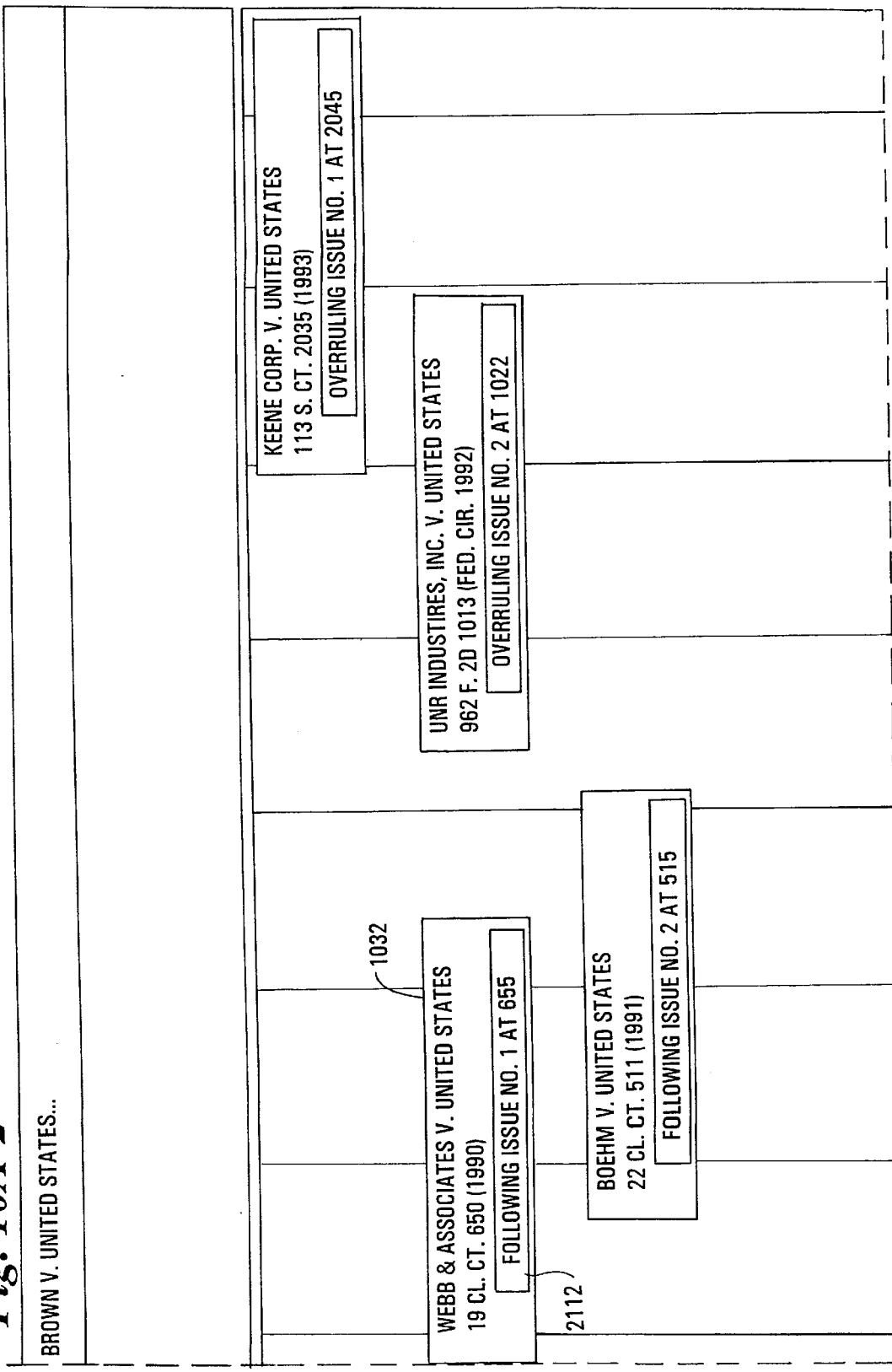
Figures 1, 10B:
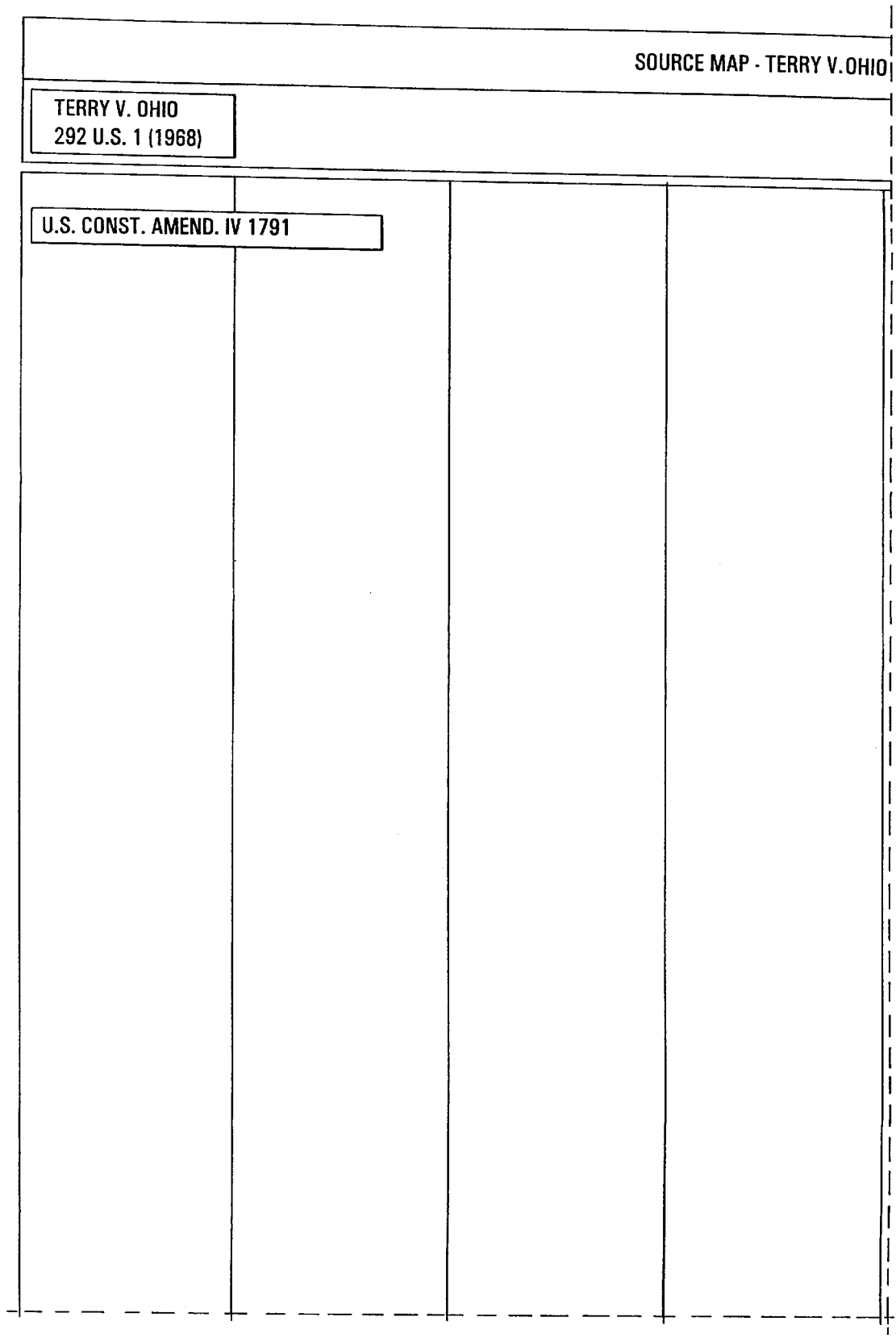
FIG. 10B is a diagram of a screen showing a Source Map, which is a screen used in one embodiment of this invention.
Figures 3, 10B:
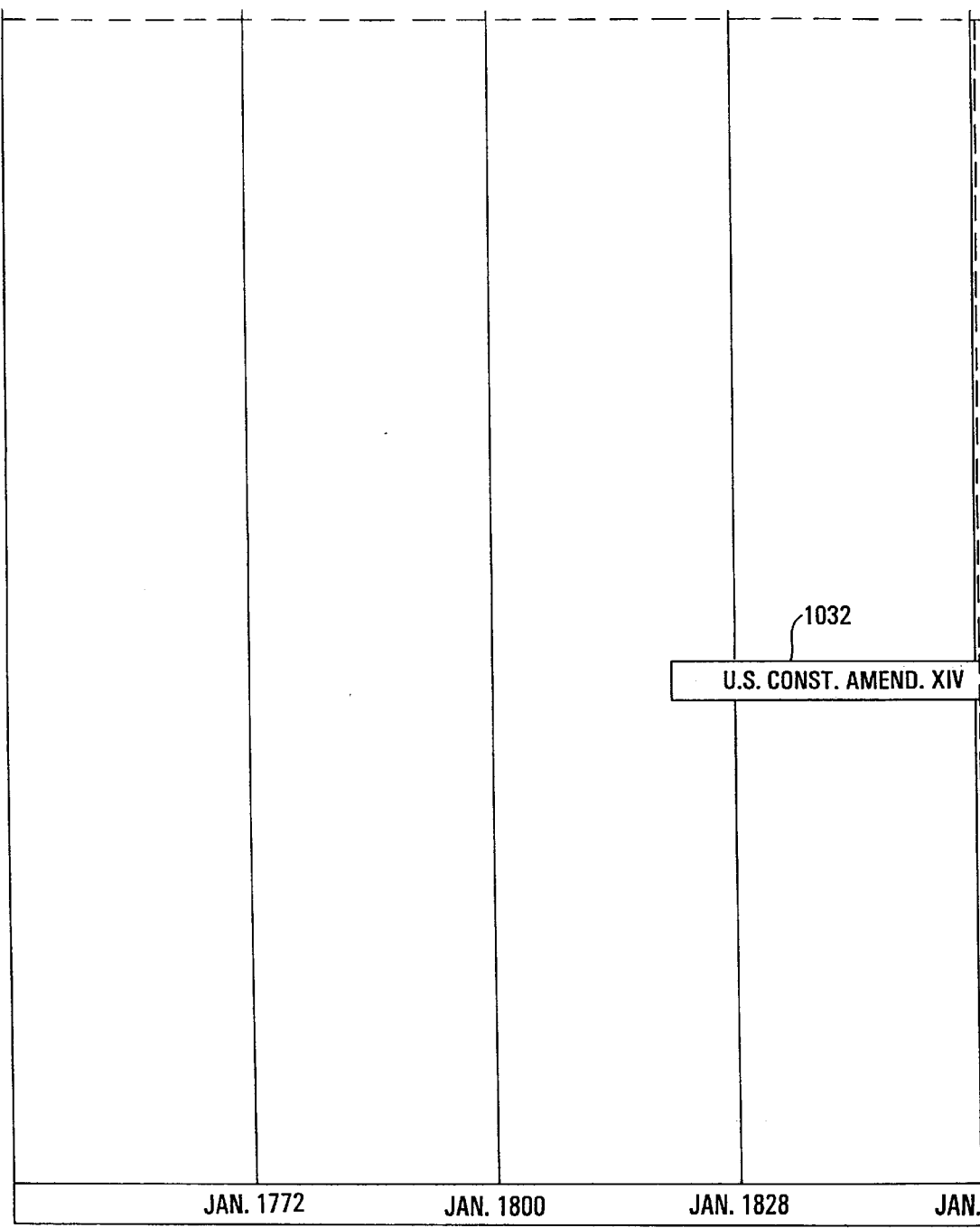
Figures 4, 10B:
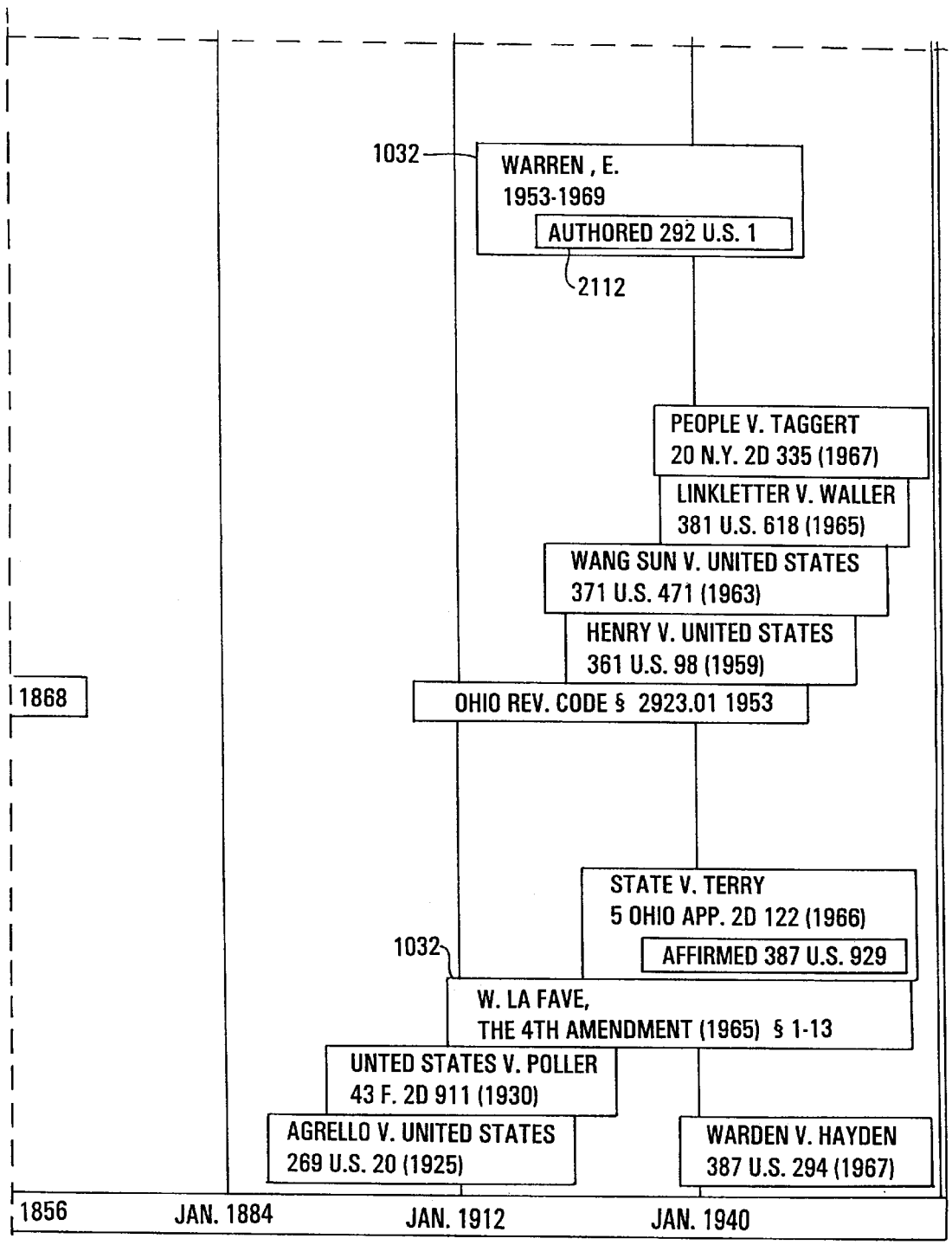

Many box spacing algorithms may be used with the GUI 70. Many variations of the described algorithm are possible which will perform the function of spacing text and/or graphics within a circumscribed space on a display 38. In the preferred embodiment, as shown in FIGS. 10A and 10B, comments 2112 are used extensively on graphical displays to assist the user in understanding the data and relationships of the data the user is viewing. In this manner, a great deal of information about a node 2008 or a link 2004 can be placed in or around a graphical box 1032 display for the node 2008. With this information a user has a better understanding of the relationship between data and the database 54 and the graphical box 1032 represents more than just a location in the X, Y and/or Z coordinate plane.

The comment descriptor 2022 shown on FIG. 3e allows comments 2112 to be assigned to a particular link sub-type 2020 and for these comments 2112 to be displayed on the node box 1032 of a linked node 2008. It is preferred that this comment descriptor 2022 assigned to a link sub-type 2020 be placed on the to-node 2008 of the link 2004. Some examples of possible comment descriptors are "overruled by," "criticizes," "distinguishes." When a node box 1032 is displayed, these comment descriptors may be shown in any portion of the node box 1032. In a preferred embodiment, the node box 1032 is subdivided into three parts: (1) a title place holder part; (2) a graphics place holder part; and (3) an indicator part.

To specify the specific place within the node box 1032 that the comment 2112 will be displayed, a comment place holder 2027, which is a more specific type of the anchor point discussed previously. In the preferred embodiment, a comment place holder 2027, may specify three different place holder 2027 areas (title area, indicator area, or graphics area) in the node box 1032 in which the comment is to be displayed. Various other place holder 2027 options within or in the vicinity of a box are possible.

Also, using the commands available through the comment display order 2023 or the always display comment commands 2030, the user or designer of the database 54 may specify when particular comments 2112 will or will not be displayed and in what position the comments 2112 will be displayed. In the preferred embodiment, the always display comment 2030 is used to make a comment 2112 always available or globally available at any time it is relevant. In other words, the comment will be displayed whenever the to-node box 1032 is drawn on any map. It is preferred that this global comment be used whenever a comment is so important that it should be shown whenever relevant.

The comment display order 2023 specifies the order or preference in which to display multiple comments 2116 in one comment place holder 2027. In the preferred embodiment, a number in the range of zero (0) to two hundred fifty-five (255) is assigned as the priority of any specific comment 2112. Wherein zero (0) signifies that the comment 2112 has high priority and should be displayed at the top of the title or indicator place holder or on the left in the graphics place holder while a value of two hundred fifty-five (255) means that the comment 2112 has very low priority and should be located at the bottom of the title or indicator place holder 2027 or on the right in the graphics place holder.

The always display comment 2030 can be simply a binary value of zero (0) or one (1) wherein if the value is zero (0) the comment 2112 is only displayed on the to-node 2008 when a link 2004 of the specified link type 2012 is represented on a map and the from-node 2008 is also on the map. A one (1) means that the comment 2112 is displayed on the to-node 2008 at all times whether or not the from-node 2008 appears on the map.

Figures 1, 10C:
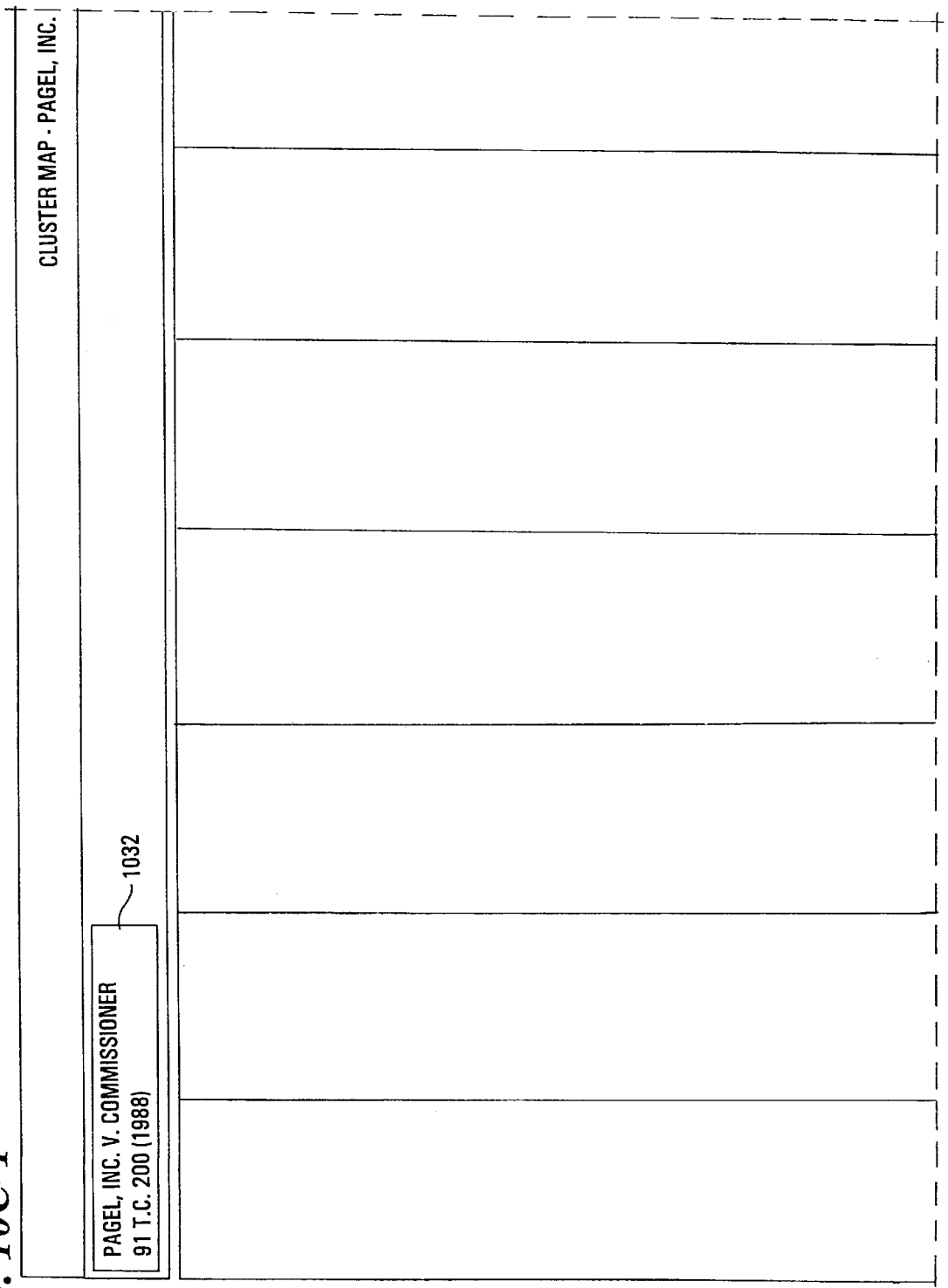
FIG. 10C is a diagram of a screen showing a Cluster Map, which is a screen used in one embodiment of the invention.

Comments 2112 may be active or inactive. Active comments 2112 provide another means for a user to navigate in the database 54 in a customized and flexible manner. Active comments 2112 allow a user to jump or to access a menu, a map or an extension by selecting the comment 2112. The active comments 2112 may also allow a user to jump into a particular object in the database 54. In the preferred embodiment, comments 2112 which are always displayed or are global comments are preferably active comments. Comments 2112 which are assigned low priorities and/or are not global are preferably not active comments 2112. Referring to FIG. 10C, the comment 2112 may be an icon or graphics such as the red flag 2120 shown in the node boxes 1032.

Coloring, shading, texture and background can be useful and very effective tools for visually passing information to a user. Shading, texture or coloring can be used both within boxes 1032 on the screen and in the background area of the maps or screen displays. The coloring or background inside a box 1032 can represent a particular data type. In one embodiment, the user chooses a color to assign to all the distinct data types used in the database 54. When the user subsequent uses the invention, the invention will display those data types in the color chosen by the user. For example, in a medical database where boxes 1032 represent patients, patients admitted through an emergency room can be assigned a different color box 1032 than patients admitted through a normal process, or patients that survive a procedure may have a different color box 1032 than patients who die. This allows a user to see at a glance what type of data he or she is looking at. Changing the color between boxes 1032 is particularly useful and is discussed in further detail later.

Some of the preferred uses for passing additional information through the background are changing the background type of a map at a particular point on the X, Y, or Z coordinate. A specific example would be changing the background coloring on a map at a particular point on an axis where that point on the axis represents an average, a median, or an important date. Another example is creating a background coloring band between two points on the same axis representing an acceptable or ideal range for a variable. Either the computer or the user can choose what value to change the background type around. The background can change on more than one axis creating "panels" or areas within a map or screen.

Finally, for purposes of consistency within a particular application of the graphical user interface 70, the coloring of the background of maps of the same type are preferably the same or similar. For example, source maps showing the source for a particular searched object may all have yellow background while influence maps which show objects that have been influenced from an identified object may all have a blue background for the map. In this way, background, coloring and texture can play an important role in visually providing information to the user on a map or screen with the present invention.

In order to present the most aesthetically pleasing display or output, the preferred GUI Program 70 chooses an optimal bit map 2300 or swatch to create a graphical display. In particular, the GUI 70 determines the color, resolution, and style supported by a display 38, output from a printing device or any other computer output. The GUI Program 70 preferably accomplishes this by categorizing general types of displays 38 and output devices and assigning bit maps 2300 or swatches for use with those general types. These general types may include types of printing devices such as color printers, laser printers, inkjet printers, dot matrix printers and types of displays such 38 as black and white monitors and color monitors with differing resolution capabilities. This feature of the GUI 70 chooses the optimal bit maps 2300 or swatches to use as fill-in on boxes 1032 and the like used in the graphical display.

Figure 11:
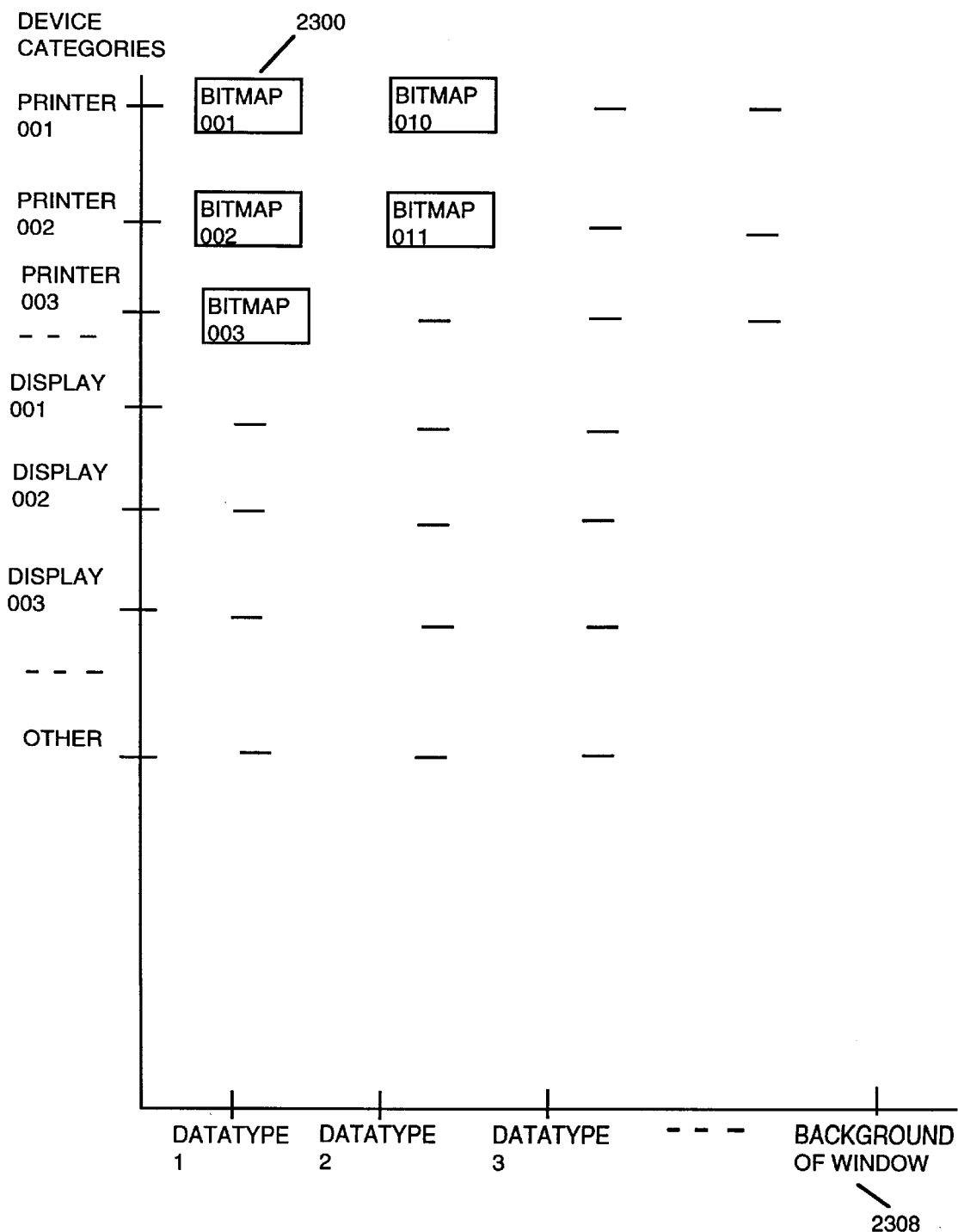
FIG. 11 depicts a Look-Up Table for Bitmaps.

To achieve this capability the GUI Program 70 preferably uses an algorithm to determine what type of display 38 or printer or other output device is being used by the user. The algorithm then matches that type with one of the general types of categories stored in a look up table 2304, as shown in FIG. 11. If the type of display 38 or output device is an exact match with one of the stored types, then the algorithm instructs the GUI Program to use the bit map 2300 indicated by the table. If the type of display or printer does not match with one of the stored types, then the algorithm determines the optimal bitmap 2300 for this display 38 or printer.

The preferred bit map fill algorithm determines an optimal fill by determining the category the display 38 or printer being used is closest to, and then picking a bitmap 2300 according to certain weighted factors. The algorithm preferably chooses a bitmap 2300 or swatch that will optimize the color depth and resolution of the display 38 or printer. If both color depth and resolution cannot be optimized by one bitmap 2300, the algorithm preferably chooses a category of bitmaps which will optimize the display 38 or printer's color depth, and then looks in that sub-category for bitmaps 2300 which will optimize its resolution. The use of this algorithm results in graphical outputs that take advantage of the user's hardware capabilities.

The GUI Program 70 also preferably uses the look up table to determine the best bit map 2300 to be used as a background for the windows 2300. The GUI Program 70 executes an algorithm which determine what type of display 38 is being used and accesses the look up table 2304 to determine the preferred bitmap 2300. If the type of display 38 being used is not in the table, the algorithm preferably selects the bitmap 2300 that is the best fit, again weighing factors such as color depth and resolution in determining the best bitmap 2300 for display as a window background 2308.

It is preferred that the graphical user interface (GUI 70) use a windows approach or a Windows® type application. The preferred GUI 70 for a database 54 is unusual in that during the normal course of operation it is common (in fact preferred) for many search map windows (1000, 1004, 1008) to be visible at any given time. The preferred GUI 70 embodiments utilize various mechanisms to help manage these windows (1000, 1004, 1008) and avoid confusing the user with too many "open" or active windows (1000, 1004, 1008).

An example of the type of hardware which may be used to implement a preferred window management system is shown in FIG. 1. Specifically, it is preferred that a processor 30, display 38, memory 34, 58, and a input device such as a mouse 42 or keyboard 46 are used. Although the GUI 70 is described primarily for use with a database management system, the GUI 70 may be used with many other software applications and in many other hardware configurations.

Figures 1, 13A:
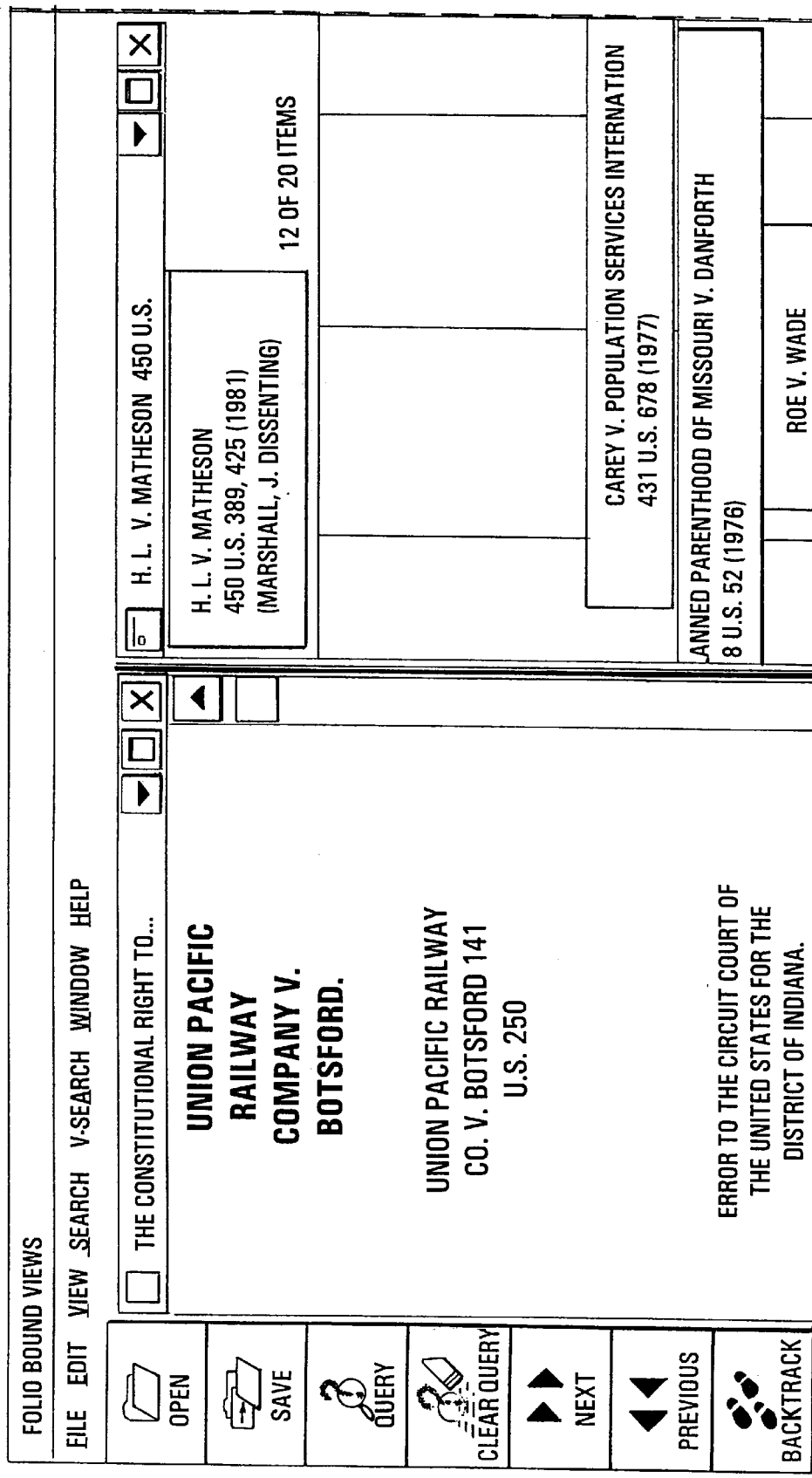
FIG. 13A is a depiction of a display with vertically tiled windows.
Figures 4, 13A:
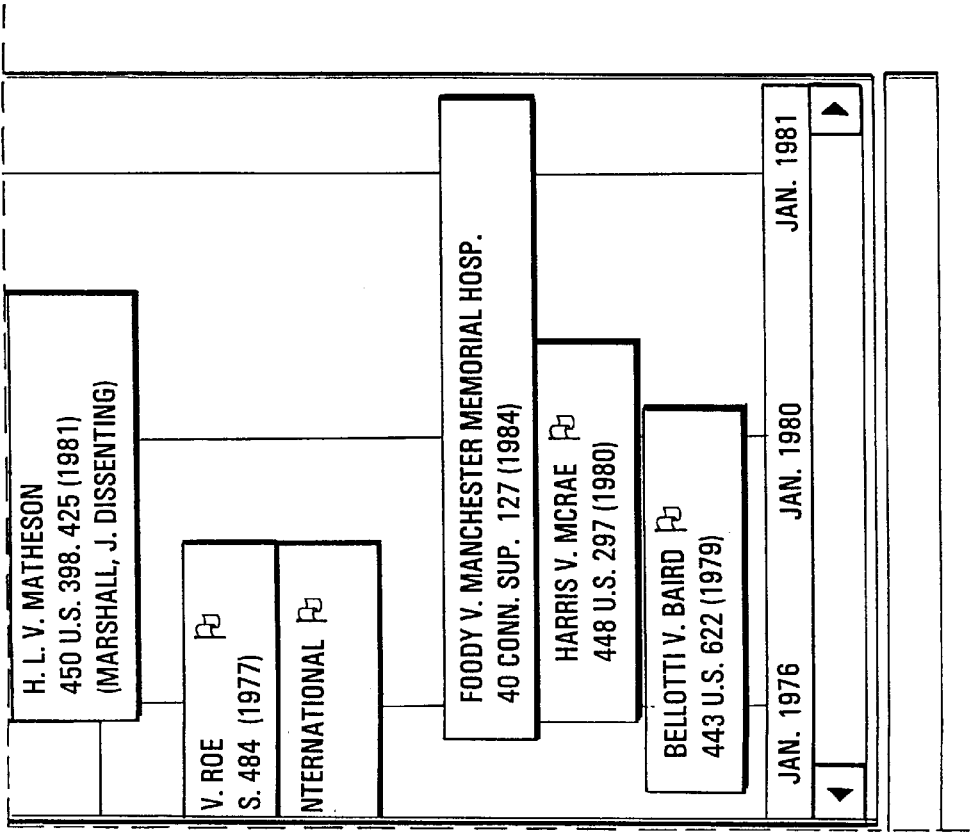
Figures 1, 13B:
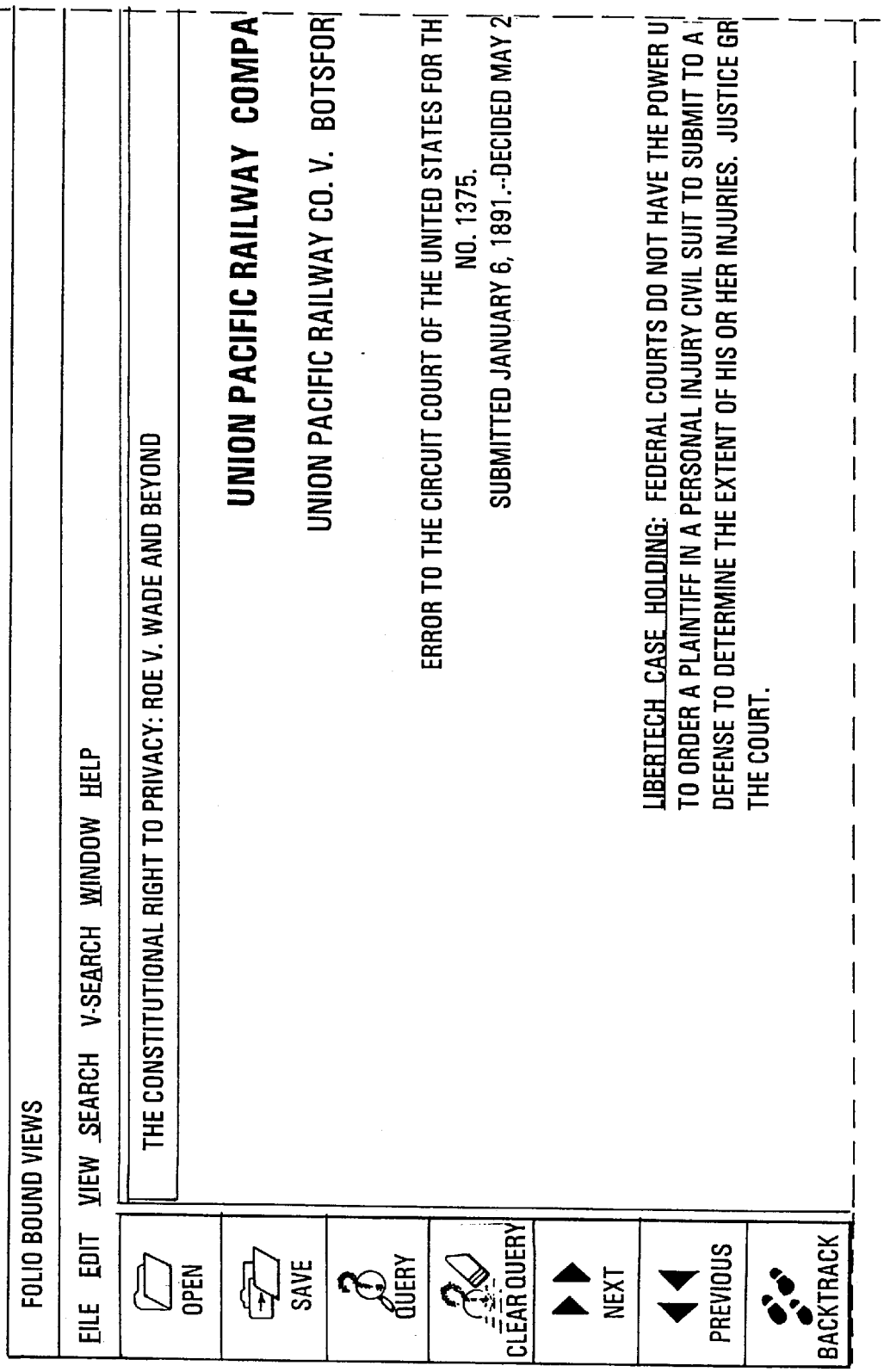
FIG. 13B is a depiction of a display with horizontally tiled windows.
Figures 2, 13B:
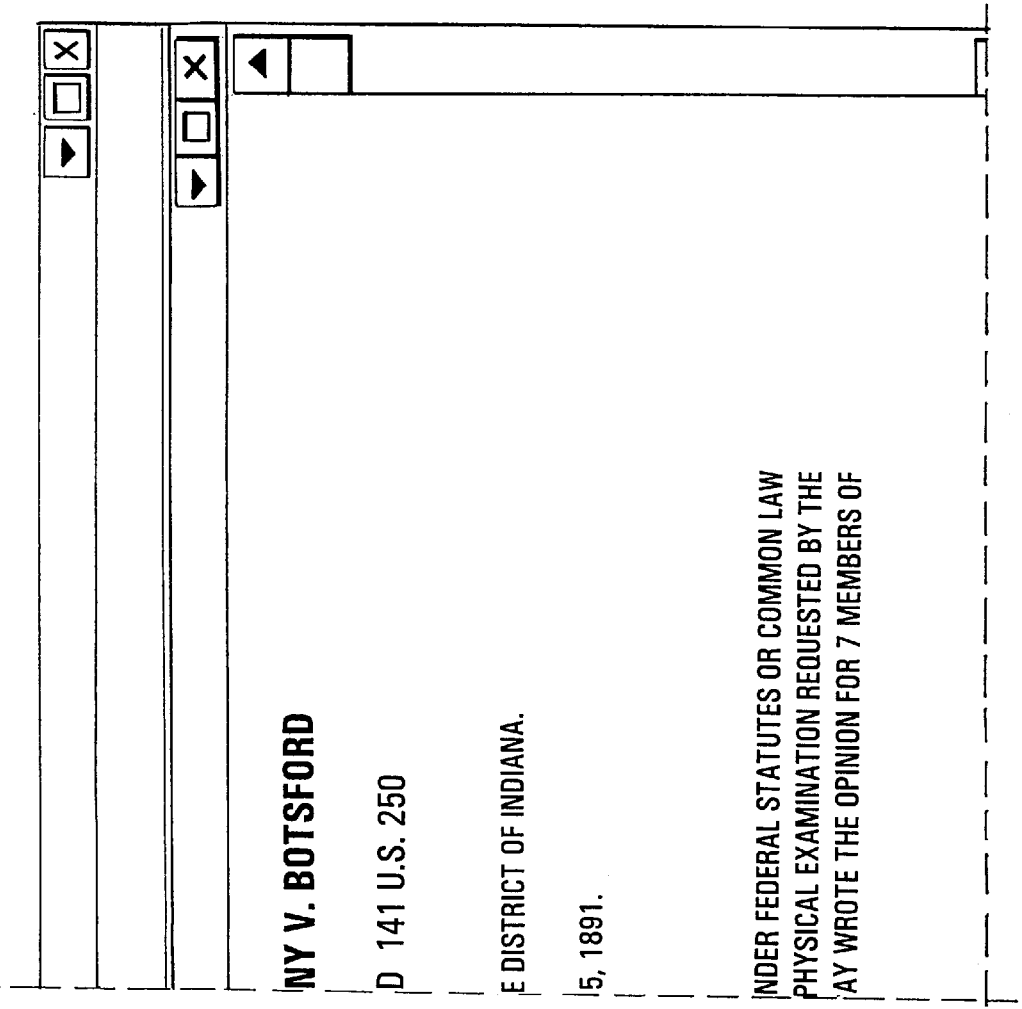
Figures 4, 13B:
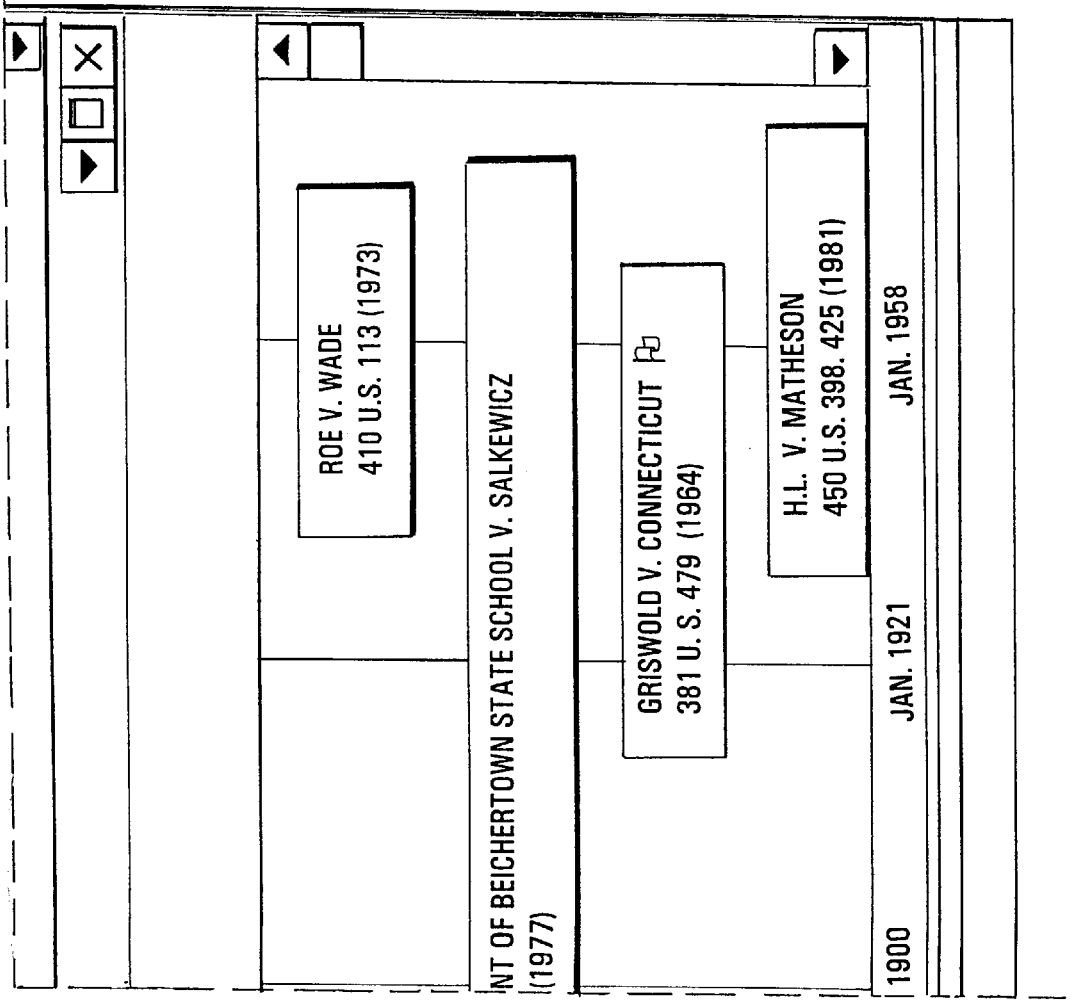

For the preferred GUI 70 window management system embodiments, a parent window (or parent frame window) is used with multiple active child windows. Various mechanisms or commands may be utilized to help manage a plurality of active windows (1000, 1004, 1008). For example, cascading may be used to arrange the currently displayed windows (1000, 1004, 1008) in an orderly, consistently-overlapping fashion. The windows (1000, 1004, 1008) are arranged such that each newly activated window (1000, 1004, 1008) is a fixed size, and the title bars of previous windows (1000, 1004, 1008) are still visible. Tiling may also be used to arrange the currently displayed windows (1000, 1004, 1008) in an orderly, non-overlapping fashion. When using tiling, the child windows are drawn as large as possible within the parent frame window, covering the entire frame window area. There are two preferred methods of tiling, Tile Vertical and Tile Horizontal. Vertical tiling generally involves the side by side display of child windows (e.g., two windows (1000, 1004, 1008) side by side), shown in FIG. 13A, while horizontal is above and below (e.g. two windows (1000, 1004,1008), one above and one below), shown in FIG. 13B. Minimizing may be used to display or represent a particular child window in a very small space, examples of representative displays include graphics, icons and/or a text titles. The minimized child window may be displayed at various places in the parent window (e.g. at the bottom of the parent window, taskbar, or titlebar). Maximizing may also be used to display a particular child window as large as possible within a parent windows area. A maximized child window covers or obscures all other active child windows. Restoring may be used to restore a minimized or maximized child window to its previous state. Icon arranging may be performed to arrange all child windows being represented as icons in an orderly fashion.

In addition, in the preferred GUI 70 embodiment an auto arrange feature is utilized for enhanced window management. The auto arrange feature solves many of the problems inherent in an interface which creates a large number of child windows. When the number of child windows is large, no arrangement that tries to display all windows at the same time works very well. The child windows either become too small or too cluttered. Forcing the user to manually select a subset of the child windows in which the user is most interested, manually arranging those windows (1000, 1004, 1008) to be viewed in a primary format and minimizing the rest of the windows (1000, 1004, 1008) for viewing in a secondary format (or ignored). The user must perform this window management each time a new arrangement is desired which often means each time a new window (1000, 1004, 1008) is activated or displayed. The auto arrange feature automates this process for the user and intelligently arranges the windows (1000, 1004, 1008) for the user's screen.

With the auto arrange feature a limit is placed on the number of windows (1000, 1004, 1008) to be displayed in the primary format at any one time, a desired number of activated windows (1000, 1004, 1008). This limit may be set by default, by the user, or by an intelligent process which analyzes for example, the amount of data to be visually represented, screen size, and other variables to determine an optimum number of windows (1000, 1004, 1008) and a layout for those windows (1000, 1004, 1008).

Figure 12:
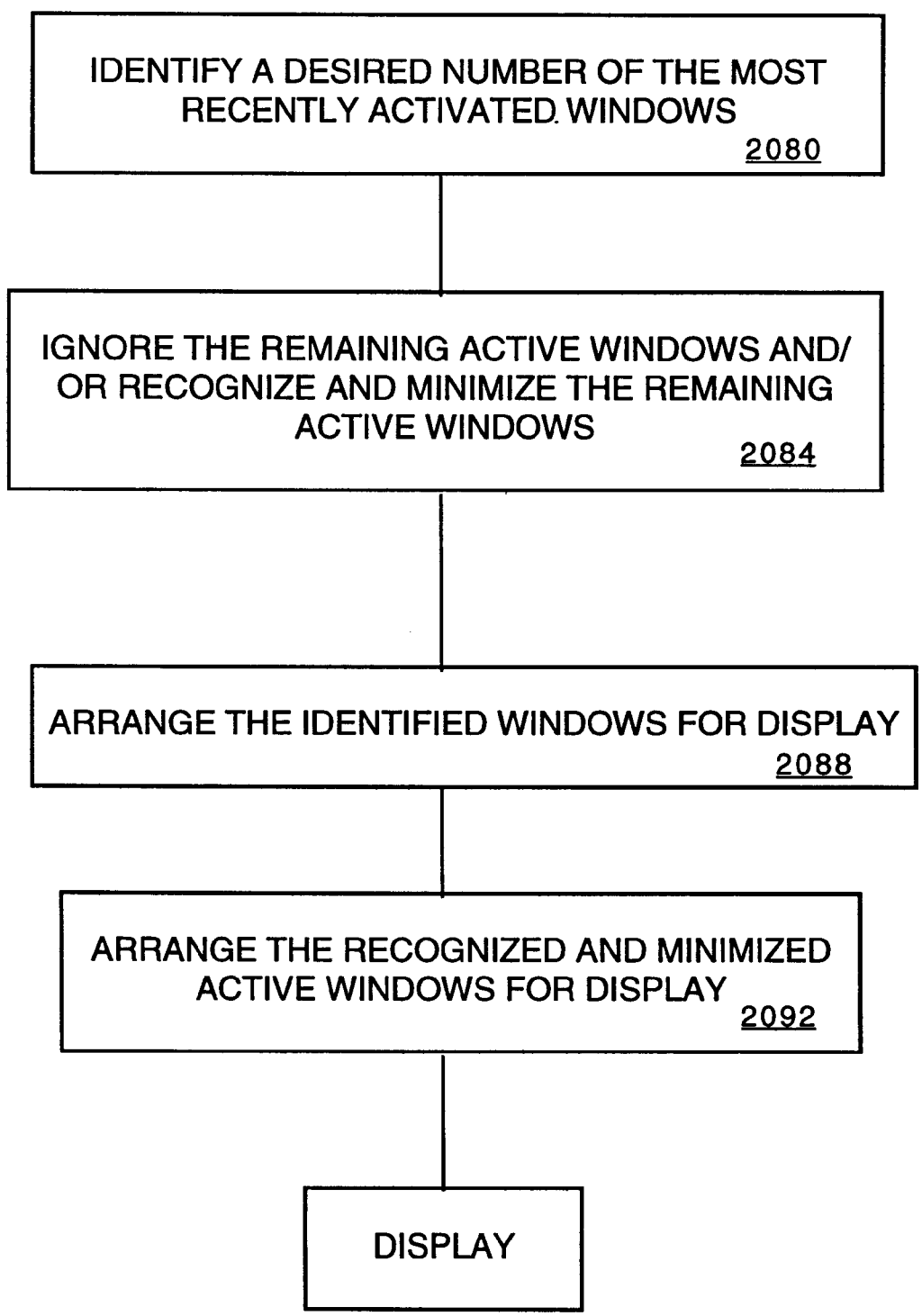
FIG. 12 is a software flow chart for the auto arranging window feature.

Referring generally to FIG. 12, one version of the auto arrange process involves the following general steps: (1) Based on a default value or through an intelligent process, identify the most recently activated windows (1000, 1004, 1008) which will be allocated the greatest amount of screen space 2080; (2) Using one of several methods, minimize the screen size of the remaining windows (1000, 1004, 1008) so that their identities may be recognized by the user but only need a small amount of screen space (e.g. icons, text) 2084; (3) Arrange the identified windows (1000, 1004, 1008) in a useful and space efficient manner (e.g. vertically, horizontally, cubes etc. 2088) (4) Arrange the minimized but recognizable windows (1000, 1004, 1008) in an orderly but non-obtrusive manner on the screen (e.g. arrange icons in lower corner of screen 2092). Using this automated process, the windows (1000, 1004, 1008) can be automatically rearranged each time a new window (1000, 1004, 1008) is activated (by repeating the above steps) or whenever the user initiates the process. The windows (1000, 1004, 1008) are kept in an organized and useable fashion with little effort on the part of the user. The auto arrange can use different formats (primary, secondary, tertiary, etc) for different levels of interest in the window (1000, 1004, 1008). The auto arrange feature can also be turned on or off at the will of the user.

Instead of recognizing and minimizing the windows (1000, 1004, 1008) which are beyond the desired number of active windows (1000, 1004, 1008), the system may simply ignore these windows (1000, 1004, 1008), or some combination of minimizing and ignoring may be used 2084. For example, if the desired number of active windows (1000, 1004, 1008) for display is two, the last two activated windows (1000, 1004, 1008) may by arranged on the screen side by side in a full format and an additional three windows (1000, 1004, 1008) may be recognized and minimized to icons for display on a small portion of the screen. Any windows (1000, 1004, 1008) beyond the last five activated windows (1000, 1004, 1008) are ignored by the GUI 70 window management system.

By providing some options, preferences options, for the auto arrange feature, the feature can be customized to the particular taste of a user. The desired arrangement of the windows (1000, 1004, 1008), or target arrangement can be explicitly chosen by the user and changed at will by the user (or chosen from a list of available formats). For example, a user can specify the number of windows (1000, 1004, 1008) to display, the particular format each window (1000, 1004, 1008) will appear on the screen, and the layout of the screen. There possible screen layouts are nearly limitless. Various formats are possible for each window (1000, 1004, 1008), for example as ½, ¾, full, vertically stretched, horizontally stretched or enlarged format. The user can chose the number of windows (1000, 1004, 1008) to be displayed in each format for example two, three, or four windows (1000, 1004, 1008) in the ½ format. And therefore, a target arrangement can be chosen such as full format, two windows (1000, 1004, 1008), vertically side by side. Thus, when step three of the auto arrange process is preformed, the system will identify the two most recently activated windows (1000, 1004, 1008) and arrange the two windows (1000, 1004, 1008) in the target arrangement, side by side, rather than in some other manner. In the preferred embodiment, a menu is provided to the user permitting the user to chose a target arrangement including number of windows (1000, 1004, 1008), format of windows (1000, 1004, 1008), and screen arrangement.

For "high-end" power users, the window management system can be modified to allow the user to custom build nearly any arbitrary layout for the screen. The user creates any number of arbitrary layouts, each of which is given a name that is inserted into a window menu and is stored in a database. After a layout has been named, it is then treated as a new window management command which can be executed. In the most sophisticated embodiments, through the use of pointer and/or a mouse 42 the user selects anchor points, such as center points, or upper left, upper right, lower left, lower right, and various shapes for the windows (1000, 1004, 1008) such as hand sketched, rectangular, triangular, rhomboids, octagons etc. In this manner displays can be generated which are suited for specific uses. Also, through this medium, the artistry and creativity of the user may be expressed in aesthetically pleasing displays.

An innovative feature of the preferred embodiment is the ability to call up a search screen or map while viewing the data of a particular object in the database 54. This feature is implemented through the use of embedded active links 2004. By using embedded icons that are active within the data of an object being viewed or by using embedded text which is active within the data of an object in the database 54, this feature allows the user to jump from viewing data to a search screen, menu, map or the like. The search screen or map can be one which has been previously generated or can be generated at the time of selecting the embedded active icon or active text.

The preferred method of using this feature is with text documents. Active icons or active text are embedded within the text documents and the user is alerted to these active icons or text through the use of highlighting or different coloring of the active icon or text. When the user sees an active icon or active text while viewing an object in the database 54, the user may choose to jump out of the object and into a map, search screen, or the like.

The system may be configured so that upon selection of an active icon or active portion of text, a menu is displayed to the user wherein the user may select the generation of a particular map or the return to an existing map that was previously generated.

Although these active links 2004 within an object in the database 54 have been described for use in jumping from an object in the database 54 to a map, the active links 2004 may be used to jump to other objects in the database 54 or extensions to other databases 54, other applications, or communication programs. Providing active links 2004 within objects being viewed in a database 54 allows great flexibility for the user to navigate through data in any manner he chooses.

To allow access to extensions to other databases, the preferred embodiment is set up in a modular fashion in order to be able to modularly add extensions or add on links to connect to other applications or programs which can be called up from the present invention.

In the preferred embodiment, the invention is set up in a modular fashion to accept one or more extensions. An extension can be another application or can be a communications link to connect to another computer or application. Use of these connections is particularly well suited for the invention in that the underlying data need not be stored locally with the user, but instead, through the use of extensions, the underlying data can be accessed by the user through an extension, another application and/or through a communications link.

Multiple extensions are possible and it is possible for the same underlying data to be available through one or more extensions, this allows the user to choose which extension or communication link it will use to access underlying data. In the preferred implementation, a box 1032 is given depth to signify that an extension associated with a particular box 1032 is available to the user. By activating the box 1032, the user is given the opportunity to use the extension. In the preferred embodiment with modular implementations of extensions, a user can add on or plug in further extensions or eliminate extensions.

Another feature of the preferred embodiment is the "show usage" command. FIG. 8 is a screen display 38 depicting the use of the "show usage" command. The preferred embodiment includes this command to allow the user to see a portion of an object in the database 54 which uses cites or refers to the node 2008 from which the show usage command is requested. More specifically, the show usage command allows the user to see the text or data of a portion of the document that is represented by the node 2008 being searched. In the preferred embodiment, the show usage command is only available from a result node 2104. When a map or graphics display is shown the search node 2100 is the node 2008 upon which the search being displayed is based. The result nodes 2104 are the nodes 2008 which are graphically displayed as a result of the search conducted upon the search node 2100. Referring to FIG. 8, the search node 2100 is Alves v. Commissioner and the result node 2104 is 26 U.S.C. § 83.

Through the use of the show usage command, a user may immediately access that portion of the search node object 2108 or document 2108 which refers to a specific result node 2104. This is accomplished by breaking up the data connected to the search node 2100 into groups of records with header identifiers. The data attached to the result node 2104 will also have an identifier, a header identifier, which particularly identifies the data attached to it. When the user executes the show usage command after activating the result node 2104, the record or records in the data attached to the source node 2100 which match the result node 2104 identifier will be displayed and highlighted. For example, in FIG. 8, the Alves v. Commissioner document 2108 is shown highlighted at the appropriate location identifying 26 U.S.C. § 83 2104. The show usage command is accessed through the use of a pull-down menu from the result node 26 U.S.C. § 83 2104. Using the earlier example of modem an classical architecture, if the search node 2100 was modem architecture and the search requested items influencing modem architecture an influence map or graphic display would be generated which would include the classical architecture node. By selecting the classical architecture node and using the "show usage" command on the classical architecture node (for example through a pull-down menu or directly in the node box) the invention will immediately bring the user to the first location in the modem architectural data where classical architecture is referred to as influencing modem architecture. Thus, in effect, the show usage command allows the user to jump from a result node 2104 to the specific location 2108 in the search node 2100 where the result node 2104 is referenced or identified.

Finally, one of the most important features of the invention is its method of integrating itself with third party software applications. Although useful with many third party software applications, it is particularly useful to integrate the present invention with third party database applications which operate in a windows type environment. Nearly all of the database management functions and graphical user interface 70 features can be used in an integrated scheme with third party database management software.

The preferred method of integrating the present invention with third party software is through the use of a subclassing technique in a windows multiple document interface (MDI) environment. Specifically, the present invention can take advantage of the common behavior exhibited by MDI applications to integrate with third party software operating in a windows environment.

When the preferred embodiment of the invention is loaded to be used in conjunction with third party software application, the invention immediately subclasses the third party software applications frame window. Through this subclassing technique, the present invention receives (intercepts) every message or command originally intended for the third party software. Since the invention is the first to receive each window message, it acts as a message arbiter. The message arbiter has the ability to recognize the message or command and decide how each message should be processed. For example, the arbiter decides whether any given message should be processed by the master program (the invention) or by the subclassed third party software.

The precise processing that is appropriate for a given message is somewhat message dependent. However, the general message scheme dictates that messages intended for one of the child MDI windows (or that depend in some way on the content of a child window) are dispatched to the application that is the "real" owner or creator of that child window. Thus, most messages are dispatched to the software application to which the child window belongs (to which the window is a native), if it the window belongs to a subclassed application, the message is directed or forwarded to the subclassed application. The subclassed application then processes the forwarded message and changes a child window display if necessary. Using this technique, the subclassed software application acts as if it alone owns the main frame window. Thus, operation of the master program has little affect on the performance of subclassed program. Further, the operation of the subsclassed program is transparent to the user. To the casual user, the master program operates all the windows and is the only user interface used.

Using this technique, more than one software application may be subclassed with the present invention. Also, each subclassed application may have multiple child window displays. And finally, the master application may generate its own native windows which may be displayed simultaneously with the child windows of a subclassed application.

Figure 14A:
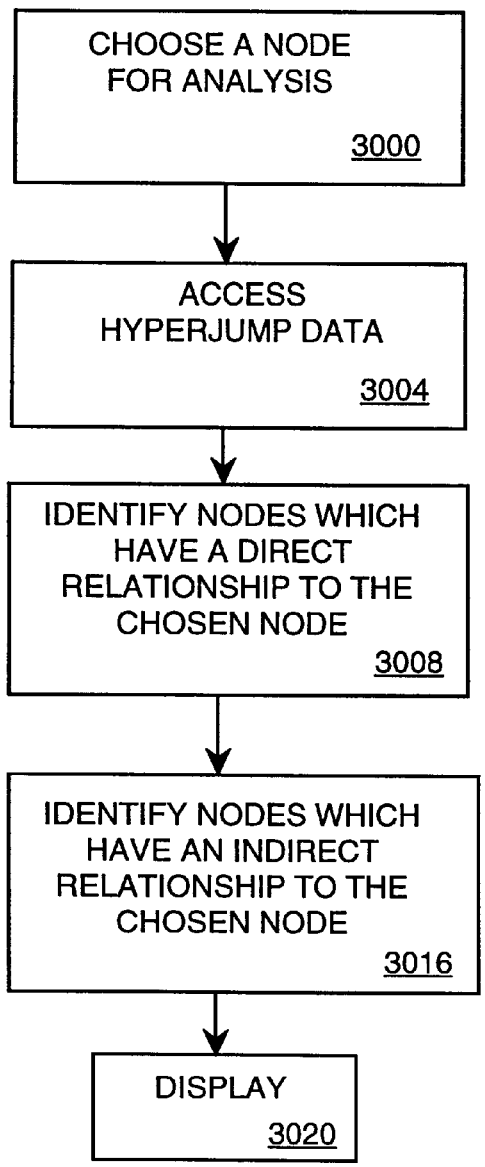
FIG. 14A is a high level diagram of a method for searching, indexing, and displaying data stored in a network.
Figure 14B:
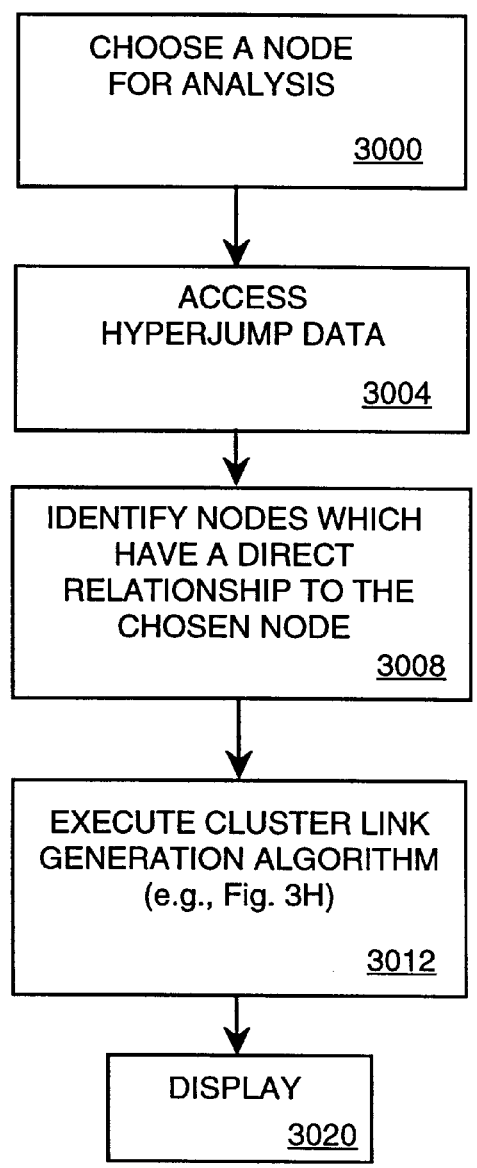
FIG. 14B is a high level diagram of a method for searching, indexing, and displaying data stored in a network using the cluster generation algorithm.

This computerized system for researching data is also effective with any type of internal or global network application (see generally FIGS. 14A and 14B). As long as a network stores data and provides links 2004 between that data, this system can provide an effective and efficient system for indexing, searching, and displaying that data. For example, this system can be applied to the Internet and the World Wide Web. The World Wide Web is made up of numerous web sites which contain documents and internet or web pages. Documents are usually defined in the art as unique pieces of data, which includes text files, graphic files, audio files, and video files. A web page is usually a document with its own Universal Resource Locator (URL). URLs are the standardized addresses commonly used for web pages. Generally, web sites are a collection of web pages and documents. Web sites are usually identified by a home page, which may contain an overall starting point for the web site and a summary of what is to be found at the web site. Hyperjump links, or hyperlinks, is the name commonly given to the links which connect web pages, web sites, and documents on the web. Hyperlinks are electronic links which allow end users to jump to the specified web page or web site. The software code commonly used to create the majority of web pages containing text files is HyperText Markup Language (HTML). Other pages containing graphics, audio, video, and other resources may not be coded in HTML, but still will be connected by hyperlinks.

The Internet can be viewed as an immense collection of linked documents providing varied information to the public via an elaborate electronic distribution channel. In the past, the end user's ability to search, find, index, and navigate through relevant documents of interest has been primarily limited to word based queries which primarily rely on the target document's text indexing. Instead of relying on textual searching, this method and apparatus for indexing, searching, and displaying data analyzes hyperlinks which connect web pages to other web pages in order to help the end user to search, find, and navigate through the relevant documents of interest. This system analyzes hyperlinks using proximity indexing or clustering technology discussed previously. Once identified, the system displays the results in a variety of ways and end users are able to navigate directly to the documents identified by this system's analyzation technology.

In the preferred embodiment, this system uses the cluster link generation algorithm described in FIG. 3H to search and identify closely associated documents located on the Internet in the same manner as described above. The system treats hyperlinks 2004 on the Web in the same manner as it treats links 2004 in a database, and it treats web pages on the Web in the same manner as it treats nodes 2008 in a database 54. Source links 2004 on the Web link a source node 2008 (or source web page) to a second node (or second web page). Influence links 2004 perform the same function in reverse. Direct links 2032 (as described above) are the same as hyperlinks 2004, which use URLs, in the World Wide Web, and they directly link one web page (or node) to another. Indirect links 2036 link two web pages or nodes 2008 through more than one path. A cluster link, for purposes of the Web, is any relationship between two web pages.

To begin the process, as shown generally in FIG. 14A, a node 2008 is chosen 3000 for analysis. Next, the system accesses link data 3004 or "crawls" the source web page (or source node 2008) looking for URLs which directly link the source web page to other web pages. Web crawling is a known technique in the art, performed by most World WIde Web search services, such as Yahoo (located at www.yahoo.com) or Alta Vista. Crawling is accomplished by the use of automated programs called robots or spiders, which analyze a web page for objects which provide URL links to other web pages or documents. The source node 2008, whether it is a web page, the home page of a web site, or a document with no links 2004, is a data document which may have been encoded in HTML or some other language. The encoded data document includes commands such as "insert picture here" or "begin a new paragraph" or "place a link here to another document" along with the normal text of the document. These coded commands are generally invisible to the end user, although many Web documents reveal text containing coded links 2004 to other documents in different colors. The system reads the coded HTML instructions to identify 3008 the coded links, which are direct links 2032. There are many publicly known methods of identifying links 2004 from a coded document that one skilled in the art could employ to perform this function.

FIG. 14B describes the embodiment of the invention which executes 3020 the cluster link generator algorithm 2044 to generate direct and indirect links 2004 to find the set of candidate duster links. After identifying 3008 all of the URLs referenced in the source web page, in the preferred embodiment, the cluster link generation algorithm 2044 retrieves 2056 a list of URLs and classifies them as the direct links 2032 to be analyzed. The cluster link generator 2044 traces the links 2032 to their destination nodes 2008 (a web site or web page) and performs a web crawl to retrieve 2056 a list of URLs referenced by the source nodes 2008. The generator 2044 classifies the second set of nodes 2008 as being indirectly linked to the source node 2004, and the links 2036 to these nodes 2008 are added 2072 to the list of candidate cluster links. In order to find the set of candidate cluster links, the cluster link generator 2044 repeats the above steps 2052. In the more general method described in FIG. 14A, the system identifies 3012 the links 2036 which have an indirect relationship and then displays 3020 the direct 2032 and indirect 2036 links.

Once a candidate cluster link set is identified, the generator 2044 assigns 2064, 2076 weights 2034 to the candidate cluster links 2004. The weight 2034 of each individual path or link 2004 is a function of the weight 2034 of the path to the previous node 2008 and the weight 2034 of the last link 2004. In order to determine the weight 2034 of an implied link 2004, the preferred formula, $WC_{i+1}=min(WC_i, D_{i+1}*W_{i+1})$ 2064, as previously discussed, is used. Following weighting, the generator 2044 sorts the set of candidate cluster links 2004 by weight, and a subset of these links 2004 (those links 2004 above a specified cut-off weight) are retained for display 3020 to the end user. In the preferred embodiment, the formula T=min (constant, 4*d), discussed before determines the optimal cut-off weight.

In another embodiment, the Proximity Indexing Application Program (Program) 62 organizes and categorizes the crawled links 2004 using the statistical techniques and empirically generated algorithms described earlier in this application. The Program 62 treats URL addresses as citations and web pages as textual objects. The Program 62 applies some or all of the eighteen pattern list to determine the relatedness of the web pages (or nodes) which are linked to the source web page (or node). The Program 62 weighs the patterns by importance, giving one type of data document more importance than another type. For example, it may give more importance to a web site than to a single document which has no other links. The Program 62 may use other factors to weigh the data documents, such as the number of "hits" (visits by other end users to the site, a number which is available to web users) a data document receives in a specific time frame or the number of hyperlinks within a page. The Program 62 then forms a matrix based on ordered pairs of documents, and the matrix calculations discussed before of this specification can be carried out. The Program 62 generates a coefficient of similarity which will determine the relatedness of web pages to each other and to the source web page. The Program 62 displays the most similar web pages to the user.

The preferred embodiment of the network application of this system uses the graphical user interface program 70 to display the results of the algorithm as a list showing the selected links 2004 and the various data associated with the links 2004. The links 2004 shown on the screen to the end user are active links 2004, similar to the active comments used in the text boxes 1032 described previously in this application. The end user may instantaneously link to the destination node 2008 that the user selects. The list format provides link information in a style familiar to user of the Internet. However, this system is also capable of displaying the results in the user-friendly graphical format as described above. The graphical user interface program 70 described previously uses box coloring and sizing to communicate large amounts of information quickly and intelligibly to the user. In a preferred embodiment, different colors for boxes 1032 are assigned depending on what type of node 2008 they represent (e.g., a web page, web site, a document, a file transfer protocol (FTP) (a common internet designation for news sites)). Preferably, the box 1032 is given depth. The amount of URL links a node 2008 contains may determine the amount of depth.

The graphical user interface program 70 displays a list of the most related web pages to the source web page. This list includes documents, web sites, and pages which are directly or indirectly linked to the subject document or the subject topic. The links 2004 can be source links 2004 or influence links 2004, so the end user may monitor the sites to which his site (the source web page) is referring, and the end user may view the sites which are referring to his site. The system can parse the URL of the destination nodes 2008 for a variety of information. Thus, the end user may monitor whether the connections to which his web site refers are still open, the end user may view the date and time a destination node 2008 was modified, and the end user may view the identification of the organization or author of the destination node that directly or indirectly links to the source node 2008. The GUI program 70 displays all of this information either in the list format or in the text box 1032 used in the graphical format Graphical comments may be placed in the text box to communicate information quickly, such as showing a happy face for a connected application, and so forth. Hyperlinks can appear as active comments in a text box in order to allow the user to instantaneously jump to the web page represented by the text box.

Although this computerized system for researching data is described as functioning in the World Wide Web environment, it can function equally well in any network system. A network that utilizes any type of hyperjump 2004 to connect documents together can serve as the links 2004 analyzed by this invention. This system therefore can be modified to navigate and search through internal company networks, and provide the same features as described above for the Web application. Additionally, the comment boxes can be tailored to display critical information about company files, thus enhancing its usefulness for the company employee who is attempting to sort through company documents stored on a network.

What is claimed is:

1. A method for using active links within the data of an object stored in a database of a computer so that a user may jump from viewing the data of the object in the database to a position outside the object in the database and outside the computer, comprising:

storing one or more links within data of the object in the database to positions outside of the computer, wherein the stored links are active links;

displaying the data of the object within the database, wherein one or more active links are displayed with the data from the object in the database, wherein positions are nodes in a network that may be accessed, the active links including hyperjump links between nodes in the network and the objects, and the step of displaying comprises:

generating a source map, wherein the source map represents hyperjump links that identify a chosen node as a destination of a link, and wherein the method further comprises activating a link represented on the source map, wherein a user may hyperjump to a node represented as a node of the link;

selecting one of the displayed active links from those displayed with the displayed data; and jumping to the position outside the object in the database.

2. The method of claim 1, wherein the active links are embedded icons and wherein the step of selecting comprises activating an embedded icon.

3. The method of claim 1, wherein the active links are embedded text and wherein the step of selecting comprises activating the embedded text.

4. The method of claim 1, wherein computer software is used, further comprising:

generating an active link, wherein the active link can be used to jump from a location in the database to another database.

5. A method for displaying information about a network that has hyperjump data, comprising:

choosing a node;

accessing the hyperjump data;

identifying hyperjump data from within the accessed hyperjump data that has a direct reference to the chosen node;

determining hyperjump data from within the accessed hyperjump data that has an indirect reference to the chosen node using the identified hyperjump data, wherein the step of determining comprises proximity analyzing the identified hyperjump data; and displaying one or more determined hyperjump data.

6. The method of claim 5, wherein the hyperjump data includes pointers and wherein the direct reference is a pointer pointing to the chosen node or from the chosen node, and the step of determining comprises analyzing the pointers.

7. The method of claim 5, wherein the node represents a topic, the determined hyperjump data has a relationship to the topic, and the step of displaying displays determined hyperjump data that has a relationship to the topic.

8. The method of claim 5, wherein the node is a web page in the network, the accessed hypejump data are Universal Resource Locators of linked pages, and the step of determining hyperjump data comprises analyzing the identified hyperjump data.

9. The method of claim 5, wherein the node is a document in the network and the determined hyperjump data has a relationship to the document, the step of displaying comprising the step of listing the hyperjump data that has a relationship to the document.

10. The method of claim 5, wherein the step of displaying comprises generating a graphical user display, and wherein information is displayed on a graphical display visually representing more than one coordinate plane.

11. The method of claim 5, wherein the nodes are nodes in the network that may be accessed, the hyperjump data includes hyperjump links between nodes in the network, and the step of displaying comprises:

generating a source map using one or more of the determined hyperjump data, wherein the source map represents hyperjump links that identify the chosen node as a destination of a link; and wherein the method further comprises activating a link represented on the source map, wherein a user may hyperjump to a node represented as a node of the link.

12. A method for visually displaying data related to a web having identifiable web pages and Universal Resource Locators with pointers, comprising:

choosing an identifiable web page;

identifying Universal Resource Locators for the web pages, wherein the identified Universal Resource Locators either point to or point away from the chosen web page;

analyzing Universal Resource Locators, including the identified Universal Resource Locators, wherein Universal Resource Locators which have an indirect relationship to the chosen web page are located, wherein the step of analyzing further comprises cluster analyzing the Universal Resource Locators for indirect relationships; and displaying identities of web pages, wherein the located Universal Resource Locators are used to identify web pages.

13. The method of claim 12, further comprising selecting a web page using the displayed identities of web pages.

14. The method of claim 12, further comprising hyperjumping to the selected web page.

15. The method of claim 12, wherein the step of displaying the identities of web pages comprises generating a graphical user display wherein information within the Universal Resource Locators is parsed and used to generate the graphical user display.

16. A method for navigating documents on the world wide web, comprising: choosing a document;

identifying documents that have a direct relationship to the chosen document;

locating documents that have an indirect relationship to the chosen document identifying Universal Resource Locators for the documents, wherein the identified Universal Resource Locators either point to or point away from the chosen document;

analyzing Universal Resource Locators, including the identified Universal Resource Locators, wherein Universal Resource Locators which have an indirect relationship to the chosen document are located, wherein the step of analyzing further comprises cluster analyzing the Universal Resource Locators for indirect relationships; and displaying a located document.

17. The method of claim 16, wherein pages and their respective Universal Resource Locators are used and the step of locating documents comprises analyzing the pages and their respective Universal Resource Locators.

18. The method of claim 17, wherein the step of analyzing pages comprises cluster analyzing the pages.

19. The method of claim 16, wherein the step of displaying a located document comprises:

generating a screen display of identities of one or more located documents; and selecting one or more of the located documents.

20. The method of claim 19, wherein the step of generating a screen display comprises generating a graphical display.

21. A method for displaying information about a network that has hyperjump data, comprising:

choosing a node;

accessing the hyperjump data;

identifying hyperjump data from within the accessed hyperjump data that has a direct reference to the chosen node;

determining hyperjump data from within the accessed hyperjump data that has an indirect reference to the chosen node using the identified hyperjump data, wherein the step of determining comprises cluster analyzing the hyperjump data; and displaying one or more determined hyperjump data.

22. A method for displaying information about a network that has hyperjump data, comprising:

choosing a node;

accessing the hyperjump data;

identifying hyperjump data from within the accessed hyperjump data that has a direct reference to the chosen node;

determining hyperjump data from within the accessed hyperjump data that has an indirect reference to the chosen node using the identified hyperjump data; and displaying one or more determined hyperjump data, wherein the nodes are nodes in the network that may be accessed, the hypejump data includes hyperjump links between nodes in the network, and the step of displaying comprises:

generating a source map using one or more of the determined hyperjump data, wherein the source map represents hyperjump links that identify the chosen node as a destination of a link, and wherein the method further comprises activating a link represented on the source map, wherein a user may hyperjump to a node represented as a node of the link.

* * * * *

US006233571C1

(12) EX PARTE REEXAMINATION CERTIFICATE (8589th)
United States Patent
Egger et al.

(10) Number: US 6,233,571 C1
(45) Certificate Issued: Oct. 4, 2011

(54) METHOD AND APPARATUS FOR INDEXING, SEARCHING AND DISPLAYING DATA

(75) Inventors: Daniel Egger, Durham, NC (US);
Shawn Cannon, Hillsborough, NC (US);
Ronald D. Sauers, Mebane, NC (US)

(73) Assignee: Software Rights Archive, LLC, Durham, NC (US)

Reexamination Request:
No. 90/011,012, May 25, 2010

Reexamination Certificate for:
Patent No.: 6,233,571
Issued: May 15, 2001
Appl. No.: 09/071,120
Filed: May 4, 1998

Related U.S. Application Data

(60) Division of application No. 08/649,304, filed on May 17, 1996, now Pat. No. 5,832,494, which is a continuation-in-part of application No. 08/076,658, filed on Jun. 14, 1993, now Pat. No. 5,544,352.

(51) Int. Cl.
*G06F 7/00* (2006.01)

(52) U.S. Cl. .................... 707/737; 707/716; 707/748
(58) Field of Classification Search .................. None
See application file for complete search history.

(56) References Cited

U.S. PATENT DOCUMENTS

| | | | |
|---|---|---|---|
| 4,839,853 A | 6/1989 | Deerwester et al. |
| 4,868,733 A | 9/1989 | Fujisawa |
| 4,945,476 A | 7/1990 | Bodick et al. |
| 4,953,106 A | 8/1990 | Gansner et al. |
| 5,040,133 A | 8/1991 | Feintuch et al. |

(Continued)

FOREIGN PATENT DOCUMENTS

WO    WO95/00896    1/1995

OTHER PUBLICATIONS

Brin, et al., "The Anatomy of a Large–Scale Hypertextual Web Search Engine", Computer Networks and ISDN Systems, vol. 30 (1–7), 1998, pp. 107–117.

(Continued)

*Primary Examiner* — Joshua Campbell

(57) ABSTRACT

A computer research tool for indexing, searching and displaying data is disclosed. Specifically, a computer research tool for performing computerized research of data including textual objects in a database or a network and for providing a user interface that significantly enhances data presentation is described. Textual objects and other data in a database or network is indexed by creating a numerical representation of the data. The indexing technique called proximity indexing generates a quick-reference of the relations, patterns and similarity found among the data in the database. Proximity indexing indexes the data by using statistical techniques and empirically developed algorithms. Using this proximity index, an efficient search for pools of data having a particular relation, pattern or characteristic can be effectuated. The Computer Search program, called the Computer Search Program for Data represented in Matrices (CSPDM), provides efficient computer search methods. The CSPDM rank orders data in accordance with the data's relationship to time, a paradigm datum, or any similar reference. An alternative embodiment of the invention employs a cluster link generation algorithm which uses links and nodes to index and search a database or network. The algorithm searches for direct and indirect links to a search node and retrieves the nodes which are most closely related to the search node. The user interface program, called the Graphical User Interface (GUI), provides a user friendly method of interacting with the CSPDM program and prepares and presents a visual graphical display. The graphical display provides the user with a two or three dimensional spatial orientation of the data.

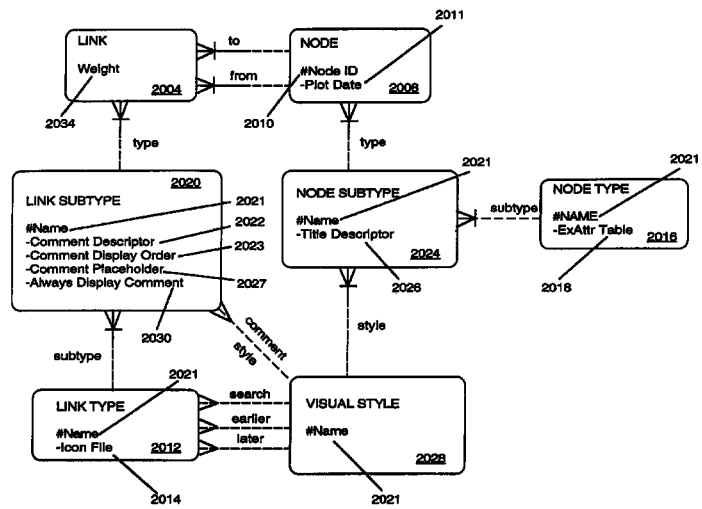

U.S. PATENT DOCUMENTS

| | | | |
|---|---|---|---|
| 5,060,170 A | 10/1991 | Bourgeois et al. |
| 5,122,951 A | 6/1992 | Kamiya |
| 5,157,783 A | 10/1992 | Anderson et al. |
| 5,206,949 A | 4/1993 | Cochran et al. |
| 5,241,671 A | 8/1993 | Reed et al. |
| 5,243,655 A | 9/1993 | Wang |
| 5,265,065 A | 11/1993 | Turtle |
| 5,287,493 A | 2/1994 | Jacopi |
| 5,301,109 A | 4/1994 | Landauer et al. |
| 5,325,298 A | 6/1994 | Gallant |
| 5,341,293 A | 8/1994 | Vertelney et al. |
| 5,371,847 A | 12/1994 | Hargrove |
| 5,386,556 A | 1/1995 | Hedlin et al. |
| 5,390,295 A | 2/1995 | Bates et al. |
| 5,418,948 A | 5/1995 | Turtle |
| 5,446,842 A | 8/1995 | Schaeffer et al. |
| 5,446,891 A | 8/1995 | Kaplan et al. |
| 5,463,728 A | 10/1995 | Blahut et al. |
| 5,471,611 A | 11/1995 | McGregor |
| 5,530,852 A | 6/1996 | Meske, Jr. et al. |
| 5,542,024 A | 7/1996 | Balint et al. |
| 5,546,517 A | 8/1996 | Marks et al. |
| 5,586,311 A | 12/1996 | Davies et al. |
| 5,617,565 A | 4/1997 | Augenbraun et al. |
| 5,630,120 A | 5/1997 | Vachey |
| 5,649,186 A | 7/1997 | Ferguson |
| 5,649,193 A | 7/1997 | Sumita et al. |
| 5,712,995 A | 1/1998 | Cohn |
| 5,748,954 A | 5/1998 | Mauldin |
| 5,749,785 A | 5/1998 | Rossides |
| 5,794,001 A | 8/1998 | Malone et al. |
| 5,838,318 A | 11/1998 | Porter et al. |
| 5,838,906 A | 11/1998 | Doyle et al. |
| 5,855,015 A | 12/1998 | Shoham |
| 5,898,434 A | 4/1999 | Small et al. |
| 5,956,030 A | 9/1999 | Conrad et al. |
| 6,098,081 A | 8/2000 | Heidorn et al. |
| 6,182,091 B1 | 1/2001 | Pitkow et al. |
| 6,304,675 B1 | 10/2001 | Osbourne et al. |
| 6,438,579 B1 | 8/2002 | Hosken |

OTHER PUBLICATIONS

Bruandet, "Outline of a Knowledge Base Model for an Intelligent Information Retrieval System", Information Processing & Management, vol. 25, Issue 1, 1989, pp. 89–115.

Garfield, "Citation Indexes for Science", Science, vol. 123, No. 3159, Jul. 1955, pp. 108–111.

Garfield, "The Role of the Medical Librarian in SDI Systems", Bulletin of the Medical Library Association, vol. 57, No. 4, Oct. 1969, pp. 348–351.

Giles, et al., "CiteSeer: An Automatic Citation Indexing System", Third ACM Conference on Digital Libraries, ACM Press, 1998, pp. 89–98.

Matula, "κ–Components, Clusters, and Slicings in Graphs", SIAM Journal on Applied Mathematics, vol. 22, No. 3, May 1972, pp. 459–480.

Salton, et al., "Automatic Structuring and Retrieval of Large Text Files", Communications of the ACM, vol. 37, No. 2, Feb. 1994, pp. 97–108.

Salton, et al., "Enhancement of Text Representations Using Related Document Titles", Information Processing & Management vol. 22, No. 5, 1986, pp. 385–394.

Aalbersberg, A Document Retrieval Model Based on Term Frequency Ranks, Springer–Vertag New York, Inc., New York, NY, pp. 164–171, 1994; 11 pgs.

Aho et al., Data Structures and Algorithms, Addison–Wesley Publishing Company, pp. 199–229, pp. 171–223, 1983, 19 pgs.

Aho et al., The Design and Analysis of Computer Algorithms; Addison–Wesley Publishing Company, 1976, 30 pgs.

Baase, Computer Algorithms: Introduction to Design and Analysis, Chapter 3: Graphs & Digraphs, pp. 114–169, Addison–Wesley Publishing Company, 1978, 28 pgs.

Bichteler et al., Comparing Two Algorithms for Document Retrieval Using Citation Links, Journal of the American Society of Information Science, vol. 28, No. 4, pp. 192–195, Jul. 1977, 4 pgs.

Caplinger, Graphical Database Browsing, Bell Communications Research, Room 2A–261, 435 South Street, Morristown, NJ 07960, 1986, pp. 113–118, 6 pgs.

Cowart; Master Windows 3.1, Apr. 2, 1992, pp. 64–76, 867.

Crouch, et al., The Automatic Generation of Extended Queries, Department of Computer Science, Duluth, Minnesota, pp. 369–383, 1990, 15 pgs.

Crouch, et al., The Use of Cluster Hierarchies in Hypertext Information Retrieval, Department of Computer Science, Duluth, Minnesota, Hypertext '89 Proceedings, pp. 225–237, Nov. 1989, 14 pgs.

Fritsche, Commission of the European Communities: Automatic Clustering Techniques in Information Retrieval, Joint Nuclear Research Center, Ispra Establishment, Italy 1974, 142 pgs.

Furner et al., Information Retrieval and Hypertext: The Representation and Comparison of Hypertext Structures Using Graphs, Kluwer Academic Publishers, Norwell, Massachusetts, pp. 75–96, 1996, 14 pgs.

Golub et al., Matix Computations, The Johns Hopkins University Press, pp. 1–476, 492 pgs.

Hearst et al., Subtopic Structuring for Full–Length Document Access, Computer Science Division, Berkeley, CA, Proc. $16^{th}$ SIGIR, pp. 59–68, 1993, 10 pgs.

Horowitz et al., Fundamentals of Data Structures, Chapter 6; Graphs, Computer Science Press, Inc., pp. 282–335, 1976 and 1982, 28 pgs.

Invalidity Claim Chart for U.S. Patent No. 5,544,352 of Certain Exemplary Combinations, p. 1–17, 17 pgs.

Kommers, Designing Hypermedia for Learning: Chapter 7, Graph Computation as an Orientation Device in Extended and Cyclic Hypertext Networks, pp. 117–134, Springer–Verlag, Berlin, 1990, 20 pgs.

Kungl. Statskontoret, Citation Index and Measures of Association in Mechanized Document Retrieval; Swedish Rationalization Agency, Stockholm, Jan. 1, 1967, 14 pgs.

Libertech, Inc., V–Search™ Integration Toolkit for Folio VIEWS, Beta Release 2.0, User's Manual, Preliminary Draft, Draft 1.0, pp. 1–36, Dec. 6, 1995, 43 pgs.

Libertech, Inc., V–Search™ Publisher's Toolkit, Beta Release 2.0, User's Manual, Draft 2.0, pp. 1–160, Dec. 8, 1995, 171 pgs.

Products in the News: Document Relationships at a Glance, Electronic Documents, vol. 3, No. 12, 1994, 1 pg.

Salton et al., A Citation Study of the Computer Science Literature, Department of Computer Science, Ithaca, NY, 46 pgs.

Salton et al., Automatic Text Structuring and Retrieval—Experiments in Automatic Encyclopedia Searching, Department of Computer Science, Cornell University, pp. 21–30, 1991, 10 pgs.

Fox, Virginia Discs 1 and 2, Nimbus Records, Virginia Polytechnic Institute and State University, 1998, 6 Compact Discs.

"Brown University I.R.I.S. Intermedia: A Retrospective 53 Minutes", Video Cassette.

Libertech, "Libertech to release V–Search for Folio VIEWS; Offers dramatic enhancements to electronics document research", Mar. 21, 1995, pp. 1–2.

Kaplan, "Headline: The Cutting Edge/Computing/Technology/Innovation; New Ways to Find Needle in Data Haystack; Information: Novel Software is Making the Database Search Faster, More Efficient", Los Angeles Times, Mar. 29, 1995, pp. 1–5 (loaded Mar. 31, 1995).

The British Library, "Document Relationships at a Glance", Electronic Documents, vol. 3, No. 12, p. 1.

Libertech, "Americans with Disabilities Libertech / Lawyers Cooperative Publishing Proposed Pilot Project" Project Scope and Cost Estimates, Libertech Company Confidential, Feb. 5, 1995, pp. 1–38.

Libertech, "Business Plan" Mar. 1995, pp. 1–44.

NetCarta Corp., A trip to Hawaii with CyberPilot™ Pro, Feb. 21, 1996, pp. 1–30.

Mauldin, "Lycose 4. perl: Search the Web for Information", May 1, 1994, pp. 1–8.

Burt, "Structure" A General Purpose Network Analysis Program Providing Sociometric Indices, Cliques, Stuctural and Role Equivalences, Density Table, Contagion, Autonomy, Power and Equilibria in Multiple Network Systems, Version 4.2, Reference Manual, Columbia University, 1991, pp. 1–232.

Analytic Technologies, "UCINET IV" Network Analysis Software, Oct. 1992, pp. 2–3.

Salton, "Associative Document Retrieval Techniques Using Bibliographic Information", Harvard University, Cambridge, Massachusetts, Mar. 1963, pp. 440–457.

Kessler, "TIP System Applications"A description of TIP Operations and a Preliminary Analysis of System Experience, Oct. 1967, pp. 1–14.

Kessler, "TIP User's Manual", A Guide for on–line Research and Retrieval of the Current Literature in Physics, 1967, pp. 1–22.

Garner et al., "Three Drexel Information Science Research Studies", Drexel Institute of Technology, 1967, pp. 1–46.

Salton, "Automatic Information Organization and Retrieval", Professor of Computer Science, Cornell University, 1968, pp. 1–514.

Goffman, "An Indirect Method of Information Retrieval", Inform. Stor. Retr. vol. 4, Pergamon Press, 1969, pp. 361–373.

Salton, "Automatic Indexing Using Bibliographic Citations" In Automatic Content Analysis, 1970, pp. 99–117.

Salton, "The Smart Retrieval System", Experiments in Automatic Document Processing, 1971, pp. 1–556.

Schiminovich, "Automatic Classification and Retrieval of Documents by Means of a Bibliographic Pattern Discovery Algorithm", Inform. Stor. Retr. vol. 6, 1971, pp. 417–435.

Bichteler et al., "Document Retrieval by Means of An Automatic Classification Algorithm for Citations", Inform. Stor. Retr., vol. 10, May 1974, pp. 267–278.

Shimko, "An Experiment with Semantics and Goffman's Indirect Method", Inform. Stor. Retr., vol. 10, Aug. 29, 1974, pp. 387–392.

Salton et al., "A Vector Space Model for Automatic Indexing", Communications of the ACM, vol. 18, No. 11, Nov. 1975, pp. 613–620.

Pinski et al., "Citation Influence for Journal Aggregates of Scientific Publications: Theory, With Application to the Literature of Physics", Information Processing & Management, vol. 12, No. 5, 1976, pp. 297–312.

Bitchteler et al., Comparing Two Algorithms for Document Retrieval using Citation Links (Journal of the American Society of Information Science, vol. 28, No. 4, Jul. 1977.

Garfield, "Citation Indexing" Its Theory and Application in Science, Technology, and Humanities, 1979, pp. 1–274.

Tapper, "The Use of Citation Vectors for Legal Information Retrieval", Journal of Law and Information Science, vol. 1, No. 2, 1982, pp. 131–161.

Kochtanek, "Bibliographic Compilation Using Reference and Citation Links", Information Processing & Management, vol. 18, No. 1, 1982, pp. 33–39.

Fox, "Some Consideration for Implementing the Smart Information Retrieval System Under UNIX", Department of Computer Science, Cornell University, 1983, pp. 1–88.

Fox, "Extending the Boolean and Vector Space Models of Information Retrieval with P–Norm Queries and Multiple Concept Types", Aug. 1983, pp. 1–364.

Fox, "Characterization of Two New Experimental Collections in Computer and Information Science Containing Textual and Bibliographic Concepts", 1983, pp. 1–64.

Salton et al., "Introduction to Modern Information Retrieval" 1983, pp. 1–448.

Fox, "Combining Information in an Extended Automatic Information Retrieval System for Agriculture", Computer International Institute of Tropical Agriculture, 1984, pp. 449–466.

Fox, "Composite Document Extended Retrieval" Proceedings of the $8^{th}$ Annual International ACM SIGIR Conference on Research and Development in Information Retrieval, 1985, pp. 42–53.

Belew, "Adaptive Information Retrieval: Machine Learning in Associative Networks", 1986, pp. 1–312.

Croft et al., "Retrieving Documents by Plausible Inference: A Preliminary Study", Proceedings of the $11^{th}$ Annual International ACM SIGIR Conference on Research and Development in Information Retrieval, 1988, pp. 481–494.

Armstrong et al., "Manual of Online Search Strategies", 1988, pp. 1–831.

Frisse, "Searching for Information In A Hypertext Medical Handbook", Communications of the ACM, vol. 31, No. 7, Jul. 1988, pp. 880–886.

Salton et al., "On the Use of Spreading Activation Methods in Automatic Information Retrieval", Proceedings of the $11^{th}$ Annual International ACM SIGIR Conference, 1988, pp. 147–160.

Fox et al., "Coefficients for Combining Concept Classes in a Collection", Proceedings of the $11^{th}$ Annual International ACM SIGIR Conference on Research and Development in Information Retrieval, 1988, pp. 291–307.

Conklin et al., "gIBIS: A Hypertext Tool for Exploratory Policy Discussion", ACM, 1988, pp. 140–152.

Croft et al., "A Retrieval Model for Incorporating Hypertext Links", Proceedings of the Second Annual ACM Conference on Hypertext, 1989, pp. 213–224.

Frisse et al., "Information Retrieval From Hypertext: Update on the Dynamic Medical Handbook Project", Proceedings of the Second Annual ACM Conference on Hypertext, 1989, pp. 199–212.

Berners–Lee, "Information Management: A Proposal", CERN, http://www/w3/org/History/1989/proposal.html, 1989, pp. 1–21.

Thompson, "The Design and Implementation of an Intelligent Interface for Information Retrieval", Feb. 1989, pp. 1–216.

Rose et al., "Legal Information Retrieval: A Hybrid Approach", ACM, 1989, pp. 138–146.

Kommers, "Graph Computation as an Orientation Device in Extended and Cyclic Hypertext Networks", Designing Hypermedia for Learning, NATO ASI Series, vol. F67, 1990, pp. 117–134.

Nielsen, "Hypertext and Hypermedia", Academic Press Limited, 1990, pp. 1–268.

Shepherd et al., "Transient Hypergraphs for Citation Networks", Information Processing Management, vol. 26, No. 3. 1990, pp. 395–412.

Nielsen, "The Art of Navigating", Communications of the ACM, vol. 33, No. 3, Mar. 1990, pp. 298–310.

Lucarella, "a Model for Hypertext–Based Information Retrieval", Proceedings of the ECHT '90.INRIA, Cambrige University Press, N. Streitz, A. Rizk, and J. Andre, eds., Nov. 1990, pp. 82–94.

Turtle, "Inference Networks for Document Retrieval", A dissertation by Howard Robert Turtle, Proceeding of the 13$^{th}$ Annual International ACM SIGIR Conference on Research and Development in Information Retrieval, Feb. 1991, pp. 1–198.

Turtle et al., Evaluation of an Inference Network–Based Retrieval Model, ACM Transactions on Information Systems, vol. 9, No. 3, Jul. 1991, pp. 187–222.

Shaw, "Subject and Citation Indexing Part 1: The Clustering Structure of Composite Representations in the Cystic Fibrosis Document Collection", Journal of the American Society for Information Science and Technology, 42(9), 1991, pp. 669–675.

Shaw, "Subject and Citation Indexing Part II: The Optimal, Cluster–Based Retrieval Performance of Composite Representations", Journal of the American Society for Information Science and Technology, 42(9), 1991, pp. 676–684.

Brueni et al.,. "What if There were Desktop Access to the Computer Science Literature?", ACM Conference on Computer Science, 1993, pp. 15–22.

Gelbart et al., Beyond Boolean Search: FLEXICON, A Legal Text–based Intelligent System, ACM, 1991; pp. 225–234.

Lin et al., "A Self–Organizing Semantic Map for Information Retrieval", SIGIR, ACM, 1991, pp. 262–269.

Berk et al., Hypertext/Hypermedia Handbook, 1991, pp. 1–583.

Dunlop et al., "Hypermedia and Free Text Retrieval", 1991, pp. 1–20.

Rada, "Hypertext: from Text to Expertext", Department of Computer Science, University of Liverpool, 1991, pp. 1–237.

Rose, "A Symbolic and Connectionist Approach to Legal Information Retrieval", University of California, 1991, pp. 1–293.

Frei et al., "Making Use of Hypertext Links when Retrieving Information", ACM ECHT Conference, 1992, pp. 102–111.

Botafogo et al., "Structural Analysis of Hypertexts: Indentifying Hierarchies and Useful Metrics", ACM Transaction on Information Systems, vol. 10, No. 2, Apr. 1992, pp. 142–180.

Alain et al, "Hypertext Paradigm in the Field of Information Retrieval: a Neural Approach", ACM ECHT Conference, 1992, pp. 112–121.

Guinan et al., "Information Retrieval from Hypertext Using Dynamically Planned Guided Tours", ACM ECHT Conference, 1992, pp. 122–130.

Chen, "LEND Pattern Language Syntax Specification: VER 1.3", Oct. 12, 1992, pp. 1–8.

Chen, "An Object–Oriented Database System for Efficient Information Retrieval Applications", 1992, pp. 1–240.

Fox et al., "Users, User Interfaces, and Objects: Envision, a Digital Library", Journal of the American Society for Information Science, 44(8), 1993, pp. 480–491.

Croft et al., "Retrieval Strategies for Hypertext", Information Processing & Management vol. 29, No. 3, 1993, pp. 313–224.

Betrabet et al., "Query Language for Information Graphs", Department of Computer Science, Jan. 27, 1993, pp. 1–7.

Betrabet, "A query Language for Information Graphs", Department of Computer Science, Dec. 1993, pp. 1–107.

Pinkerton, "Finding What People Want: Experiences with the WebCrawler", 1994, pp. 1–10.

Conrad et al., "A System for Discovering Relationships by Feature Extraction from Text Databases", Proceedings of the 17$^{th}$ Annual International ACM SIGIR Conference on Research and Development in Information Retrieval, Jul. 1994, pp. 1–11.

De Bra et al., "Information Retrieval in the World–Wide Web: Making Client–Based Searching Feasible", Computer Networks and ISDN Systems, vol. 27, No. 2, 1994, pp. 183–192.

McKee, "Towards Better Integration of Dynamic Search Technology and the World–Wide Web", 1994, pp. 129–135.

Krol, "The Whole Internet", User's Guide & Catalog, 1994, pp. 1–544.

Herzner et al., "Multimedia/Hyper Media In Open Distributed Environments", Proceedings of the Eurographics Symposium, Jun. 6–9, 1994, pp. 1–330.

France et al., "Marian Design", Virginia Tech Computing Center, Feb. 14, 1995, pp. 1–40.

Frei et al., "The Use of Semantic Links in Hypertext Information Retrieval", Information Processing & Management, vol. 31, No. 1, 1995, pp. 1–13.

Pirolli et al., "Silk from a Sow's Ear: Extracting Usable Structures from the Web", In Conference on Human Factors in Computing Systems, CHI, 1996, pp. 1–8.

Weiss et al., "HyPursuit: A Hierarchical Network Search Engine that Exploits Content–Link Hypertext Clustering", Conference on Hypertext and Hypermedia Archive, Proceedings of the seventh ACM Conference on Hypertext, 1996, pp. 180–193.

Bourne et al., "A History of Online Information Services 1963–1976", Massachusetts Institute of Technology, 2003, pp. 1–493.

Seeley, "The Net of Reciprocal Influence", Can. Jour. Psych. III, 4, 1949, pp. 234–240.

Katz, "A New Status Index Derived from Sociometric Analysis", Psychometrika, vol. 18, No. 1, 1953, pp. 39–43.

Bar–Hillel, "A Logician's Reaction to Recent Theorizing on Information Search Systems", American Documentation, 8(2); AB/INFORM Global; Apr. 1957, pp. 103–113.
Harary, "Structural Model: An Introduction to the Theory of Directed Graphs", John Wiley & Son, Inc., see, e.g. Preface, Ch. 1, Digraphs and Structures, Ch. 5, Digraphs and Matrices, and Ch. 14, Networks, 1965, pp. 415.
Hubbell, "An Input–Output Approach to Clique Identification", 1965, pp. 376–399.
Jardine et al., "The Use of Hierarchic Clustering in Information Retrieval", Inform. Stor. Retr. vol. 7, Pergamon, pp. 217–240.
Van Rijsbergen, "Information Retrieval", 1979, pp. 2–147.
Jain et al., "Algorithms for Clustering Data", 1988, pp. 1–320.
Pao et al., "Retrieval Effectiveness by Semantic and Citation Searching", Journal of the American Society for Information Science, 40(4), 1989, pp. 226–235.
Consens, "Expressing Structural Hypertext Queries in GraphLog", Hypertext '89 Proceedings, Nov. 1989, pp. 269–292.
Kaufman et al., "Finding Groups in Data–An Introduction to Cluster Analysis", 1990, pp. 1–342.
Korfhage, "To See, or Not to See–Is That the Query?", ACM, SIGIR Conference on Research and Development in Information Retrieval, 1991, pp. 134–141.
Li et al., "X–Window Interface to SMART, an Advanced Text Retrieval System", SIGIR Forum, 1992, pp. 5–16.
Agosti et al. "A Hypertext Environment for Interacting with Large Textual Databases," IP&M 28: No. 3, 1992, pp. 371–387.
Agosti et al., "User Navigation in the IRS Conceptual Structure Through a Semantic Association Function", The Computer Journal, vol. 35, No. 3, 1992, pp. 194–199.
Salton et al., "Approaches to Passage Retrieval in Full Text Information Systems", Proc. 16$^{th}$ SIGIR Conference, 1993, pp. 49–58.
Berners–Lee et al.,"World–Wide Web: The Information Universe", 1992, pp. 1–9.
Crouch, "The Visual Display of Information in an Information Retrieval Environment", pp. 58–67.
Rizk, "Hypertext: Concepts, Systems and Applications", Proceedings of the First European Conference on Hypertext, Cambridge University Press, 1990, pp. 1–373.
Salton et al., Automatic Analysis, Theme Generation, and Summarization of Machine–readable Texts, Science, vol. 264, Jun. 3, 1994, pp. 1421–1426.
Wood et al., "HyperSpace: Web Browsing with Visualization", Proceedings from the Third International World–Wide Web Conference, Apr. 10–14, 1995, pp. 1–5.
Furner et al., "The Representation and Comparison of Hypertext Structures Using Graphs", 1996, pp. 75–96.
Hara et al., "Implementing Hypertext Database Relationship Through Aggregations and Exceptions", Hypertext '91 Proceedings, Dec. 1991, pp. 75–90.
McBryan, "GENVL and WWWW: Tools for Taming the Web", May 1994, pp. 1–10.
Baase, "Computer Algorithms Introduction to Design and Analysis", Jul. 1988, pp. 146–407.
Cleveland, "An n–Dimensional Retrieval Model", Journal of American Society for Information Science, Sep.–Oct. 1976, pp. 342–347.
Salton et al., "Approaches to Text Retrieval for Structured Documents", Department of Computer Science, Cornell University, Jan. 11, 1990, pp. 1–19.
Can et al., "A Dynamic Cluster Maintenance System for Information Retrieval", ACM, 1987, pp. 123–131.
Aversa, "Contract Research Services at ISI: Customized Citation Analysis for Government, Industrial, and Academic Clients", Essays, vol. 15, Jun. 8, 1992, pp. 75–83.
Agosti et al.; A Two–Level Hypertext Retrieval Model for Legal Data; SIGIR '91 (1991), pp. 1–10.
Fowler et al.; Integrating Query, Thesaurus and Documents Through a Common Visual Representation, SIGIR '91 (1991), pp. 1–10.
Belew, Richard; A Connectionist Approach to Conceptual Information Retrieval ICAIL '87 (1987), pp. 1–11.
Turtle, Howard R., & Croft, W. Bruce, Inference Networks for Document Retrieval, SIGR '90 (1990), pp. 1–24.
Infobase 95 Demonstration Disks, Libertech V–Search for Folio VIEWS, Installation Instructions, 3 pgs.
Krulwich, et al.; Learning User Information Interests Through Extraction of Semantically Significant Phrases; 1996; pp. 110–112; AAAI Technical Report SS–96–05.
Hull; Improving Text Retrieval for the Routing Problem Using Latent Semantic Indexing; 1994; 10 pgs.
J. MacQueen; Some Methods for Classification and Analysis of Multivariate Observations; 1967; pp. 281–297; Univ. of California.
K.L Kwok & L Grunfeld; TREC2 Document Retrieval Experiments using PIRCS; 1994; 10 pgs.; NIST Special Publication SP.
Salton & Buckley; On the Automatic Generation of Content Links in Hypertext; Department of Computer Science, Cornell University TR 89–993, 1989, pp. 1–16.
Korfhage; Query Enhancement by User Profiles; Southern Methodist University, 1984, pp. 111–121.
Joachims et al; WebWatcher: Machine Learning and Hypertext, School of Computer Science, Carnegie Mellon University, 1995, 5 pages.
Carpenter et al., "Culstering of Scientific Journals" ASIS 24(6): 425–436, 1973 (Exhibit B to Defendants' Identification of Prior Art).
R.A. Botafogo and B. Shneiderman, "Identifying Aggregates in Hypertext Structures," Hypertext '91 Proceedings, Dec. 1991, pp. 63–74 ("*Botafogo 1991*").
R.A. Botafogo, "Cluster Analysis for Hypertext Systems," ACM–SIGIR'93, vol. 6, pp. 116–125, 1993 ("*Botafogo 1993*").
J. Conklin, "Hypertext: An Introduction and Survey," IEEE, 17–40, 1987 ("*Conklin 1987*").
J. Pitkow and K.A. Bharat, "Webviz: A Tool For World–Wide Web Access Log Analysis" in Proceedings of the First International World–Wide Web Conference, Geneva, Switzerland, May 1994 (also available as http://www1.cern.ch/WWW94/PrelimProcs.html and GVU Technical Report: GIT–GVU–94–20) ("*Pitkow 1994*").
Libertech, Business Wire, Mar. 21, 1995, and Libertech, Business Wire, Apr. 24, 1995 ("*Libertech Press Releases*").
K. Kaplan, "New Ways to Find Needle in Data Haystack," Los Angeles Times, p. D4, Mar. 29, 1995 ("*Kaplan Article*").
B.R. Schatz and J.B. Hardin, "NCSA Mosaic and the World Wide Web: Global Hypermedia Protocols for the Internet," Science, vol. 265, Aug. 12, 1994 ("*Schatz & Hardin 1994*").

ID NO.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 12-15 is confirmed.

Claims 1, 5, 16, 21 and 22 are determined to be patentable as amended.

Claims 3, 4, 6-11 and 17-20, dependent on an amended claim, are determined to be patentable.

New claims 23-32 are added and determined to be patentable.

Claims 2 was not reexamined.

1. A method for using active links within the data of an object stored in a database of a computer so that a user may jump from viewing the data of the object in the database to a position outside the object in the database and outside the computer, comprising:
   storing one or more links within data of the object in the database to positions outside of the computer, wherein the stored links are active links;
   displaying the data of the object within the database, wherein one or more active links are displayed with the data from the object in the database, wherein positions are nodes in a network that may be accessed, the active links including hyperjump links between nodes in the network and the objects, and the step of displaying comprises:
   generating a source map *using cluster links*, wherein the source map represents hyperjump links that identify a chosen node as a destination of a link, and
   wherein the method further comprises activating a link represented on the source map, wherein a user may hyperjump to a node represented as a node of the link;
   selecting one of the displayed active links from those displayed with the displayed data; and
   jumping to the position outside the object in the database.

5. A method for displaying information about a network that has hyperjump data, comprising:
   choosing a node; *wherein the chosen node has indirect relationships with other objects and said indirect relationships comprise connected hyperlink relationshhips;*
   accessing the hyperjump data;
   identifying hyperjump data from within the accessed hyperjump data that has a direct reference to the chosen node;
   determining hyperjump data from within the accessed hyperjump data that has an indirect reference to the chosen node using the identified hyperjump data, wherein the step of determining comprises proximity analyzing the identified hyperjump data; *and wherein the step of proximity analyzing comprises:*
   *analyzing indirect relationships by scoring one or more paths of direct links between two indirectly related nodes by analyzing weights associated with direct links that make up the path between the nodes using at least a damping factor; wherein one or more values resulting from the proximity analysis is stored in an index prior to searching by an end user and is used to determine an object's importance;*
   *using the values of the proximity analysis to compare the object's importance to other objects in a pool of objects identified by using at least a word search for purposes of ranking search results; wherein said ranking of search results is also influenced by the number of times an object is visited;*
   displaying one or more determined hyperjump data *of objects in the pool.*

16. A method for navigating documents on the world wide web, comprising:
    choosing a document;
    identifying documents that have a direct relationship to the chosen document;
    locating documents that have an indirect relationship to the chosen document identifying Universal Resource Locators for the documents, wherein the identified Universal Resource Locators either point to or point away from the chosen document;
    analyzing Universal Resource Locators, including the identified Universal Resource Locators, wherein Universal Resource Locators which have an indirect relationship to the chosen document are located, wherein the step of analyzing further comprises [cluster] analyzing the Universal Resource Locators for indirect relationships *using cluster links*; and
    displaying a located document.

21. A method of displaying information about a network that has hyperjump data, comprising:
    choosing a node;
    accessing the hyperjump data;
    identifying hyperjump data from within the accessed hyperjump data that has a direct reference to the chosen node;
    determining hyperjump data from within the accessed hyperjump data that has an indirect reference to the chosen node using the identified hyperjump data, wherein the step of determining comprises [cluster analyzing the hyperjump data] *non-semantically generating a set of candidate cluster links for nodes indirectly related to the chosen node using the hyperjump data, assigning weights to the candidate cluster links and deriving actual cluster links from the set of candidate cluster links based on the assigned weights*; and
    displaying one or more determined hyperjump data.

22. A method for displaying information about a network that has hyperjump data, comprising:
    choosing a node;
    accessing the hyperjump data;
    identifying hyperjump data from within the accessed hyperjump data that has a direct reference to the chosen node;
    determining hyperjump data from within the accessed hyperjump data that has an indirect reference to the chosen node [using] *by proximity indexing* the identified hyperjump data; and displaying one or more determined hyperjump data, wherein the nodes are nodes in the network that may be accessed, the [hypejump] *hyperjump* data includes hyperjump links between nodes in the network, and the step of displaying comprises:

generating a source map using one or more of the determined hyperjump data, wherein the source map represents hyperjump links that identify the chosen node as a destination of a link, and wherein the method further comprises activating a link represented on the source map, wherein a user may hyperjump to a node represented as a node of the link.

23. A method for displaying information about a network that has hyperjump data, comprising:

choosing a node;

accessing the hyperjump data;

identifying hyperjump data from within the accessed hyperjump data that has a direct reference to the chosen node;

determining hyperjump data from within the accessed hyperjump data that has an indirect reference to the chosen node using the identified hyperjump data, wherein the step of determining comprises proximity analyzing the identified hyperjump data; and displaying one or more determined hyperjump data, *wherein the chosen node is an object stored in a database that has direct relationships with other objects in said database and said direct relationships relate to hyperlink relationships on the world wide web; and wherein the step of proximity analyzing comprises:*

*analyzing indirect relationships by scoring one or more paths of direct links between two indirectly related nodes by analyzing weights associated with direct links that make up the path between the nodes.*

24. The method of claim 23, wherein said proximity analysis uses a damping factor and comprises:

determining a quantity of hyperlinks within an object and scoring at least one indirect relationship comprising at least four link lengths from the chosen node.

25. The method of claim 24, wherein one or more values resulting from the proximity analysis is stored prior to searching by an end user and is used to determine an object's importance; the method further comprising:

using the proximity analysis to compare the object's importance to other objects in a pool of objects identified by using at least a word search for purposes of ranking search results.

26. The method of claim 23, wherein the step of displaying is influenced by a number of times a web object is visited.

*27. A method for visually displaying data related to a web having identifiable web pages and Universal Resource Locators with pointers, comprising:*

*choosing an identifiable web page;*

*identifying Universal Resource Locators for the web pages, wherein the identified Universal Resource Locators either point to or point away from the chosen web page;*

*analyzing Universal Resource Locators, including the identified Universal Resource Locators, wherein Universal Resource Locators which have an indirect relationship to the chosen web page are located, wherein the step of analyzing further comprises cluster analyzing the Universal Resource Locators for indirect relationships; and*

*displaying identities of web pages, wherein the located Universal Resource Locators are used to identify web pages,*

*wherein cluster analyzing for indirect relationships comprises generating and deriving cluster links, wherein said generating cluster links comprises scoring a path of direct link weights between two nodes relating to the world wide web using at least a quantity of hyperlinks within an object, and wherein said identification of web pages using the located Universal Resource Locators comprises using the located Universal Resource Locators as part of an analysis to determine a rank used to locate or display objects responsive to a search.*

*28. A method for visually displaying data related to a web having identifiable web pages and Universal Resource Locators with pointers, comprising:*

*choosing an identifiable web page;*

*identifying Universal Resource Locators for the web pages, wherein the identified Universal Resource Locators either point to or point away from the chosen web page;*

*analyzing Universal Resource Locators, including the identified Universal Resource Locators, wherein Universal Resource Locators which have an indirect relationship to the chosen web page are located, wherein the step of analyzing further comprises cluster analyzing the Universal Resource Locators for indirect relationships; and*

*displaying identities of web pages, wherein the located Universal Resource Locators are used to identify web pages,*

*wherein the step of displaying is influenced by a number of times a web object is visited and wherein the cluster analysis uses a damping factor.*

*29. The method of claim 27, wherein one or more values resulting from the cluster analysis is stored prior to searching by an end user and is used to determine an object's importance; the method further comprising:*

*using the cluster analysis to compare the object's importance to other objects in a pool of objects identified by using at least a word search for ranking search results.*

*30. A method for navigating documents on the world wide web, comprising: chooosing a document;*

*identifying documents that have a direct relationship to the chosen document;*

*locating documents that have an indirect relationship to the chosen document identifying Universal Resource Locators for the documents, wherein the identified Universal Resource Locators either point to or point away from the chosen document;*

*analyzing Universal Resource Locators, including the identified Universal Resource Locators, wherein Universal Resource Locators which have an indirect relationship to the chosen document are located, wherein the step of analyzing further comprises cluster analyzing the Universal Resource Locators for indirect relationships; and*

*displaying a located document,*

*wherein the step of cluster analyzing comprises:*

*generating and deriving cluster links wherein said generating comprises scoring a path of direct link weights between two nodes by recursively analyzing the set of direct links and using a damping factor,*

*and wherein said direct relationships to a chosen document comprise a reference from the chosen document to at least one of the identified documents.*

31. The method of claim 16, wherein the step of displaying is influenced by a number of times a web object is visited.

32. A method for displaying information about a network that has hyperjump data, comprising:

choosing a node;

accessing the hyperjump data;

identifying hyperjump data from within the accessed hyperjump data that has a direct reference to the chosen node;

determining hyperjump data from within the accessed hyperjump data that has an indirect reference to the chosen node using the identified hyperjump data, wherein the step of determining comprises cluster analyzing the hyperjump data; and displaying one or more determined hyperjump data, wherein the step of cluster analyzing comprises:

generating deriving cluster links, wherein said generating comprises scoring a path of direct link weights between two indirectly related nodes by recursively analyzing the set of direct links, using a damping factor, and using a quantity of direct references within an object to another object; and wherein said direct reference to a chosen document comprises a reference from the chosen document to another object.

\* \* \* \* \*